US007720290B2

(12) United States Patent
Shimura et al.

(10) Patent No.: US 7,720,290 B2
(45) Date of Patent: May 18, 2010

(54) METHOD, PROGRAM, AND APPARATUS FOR DETECTING SPECIFIC INFORMATION INCLUDED IN IMAGE DATA OF ORIGINAL IMAGE, AND COMPUTER-READABLE STORING MEDIUM STORING THE PROGRAM

(75) Inventors: Hiroshi Shimura, Yokosuka (JP); Haike Guan, Yokosuka (JP); Masaaki Ishikawa, Tokyo (JP); Takashi Saitoh, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 1435 days.

(21) Appl. No.: 10/980,767

(22) Filed: Nov. 4, 2004

(65) Prior Publication Data

US 2005/0151989 A1 Jul. 14, 2005

(30) Foreign Application Priority Data

| Nov. 6, 2003 | (JP) | ............................. 2003-377192 |
| Nov. 6, 2003 | (JP) | ............................. 2003-377193 |
| Nov. 6, 2003 | (JP) | ............................. 2003-377194 |
| Apr. 28, 2004 | (JP) | ............................. 2004-133214 |

(51) Int. Cl.
*G06K 9/62* (2006.01)
*G06K 9/00* (2006.01)
*G06K 9/32* (2006.01)
*G06K 15/02* (2006.01)

(52) U.S. Cl. ....................... 382/209; 382/148; 382/299; 382/298; 358/1.2

(58) Field of Classification Search .................. 358/1.2; 382/299, 148
See application file for complete search history.

(56) References Cited

U.S. PATENT DOCUMENTS

| 4,899,227 A * | 2/1990 | Yamada ....................... 358/452 |
| 6,381,030 B1 | 4/2002 | Udagawa et al. |
| 6,694,050 B2 * | 2/2004 | Hiraishi et al. .............. 382/162 |
| 2001/0009591 A1 | 7/2001 | Hiraishi et al. |

FOREIGN PATENT DOCUMENTS

| EP | 1 049 041 | 11/2000 |
| JP | 6-54185 | 2/1994 |

(Continued)

OTHER PUBLICATIONS

European Examination Communication (Jan. 27, 2010).

*Primary Examiner*—John B Strege
*Assistant Examiner*—Alex Liew
(74) *Attorney, Agent, or Firm*—Dickstein Shapiro LLP

(57) ABSTRACT

An image processing apparatus which includes a specific information extracting processor that extracts specific information that is represented by an image and included in image data, based on a specific information extracting program loaded into the specific information extracting processor, a variable factor recognizing mechanism that recognizes a variable factor of the image data from which the specific information is extracted by the specific information extracting processor, and a program loading mechanism that selects one of a plurality of specific information extracting programs stored in a storage area. The selected specific information extracting program corresponds to the recognized variable factor of the image data and is suitable for extracting specific information included in varied image data. The program loading mechanism further loads the selected specific information extracting program into the specific information extracting processor.

56 Claims, 53 Drawing Sheets

FOREIGN PATENT DOCUMENTS

| | | |
|---|---|---|
| JP | 6-125459 | 5/1994 |
| JP | 7-30748 | 1/1995 |
| JP | 7-36317 | 2/1995 |
| JP | 7-87309 | 3/1995 |
| JP | 7-322062 | 12/1995 |
| JP | 9-128605 | 5/1997 |
| JP | 2647566 | 5/1997 |
| JP | 9-164739 | 6/1997 |
| JP | 9-244901 | 9/1997 |
| JP | 9-244985 | 9/1997 |
| JP | 3032722 | 2/2000 |
| JP | 3032723 | 2/2000 |
| JP | 2000/123156 | 4/2000 |
| JP | 2001-76125 | 3/2001 |
| JP | 2001-86330 | 3/2001 |
| JP | 3184563 | 4/2001 |
| JP | 2001-197297 | 7/2001 |
| JP | 2002-207606 | 7/2002 |

\* cited by examiner

FIG. 26

| SCALING RATIO | SCALING METHOD | |
|---|---|---|
| | NEAREST NEIGHBOR INTERPOLATION METHOD | LINEAR INTERPOLATION METHOD |
| LESS THAN 150% | <table><tr><td>-0.5</td><td>-0.5</td><td>-0.5</td></tr><tr><td>-0.5</td><td>3.0</td><td>-0.5</td></tr></table> | <table><tr><td>-1</td><td>-1</td><td>-1</td></tr><tr><td>-1</td><td>5</td><td>-1</td></tr></table> |
| 150% OR MORE | <table><tr><td>-1</td><td>-1</td><td>-1</td></tr><tr><td>-1</td><td>5</td><td>-1</td></tr></table> | <table><tr><td>-1.5</td><td>-1.5</td><td>-1.5</td></tr><tr><td>-1.5</td><td>7.0</td><td>-1.5</td></tr></table> |

FIG. 27

| SCALING RATIO | SCALING METHOD | |
|---|---|---|
| | NEAREST NEIGHBOR INTERPOLATION METHOD | LINEAR INTERPOLATION METHOD |
| LESS THAN 150% | 1.5  1.5<br>1.5  2.0  1.5<br>1.5  1.5 | 1.25  1.25<br>1.25  3.00  1.25<br>1.25  1.25 |
| 150% OR MORE | 1.25  1.25<br>1.25  3.00  1.25<br>1.25  1.25 | 1  1<br>1  4  1<br>1  1 |

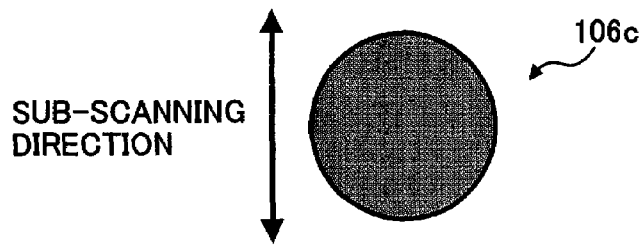
FIG. 34A
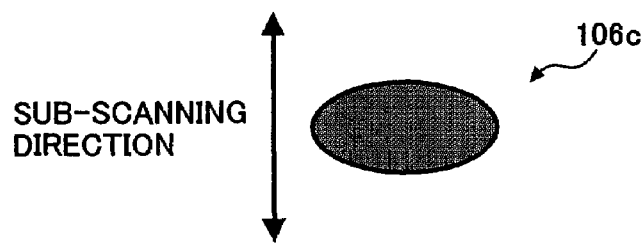
FIG. 34B
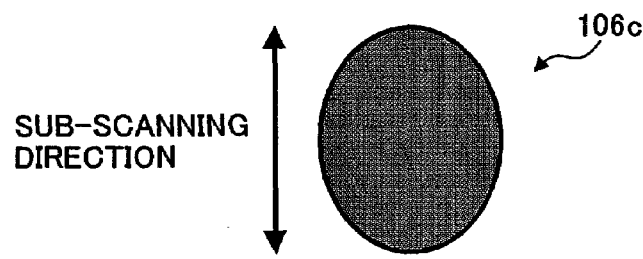
FIG. 34C
FIG. 35
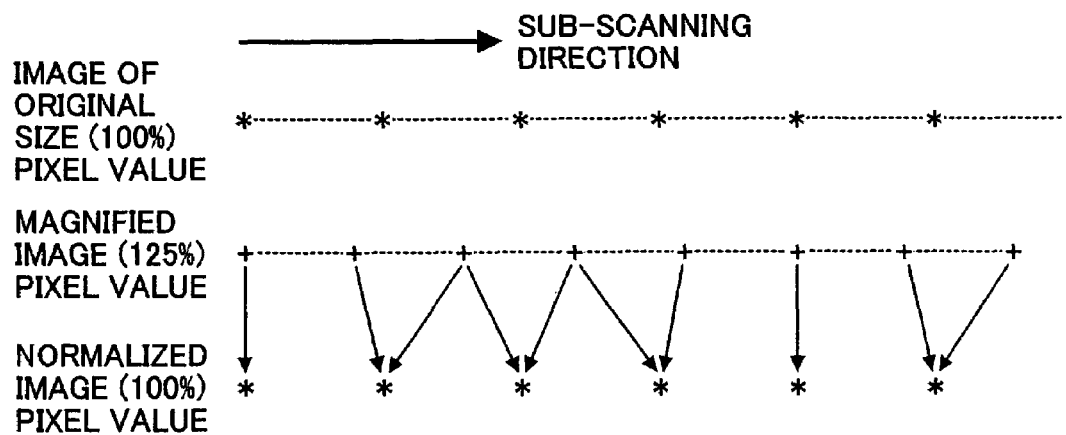

ORIGINAL SIZE, NO TURN

ORIGINAL SIZE, RIGHTWARD
TURN BY 90 DEGREES

ORIGINAL SIZE, LEFTWARD
TURN BY 90 DEGREES

ORIGINAL SIZE,
TURN BY 180 DEGREES

50% REDUCTION, NO TURN

50% REDUCTION, RIGHTWARD TURN BY 90 DEGREES

50% REDUCTION, LEFTWARD TURN BY 90 DEGREES

50% REDUCTION, TURN BY 180 DEGREES

METHOD, PROGRAM, AND APPARATUS FOR DETECTING SPECIFIC INFORMATION INCLUDED IN IMAGE DATA OF ORIGINAL IMAGE, AND COMPUTER-READABLE STORING MEDIUM STORING THE PROGRAM

CROSS-REFERENCE TO RELATED APPLICATIONS

This application claims priority to Japanese Patent Application No. 2003-377192 filed in the Japanese Patent Office on Nov. 6, 2003, Japanese Patent Application No. 2003-377194 filed in the Japanese Patent Office on Nov. 6, 2003, Japanese Patent Application No. 2003-377193 filed in the Japanese Patent Office on Nov. 6, 2003, and Japanese Patent Application No. 2004-133214 filed in the Japanese Patent Office on Apr. 28, 2004, the entire contents of which are incorporated by reference herein.

BACKGROUND OF THE INVENTION

1. Field of the Invention

The present invention relates to a method, program, and apparatus for copy protection, and more particularly to a method, program, and apparatus for detecting specific information representing prohibition of an output of image data included in image data of an original image. The present invention also relates to a computer-readable storage medium storing the above-mentioned program for detecting specific information representing prohibition of an output of image data included in image data of an original image.

2. Discussion of the Related Art

With recent improvements in image processing and image forming technologies, it has become possible that a high-tech digital color copying apparatus, for example, can reproduce a monetary document even with a high fidelity such that the reproduced image is hardly distinguishable from the original image. Such monetary document is a paper currency, a security, and the like, for example, and will not normally be placed as an object of copying since an authorized currency creation is illegal. Therefore, the high-tech digital color copying apparatus needs to be provided with a feature of prohibiting a reproduction of an anti-copy document such as a monetary document, a confidential document, etc. With this feature, a copy-prohibited document may be entirely prohibited from being reproduced or can be reproduced into a nonreadable image, for example.

In offices, there are many confidential documents which are not necessarily monetary documents but are prohibited from being copied from a viewpoint of trade secrets. These confidential documents also need to be prohibited from being copied with the high-tech digital color copying apparatuses.

Under these circumstances, various inventions associated with the above-mentioned high-tech digital color copying apparatus have been created to attempt to restrict the capability of an image reproduction with a high fidelity.

Japanese Laid-Open Unexamined Patent Application Publication, No. 6-125459 describes a technique for recognizing a special document such as currency, a security, and so on by comparing input image data with a prestored specific mark by pattern matching and judging that the input image data is a special document when the input image data is recognized as matching the prestored specific mark. Japanese Laid-Open Unexamined Patent Application Publication, No. 2001-086330 also describes a similar technique. If an input original is judged as a special document easily in this way, a reproduction of this document can readily be prohibited.

This technique accordingly requires a storage of reference pattern data to be applied to the copy protection for a specific document. However, it would be difficult to apply this reference pattern data, which is fixed data, to the copy protection for an indefinite number of general confidential documents.

As another example, Japanese Laid-Open Unexamined Patent Application Publication, No. 7-036317 describes a technique for recognizing a confidential document dealt with as a copy-prohibited document by detecting a specific mark such as "CONFIDENTIAL," for example, printed on this confidential document indicative of its confidentiality. A print of such a specific mark indicating the document confidentiality in a confidential document is a common practice and the above-mentioned publication uses it. When an input original is judged as a special document easily in this way, a reproduction of this document can readily be prohibited. Japanese Laid-Open Unexamined Patent Application Publication, No. 7-087309 also describes a similar method.

However, when a confidential document has a print of a specific confidential mark such as "CONFIDENTIAL," for example, a copy of this confidential document can easily be made by avoiding a print of the specific confidential mark by hiding it with a piece of paper, for example. Thus, the copy protection fails to protect the confidential document from copying.

Japanese Laid-Open Unexamined Patent Application Publication, No. 9-164739 also describes a similar technique for restricting a copying of document by embedding a watermark in an original image which is desired to be protected from copying. This technique uses a paper sheet having a specific background image to which an original image is attached. The specific background image includes a background dot pattern having a base area and a message area. From its nature, the background dot pattern is inconspicuous in comparison with the original image and therefore it does not cause a problem when reading the original image. This technique, however, causes the background dot pattern to appear when the original image having this background dot pattern is copied. The background dot pattern of this technique is provided with a word of warning such as a "NO COPYING", for example, so that a copy of this original document is recognized easily at a glance as a confidential document for which it is desired to be protected from copying. Therefore, this technique has a psychological effect of restricting against the copying of the document.

However, this technique produces the above-mentioned psychological effect only after the copy is made. Therefore, for the persons who do not care about the appearance of the background dot pattern, the copy protection does not work at all.

There is another technique for prohibiting a reproduction of a copy-prohibited document which addresses the above-described problems. In this technique, when preparing an original image, a predetermined background dot pattern is embedded in a background image which is included in the image data of the original image. When scanning such an original image by a scanner, the background dot pattern is detected from the image data of the original image. Then, the detected background dot pattern is compared with a background dot pattern representing an anti-copy document which is stored in a predetermined storage area by a pattern matching method. If the detected background dot pattern matches with the background dot pattern representing an anti-copy document, the output of the image data of the original image is prohibited.

A flatbed scanner is generally used when scanning an original image. The flatbed scanner scans and reads an original image of an original sheet placed on a contact glass by moving a moving carriage, and has an image scaling function in which an image is scaled (i.e., magnified or reduced) in a sub-scanning direction. When an image scaling mode is selected by an operator, a background dot pattern included in the image data of an original image scanned by the scanner is also scaled. In this condition, the scaled background dot pattern does not match with the background dot pattern stored in the predetermined storage area, so that the pattern matching cannot be properly performed.

To perform the pattern matching properly, the following two methods are considered: (1) the image data of a scaled original image is normalized to its original size, then, a background dot pattern is detected from the normalized image data; and (2) a plurality of background dot patterns representing an anti-copy document are prepared such that the background dot patterns correspond to scaling ratios set when scanning an original image, and are stored in the predetermined storage area. One of the plurality of background dot patterns stored in the storage area is selected according to the scaling ratio set when scanning an original image, and is used when matching with the scaled background dot pattern included in the image data of the original image scanned by the scanner at a predetermined scaling ratio.

In the first method in which the image data of a scaled original image is normalized to its original size, the pattern matching can be properly performed when magnified image data is normalized to its original size. When normalizing reduced image data, an image is magnified in the sub-scanning direction. In this normalizing processing, the number of lines to be processed and a processing amount per unit time increase. As a result, real-time processing cannot be achieved.

In the second method in which a plurality of background dot patterns representing an anti-copy document are prepared, a large number of background dot patterns need to be prepared according to the scaling ratios. Especially in the magnification, the size of the background dot pattern increases. This causes the increase of a processing amount in the software processing performed when comparing the detected background dot pattern with the background dot pattern representing an anti-copy document, and the increase of the scale of a circuit which performs the software processing. As a result, a real-time processing cannot be achieved.

Therefore, as discovered by the present inventors, it is desirable to provide an image processing apparatus, a program, and a computer-readable storage medium that can perform a real-time processing in the matching of background dot patterns.

Further, in an image processing apparatus, real-time processing is required for image recognition processing, pattern matching processing, and image processing. Therefore, such processing is performed at a high speed by using an ASIC (Application Specific IC) and a processor specially used for image processing, such as a DSP (Digital Signal Processor) and a SIMD (Single Instruction Stream/Multiple Data Stream) processor.

Many Japanese Laid-Open Unexamined Patent Application Publications describe a load of a program or data into a special processor included in the above-described image processing apparatus.

For example, Japanese Laid-Open Unexamined Patent Application Publication, No. 9-244901 describes an image processing apparatus in which a compressed control program is stored in a storage unit, and is selectively decompressed. Japanese Laid-Open Unexamined Patent Application Publication, No. 9-128605 describes a control program for a vending machine which can be rewritten for enhancing maintenance. Japanese Laid-Open Unexamined Patent Application Publication, No. 9-244985 describes a computer system in which a control program is input through a network. Japanese Laid-Open Unexamined Patent Application Publication, No. 2000-123156 describes an image processing apparatus in which an image processing program corresponding to plural areas in image data is loaded into a digital signal processor, and the digital signal processor performs a specified image processing based on the program loaded into the digital signal processor. Japanese Laid-Open Unexamined Patent Application Publication, Nos. 2001-076125 and 2002-207606 describe an image processing apparatus in which image processing programs can be changed and added.

A special processor, such as a DSP and a SIMD processor, includes a program area and a data area for high-speed processing. When performing image recognition processing (e.g., a pattern matching processing) based on image data (e.g., a background dot pattern), an amount of processing program and dictionary data typically becomes large because the processing content of a processing program needs to be changed according to conditions (e.g., a scaling ratio) for reading images and dictionary data (for example, including background dot patterns as pattern matching references) referred for image recognition processing which needs to be changed. Because the capacity of the program area and data area of the special processor is limited, it is difficult to load all the processing program and dictionary data adapted to each condition for reading images into the program area and data area of the special processor in advance.

Therefore, as discovered by the present inventors, it is desirable to provide an image processing apparatus and method that can perform optimum image recognition processing without using a large storage capacity for a program area and data area in a special processor, such as a DSP and a SIMD processor.

In the above-described high-tech digital color copying apparatus, a function of prohibiting a reproduction of an anti-copy document such as a monetary document, a confidential document, etc., is often provided as an optional function for a user who has much concern for security. An anti-copy document detecting unit, such as a monetary document detecting unit, and a confidential document detecting unit, is provided with the copying apparatus as an optional unit. To avoid the illegal copy of monetary document, various techniques have been proposed. For example, Japanese Patent Nos. 2647566, 3032722, and 3032723, and Japanese Laid-Open Unexamined Patent Application Publication, Nos. 6-54185, 7-30748, and 7-322062 describe a technique that a copying operation is performed after a copying apparatus detects the attachment of a monetary document detecting unit to the copying apparatus.

Generally, when an optional function such as a confidential document detecting function, is required to add to a copying apparatus, a confidential document detecting unit or a board equipped with the confidential document detecting unit is attached to the copying apparatus. At this time, a control software program needs to be replaced. If the version number of the control software program increases, a test process increases, and the management of the control software program becomes complicated.

Therefore, as discovered by the present inventors, it is desirable to provide an image processing apparatus, a program, and a computer-readable storage medium that can use an anti-copy document detecting unit as an optional unit without complicated management of a control software program.

BRIEF SUMMARY OF THE INVENTION

According to an aspect of the present invention, an image processing apparatus includes a specific information extracting processor configured to extract specific information that is represented by an image and included in image data, based on a specific information extracting program loaded into the specific information extracting processor. The specific information extracting program is selected from a plurality of specific information extracting programs stored in a storage area. The image processing apparatus further includes a variable factor recognizing mechanism configured to recognize a variable factor of the image data from which the specific information is extracted by the specific information extracting processor, and a first program loading mechanism configured to select one of the plurality of specific information extracting programs which corresponds to the variable factor of the image data recognized by the variable factor recognizing mechanism and is suitable for extracting specific information included in varied image data, and configured to load the selected specific information extracting program into the specific information extracting processor.

According to another aspect of the present invention, an image processing method is performed in an image processing apparatus including a specific information extracting processor that extracts specific information that is represented by an image and included in image data, based on a specific information extracting program loaded into the specific information extracting processor. The specific information, extracting program is selected from a plurality of specific information extracting programs stored in a storage area. The method includes the steps of recognizing a variable factor of the image data from which the specific information is extracted by the specific information extracting processor, selecting one of the plurality of specific information extracting programs which corresponds to the recognized variable factor of the image data and is suitable for extracting specific information included in varied image data, and loading the selected specific information extracting program into the specific information extracting processor.

According to another aspect of the present invention, a program is implemented in an image processing apparatus including a specific information extracting processor that extracts specific information that is represented by an image and included in image data, based on a specific information extracting program loaded into the specific information extracting processor. The specific information extracting program is selected from a plurality of specific information extracting programs stored in a storage area. The program is executed by a controller of the image processing apparatus to carry out the above-described method.

According to another aspect of the present invention, an image processing apparatus includes a specific information extracting processor configured to extract specific information that is represented by an image and included in image data, with reference to dictionary data loaded into the specific information extracting processor. The dictionary data is selected from a plurality of dictionary data stored in a storage area. The image processing apparatus further includes a variable factor recognizing mechanism configured to recognize a variable factor of the image data from which the specific information is extracted by the specific information extracting processor, and a first data loading mechanism configured to select one of the plurality of dictionary data which corresponds to the variable factor of the image data recognized by the variable factor recognizing mechanism and is suitable for extracting specific information included in varied image data, and configured to load the selected dictionary data into the specific information extracting processor.

According to another aspect of the present invention, an image processing method is performed in an image processing apparatus including a specific information extracting processor that extracts specific information included in image data with reference to dictionary data loaded into the specific information extracting processor. The dictionary data is selected from a plurality of dictionary data stored in a storage area. The method includes the steps of recognizing a variable factor of image data from which the specific information is extracted by the specific information extracting processor, selecting one of the plurality of dictionary data which corresponds to the variable factor of the image data and is suitable for extracting specific information included in varied image data, and loading the selected dictionary data into the specific information extracting processor.

According to another aspect of the present invention, a program is implemented in an image processing apparatus including a specific information extracting processor that extracts specific information included in image data with reference to dictionary data loaded into the specific information extracting processor, the dictionary data being selected from a plurality of dictionary data stored in a storage area. The program is executed by a controller of the image processing apparatus to carry out the above-described method.

According to another aspect of the present invention, an image processing apparatus includes a scaling ratio obtaining mechanism configured to obtain information of a scaling ratio of image data of an original image scanned by scaling the original image in a sub-scanning direction, a normalizing mechanism configured to normalize magnified image data to its substantially original size when the scaling ratio obtained by the scaling ratio obtaining mechanism is a magnification ratio, a first detecting mechanism configured to detect if specific information is included in the image data normalized by the normalizing mechanism, a second detecting mechanism configured to detect if specific information is included in the image data of the original image by changing the specific information according to the scaling ratio obtained by the scaling ratio obtaining mechanism when the scaling ratio obtained by the scaling ratio obtaining mechanism is a reduction ratio, and a processing mechanism configured to subject the image data to specific processing when one of the first and second detecting mechanisms detects that the specific information is included in the image data.

According to another aspect of the present invention, a program is executed by a controller of an image processing apparatus to carry out a method including the steps of obtaining information of a scaling ratio of image data of an original image scanned by scaling the original image in a sub-scanning direction, normalizing magnified image data to its substantially original size when the obtained scaling ratio is a magnification ratio, first detecting if specific information is included in the normalized image data, second detecting if specific information is included in the image data of the original image by changing the specific information according to the obtained scaling ratio when the scaling ratio is a reduction ratio, and subjecting the image data to specific processing when the specific information is included in the image data in one of the first and second detecting steps.

According to another aspect of the present invention, a computer-readable storage medium stores a program executed by a controller of an image processing apparatus to carry out the above-described method.

According to yet another aspect of the present invention, an image processing apparatus includes a detecting mechanism configured to detect if specific information is included in image data of a scanned original image based on a program stored in a storage area, and a determining mechanism configured to determine if the detecting mechanism is attached to the image processing apparatus. When the determining mechanism determines that the detecting mechanism is attached to the image processing apparatus, the detecting mechanism starts detecting if the specific information is included in the image data based on the program. The image processing apparatus further includes a processing mechanism configured to subject the image data to specific processing when the detecting mechanism detects that the specific information is included in the image data.

According to yet another aspect of the present invention, a program is executed by a controller of an image processing apparatus to carry out a method including the steps of determining if a detecting mechanism is attached to the image processing apparatus, detecting if specific information is included in image data of a scanned original image based on a program stored in a storage area by the detecting mechanism when the detecting mechanism is attached to the image processing apparatus, and subjecting the image data to specific processing when the detecting mechanism detects that the specific information is included in the image data.

According to yet another aspect of the present invention, a computer-readable storage medium stores a program executed by a controller of an image processing apparatus to carry out the above-described method.

BRIEF DESCRIPTION OF THE DRAWINGS

A more complete appreciation of the present invention and many of the attendant advantages thereof will be readily obtained as the same becomes better understood with reference to the following detailed description when considered in connection with the accompanying drawings, wherein:

FIG. 26 is a schematic illustration of an exemplary 3×3 filter including factors used in MTF correction;

FIG. 27 is a schematic illustration of an exemplary 3×3 filter including factors used in smoothing processing;

FIG. 34A is an enlarged illustration of a dot of its original size that forms a background dot pattern;

FIG. 34B is an enlarged illustration of the dot reduced at 50%;

FIG. 34C is an enlarged illustration of the dot magnified at 125%;

FIG. 35 is an illustration for explaining an exemplary processing of a normalizing mechanism;

DETAILED DESCRIPTION OF THE INVENTION

Figure 1:
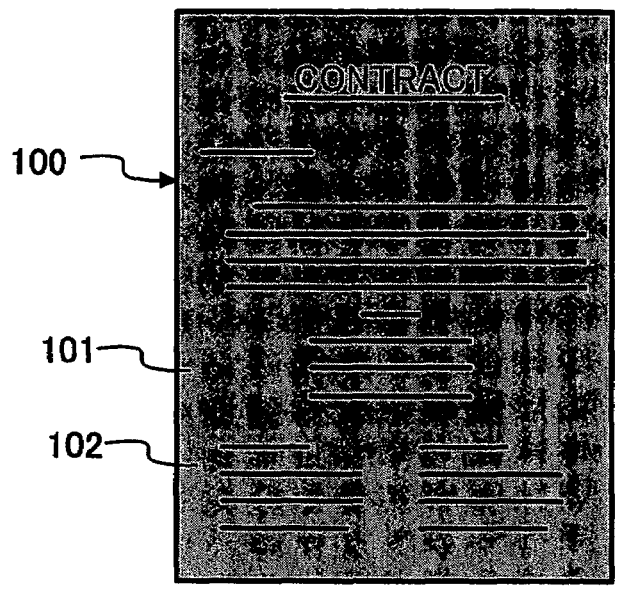
FIG. 1 is an illustration for explaining an original image of an exemplary contract sheet.

Preferred embodiments of the present invention are described in detail referring to the drawings, wherein like reference numerals designate identical or corresponding parts throughout the several views.

Figure 2:
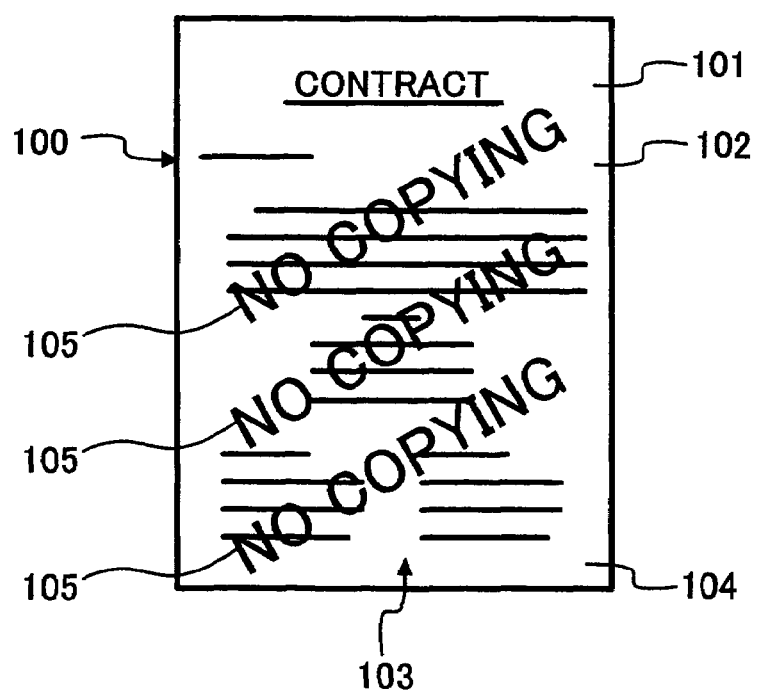
FIG. 2 is an illustration for explaining an exemplary reproduction of the contract sheet of FIG. 1 in which a background dot pattern made as an anti-copy watermark pattern embedded in the original image of the contract sheet appears.
Figure 3:
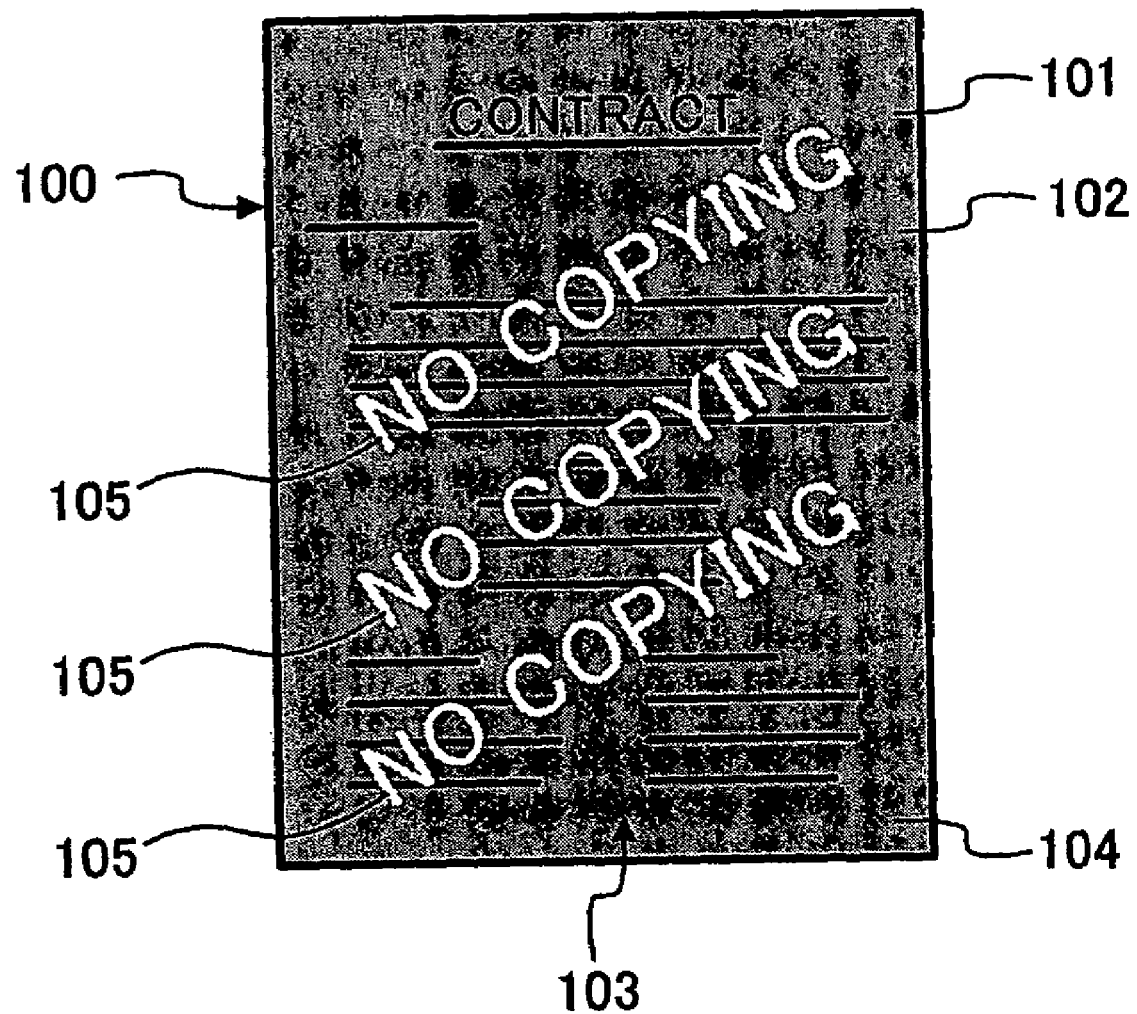
FIG. 3 is an illustration for explaining another exemplary reproduction of the contract sheet of FIG. 1 in which a background dot pattern made as an anti-copy watermark pattern embedded in the original image of the contract sheet appears.

FIG. 1 shows a contract sheet 100 as an example of an anti-copy original document in order to demonstrate one example of a background copy arrangement for allowing a desired part in a background to be copied and other parts in the background to not be copied, for example. The contract sheet 100 includes an original image 101 indicating a specific contract and an original sheet 102 on which the original image 101 is printed. FIG. 2 shows one exemplary copy of the contract sheet 100. In the copy of FIG. 2, a background dot pattern 103 embedded as a background dot pattern in the surface of the original sheet 102 is brought out and appears as a plurality of words "NO COPYING" together with the original image 101. The background dot pattern 103 includes a base area 104 and a plurality of message areas 105. FIG. 3 shows another exemplary copy of the contract sheet 100.

Alternatively, the background dot pattern 103 can be added to the surface of the original sheet 102 when the original image 101 is formed thereon, instead of being previously embedded in the surface of the original sheet 102.

In the background dot pattern 103, the base area 104 represents a background area which is a major portion of the background dot pattern 103. The message areas 105 are the areas distributed within the base area 104 for expressing messages such as the word "NO COPYING," for example. Of course, any other words, phrases, letters, symbols, etc. can be expressed in the message areas 105. The base area 104 and the message areas 105 are not separated based on a structural difference from each other, but are separated based on visual value judgments.

When a copy is made from the contract sheet 100 having the original image 101 printed on the original sheet 102, a part of the background dot pattern 103, that is, either the base area 104 or the message areas 105, appears together with the original image 101. In one case, as illustrated in FIG. 2, the images in the message areas 105 show up and, as a result, the words "NO COPYING" appear in a solid character form. In another case, as illustrated in FIG. 3, the base area 104 shows up and, as a result, the words "NO COPYING" appear in an outline character form.

That is, one of the images in the base area 104 and the message areas 105 is not susceptible to copying (i.e., hereinafter "made against copying"), and the other one of the images in the base area 104 and the message areas 105 is made susceptible to copying. In the copy of FIG. 2, the image in the base area 104 of the background dot pattern 103 is made against copying and the images in the message areas 105 are made susceptible to copying, so that the images of the message areas 105 show up, i.e., the letters "NO COPYING" appear in the solid form. On the other hand, in the copy of FIG. 3, the image in the base area 104 is made susceptible to copying and the images in the message areas 105 are made against copying, so that the image of the base area 104 shows up, i.e., the letters "NO COPYING" appear in the outline character form.

Figure 4A:
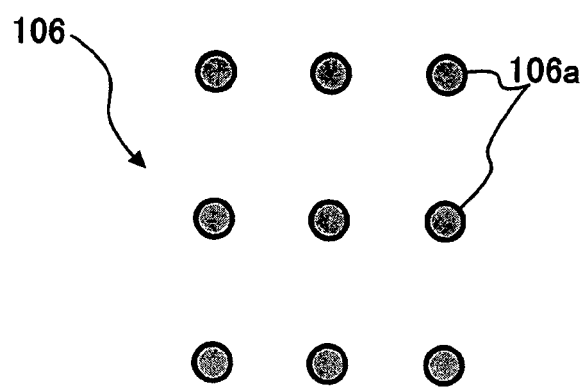
FIGS. 4A and 4B are enlarged illustrations of the background dot pattern of FIG. 3.
Figure 4B:
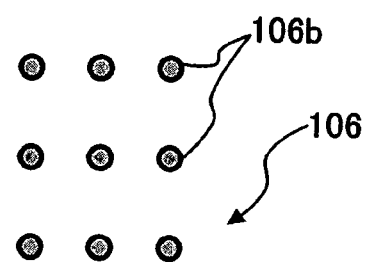
Figure 5A:
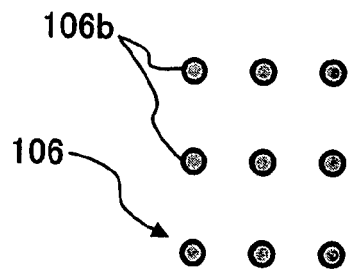
FIGS. 5A and 5B are enlarged illustrations of the background dot pattern of FIG. 2.
Figure 5B:
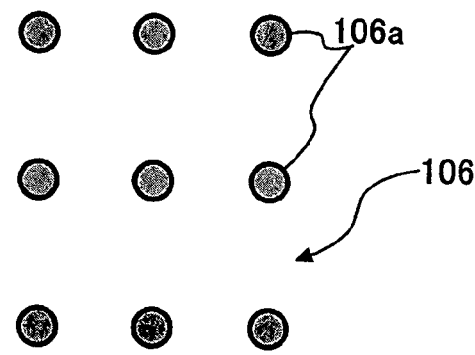

FIGS. 4A and 4B illustrate portions of the base area 104 and the message area 105, respectively, in an enlarged form with respect to the background dot pattern 103 shown in FIG. 3. In contrast, FIG. 5A illustrates a portion of the base area 104 and FIG. 5B illustrates a portion of the message area 105 with respect to background dot pattern 103 shown in FIG. 2. The background dot pattern 103 is made of dots 106 which are classified according to size into groups of dots 106*a* with a relatively large dot size, as illustrated in FIGS. 4A and 5B, and dots 106*b* with a relatively small dot size, as illustrated in FIGS. 4B and 5A; the dots 106*a* have a sufficiently large size to be copied and the dots 106*b* have a sufficiently small size so as not to be copied (i.e., against copying). That is, in the background dot pattern 103 of FIG. 2, the image in the base area 104 is made of the small-sized dots 106*b* and the images in the message areas 105 are made of the large-sized dots 106*a*, as in the case shown in FIGS. 5A and 5B. When such background dot pattern 103 added to the original image 101 is copied, the images in the message areas 105 show up and, as a result, the letters "NO COPYING" appear in a solid character form. In contrast, in FIG. 3, the image in the base area 104 is made of the large-sized dots 106*a* and the images in the message areas 105 are made of the small-sized dots 106*b*, as in the case shown in FIGS. 4A and 4B. That is, as a result of a copy operation, the image in the base area 104 shows up and the letters "NO COPYING" appear in an outline character form.

As an alternative to dot patterns, it is possible to use different patterns such as, for example, a thin line pattern, a specific design pattern, and so forth to form images in the base area 104 and the message areas 105 of the background dot pattern 103.

The present invention arranges the base area 104 or the message areas 105 into a pattern that contains characteristic quantitative information representing a pattern characteristic of image data read from the original image 101. Accordingly, each of the base area 104 and the message areas 105 has specific information. That is, such pattern characteristic of the image data can be used as a piece of specific information. For example, when the image that shows up is formed of dots 106, as described above, it is expressed by a characteristic such as a size, a density (i.e., a number of dots per unit area), or the like. When the image showing up is formed of thin lines, it is expressed by a characteristic of a width of the lines, for example. When the image showing up is formed of specific patterns, it can be expressed by a characteristic of the specific pattern, for example. In embodiments described below, the dot pattern forming the base area 104 or the message areas 105, which shows up, is designed to include characteristic quantitative information so as to represent meaningful specific information.

As an alternative, it is also possible to arrange the image in the base area 104 or the message areas 105 which does not show up, into a pattern that contains characteristic quantitative information. It is further possible to arrange both the image in the base area 104, shown up, and the image in the message areas 105, not shown up, into patterns that respectively contain characteristic quantitative information. That is, when at least one of the images in the base area 104 and the message areas 105, which are either embedded in the original sheet 102 or formed during the time the original image 101 is formed, is computer-readable data, these images can be handled as data expressed as respective characteristic quantitative information when the original image 101 printed on the original sheet 102 is read.

It is also possible to apply a different background dot pattern. For example, the pattern of the base area 104 alone or the message areas 105 alone can be applied as an alternative background dot pattern. Such a background dot pattern made of the base area 104 alone or the message areas 105 alone is either embedded in the original sheet 102 or formed during the time an original image including the pattern is formed. This singular background dot pattern can also be arranged into a pattern that contains characteristic quantitative information if such background dot pattern is computer-readable.

Figure 6A:
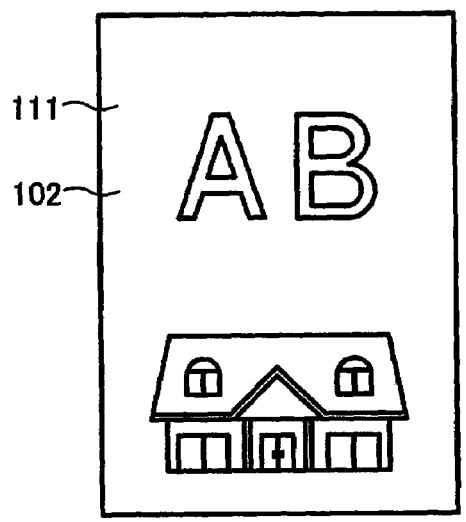
FIGS. 6A and 6B are illustrations of an exemplary expression of another image with a background dot pattern using single-sized dots.
Figure 6B:
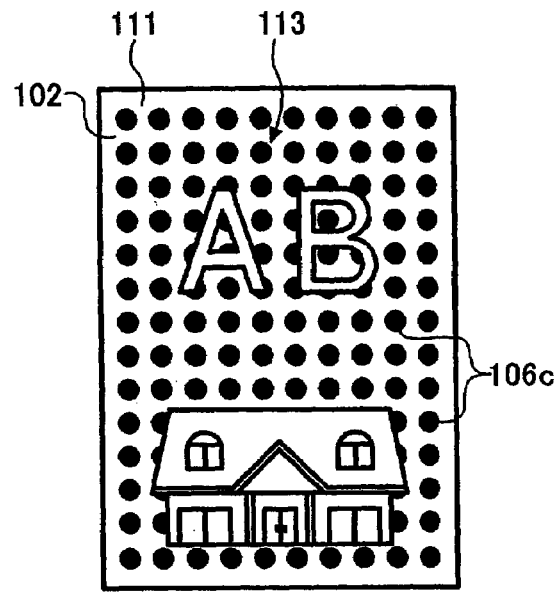
Figure 7A:
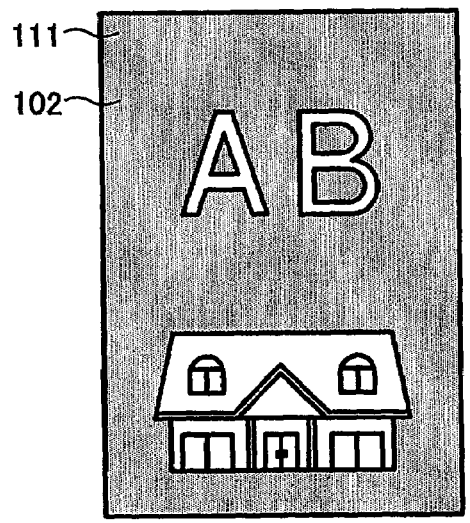
FIGS. 7A and 7B are illustrations of another exemplary expression of the image of FIGS. 6A and 6B.
Figure 7B:
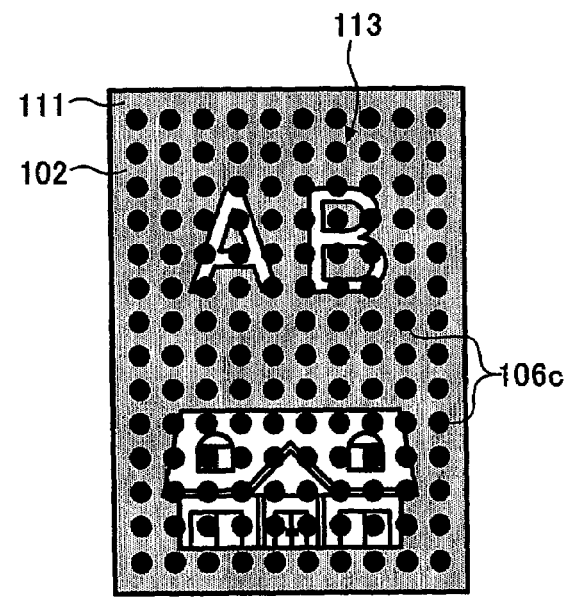

Referring to FIGS. 6A to 7B, additional image examples prepared for the background copy arrangement according to the present invention are explained. As shown in both combinations of FIGS. 6A and 6B and FIGS. 7A and 7B, the original sheet 102 has an original image 111 showing letters "AB" and an illustration of a "house" underneath the letters "AB." Both FIGS. 6B and 7B show a mixed image of the original image 111 and a background dot pattern 113 made up with a plurality of single-sized dots 106*c*. In addition, the original image 111 is arranged in front of the background dot pattern 113 in FIG. 6B but is arranged under the background dot pattern 113 in FIG. 7B. The background dot patterns 113 of FIGS. 6B and 7B can be viewed as a pattern made of the base area 104 alone without having the message area 105 or the message area 105 alone without having the base area 104. These background dot patterns can be processed as characteristic quantitative information as long as these patterns are properly read and distinguished as data from the original image 111.

The above-described background dot patterns are a type of pattern in that characteristic quantitative information is determined based on relationships among the dots that are common in size. More specifically, the characteristic quantitative information applied to the background dot patterns shown in FIGS. 2 to 7B are a dot density (i.e., a dot number in a unit area) and a dot distance between two adjacent dots, which are described below in more details.

To determine the characteristic quantity of a background dot pattern, the dot density of the background dot pattern is sought by counting a number of dots in a unit area of the background dot pattern and verifying the counted dot number with a predetermined threshold value which determines a level of erroneous dot detection or omission. The characteristic quantity of the background dot pattern is then determined based on the dot density obtained. Erroneous dot detection or omission will easily occur when the threshold value is relatively small, but it will not easily occur when the threshold value is relatively large.

The background dot pattern 113 represented in FIG. 6B has some portions which are hidden under the original image 111 and therefore the dots 106*c* in the hidden portion cannot be detected. On the other hand, the background dot pattern 113 represented in FIG. 7B overlays the original image 111 and has no portion hidden under the original image 111; however, the dots 106*c* superimposed over the original image 111 may not easily be detected. In other words, the detection of dot number, i.e., the dot density, depends on the figure of the original image 111. Therefore, when the characteristic quantity of a pattern is determined based on the dot density (i.e., the dot number) and a predetermined threshold value, erroneous dot detection or omission may likely occur to some extent.

Figure 8:
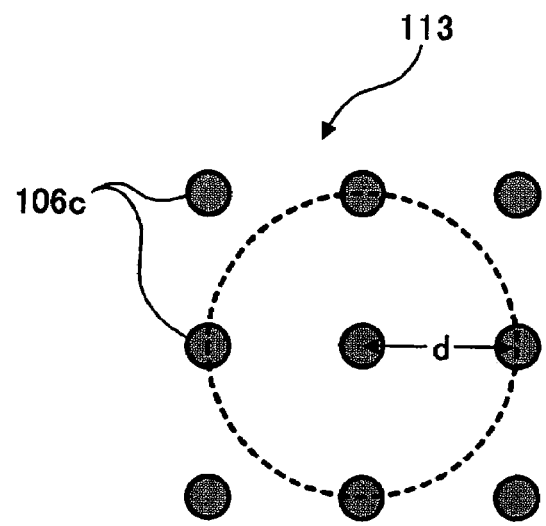
FIG. 8 is an illustration for explaining a dot distance between two adjacent two dots.
Figure 9:
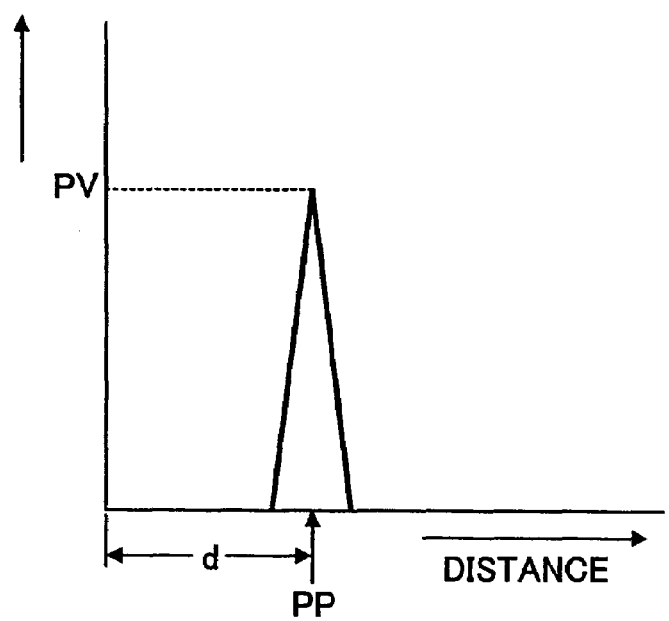
FIG. 9 is a graph representing a relationship between the dot distance and an appearance frequency of the dot distances.

FIG. 8 illustrates an arbitrary portion of the background dot pattern 113 in which any two adjacent dots 106*c* are spaced apart by a predetermined dot distance "d". This predetermined dot distance "d" can represent a characteristic quantity of the background dot pattern 113. In the background dot pattern 113 of FIG. 8, one dot of interest (i.e., the focused dot) among the dots 106*c* is surrounded by four other dots with the same predetermined dot distance "d". Using this dot distance "d", the characteristic quantity of the background dot pattern can properly be detected even if the pattern is like the one shown in FIG. 6B or 7B, for example. When a plurality of distances between the adjacent dots 106*c* are measured after the dots 106*c* are detected from the background dot pattern 113, for example, a relationship between the measured dot distances "d" and a frequency of appearance of each measured dot distance can be represented by the graph of FIG. 9, in which the horizontal axis is the measured dot distance "d" and the vertical axis is the frequency of appearance of each measured dot distance. The graph shows a reverse-V-like shape with the center representing a peak-to-peak (PP) distance (i.e., the predetermined dot distance "d") and the top representing a peak value (PV) of a number of occurrences. The reason why the distribution in this graph disperses from the PP distance is that, by taking the instance of FIG. 8, the distances between the four surrounding dots and the focused dot happen to be unequal to the predetermined dot distance "d".

Therefore, when the distances between the surrounding dots and the focused dot are measured, the measurement result is verified with a predetermined threshold value for the predetermined dot distance "d" so that the characteristic quantity with respect to the predetermined dot distance "d" can be determined in a more accurate manner. In this case, as is clear from FIG. 9, erroneous dot detection or omission will easily occur when the threshold value is relatively small, but it will not easily occur when the threshold value is relatively great.

Figure 10A:
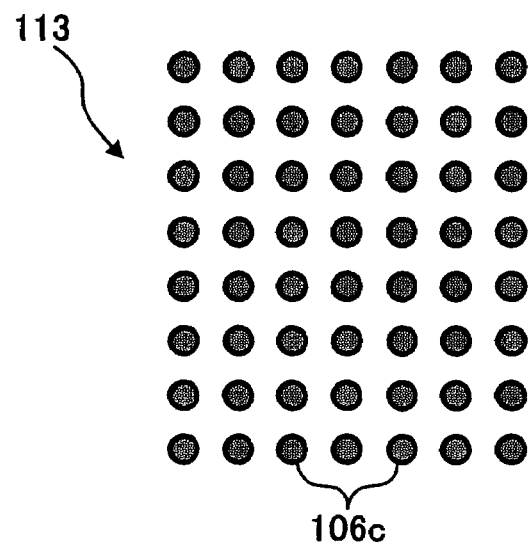
FIGS. 10A and 10B are illustrations for explaining an arrangement of dots wherein distances between any two adjacent dots are substantially equal to each other.
Figure 10B:
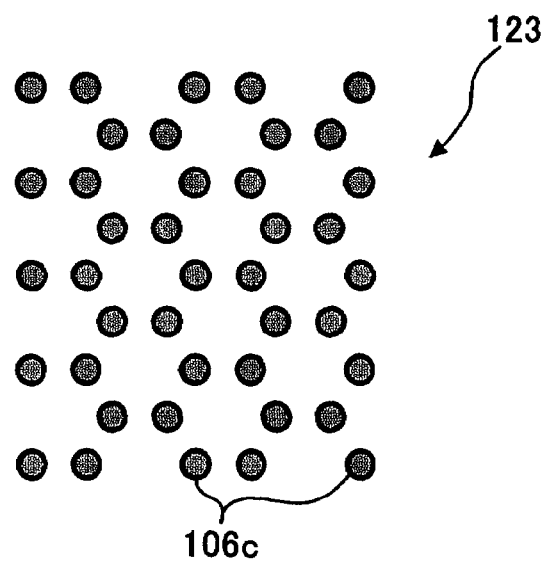

The pattern illustrated in FIG. 10A is the same background dot pattern 113 of FIG. 8, in which the distances between any two adjacent dots in the pattern are equal to each other. In this case, the characteristic quantity relates to the distances between the surrounding dots and the focused dot. FIG. 10B shows a pattern in which a background dot pattern 123 has a dot arrangement different from the FIG. 10A case, but the distances between any two adjacent dots in the background dot pattern 123 are still equal to each other. For reference sake, the dot density of the background dot pattern 113 of FIG. 10A is different from that shown in FIG. 10B.

Assuming that the predetermined dot distance "d" between any two adjacent dots is constant, the background dot patterns of FIGS. 10A and 10B are not distinguishable from each other by using the predetermined dot distance d as the characteristic quantity. The background dot pattern of FIG. 10A forms dots 106c in a way such that any dot 106c of interest is surrounded by four other dots 106c with an equal distance "d" from the dot 106c of interest. The background dot pattern of FIG. 10B forms dots 106c in a way such that any dot 106c of interest is surrounded by three other dots 106c with an equal distance from the dot 106c of interest. For these background dot patterns, the use of dot density as the characteristic quantity can allow a successful pattern detection with a high fidelity; however, the use of dot distance as the characteristic quantity does not lead to a successful pattern detection. For example, one case may be such that a detection of the background dot pattern 113 of FIG. 10A is attempted from the original image 101 which actually includes the background dot pattern 123 of FIG. 10B but not the background dot pattern 113. Another case may be such that a detection of the background dot pattern 123 of FIG. 10B is attempted from the original image 101 which actually includes the background dot pattern 113 of FIG. 10A but not the background dot pattern 123. In other words, the number of occurrences of over-detection will be increased when the background dot pattern 113 or 123 in which a constant dot distance "d" of adjacent dots is used as a test pattern to be detected from the original image.

Figure 11:
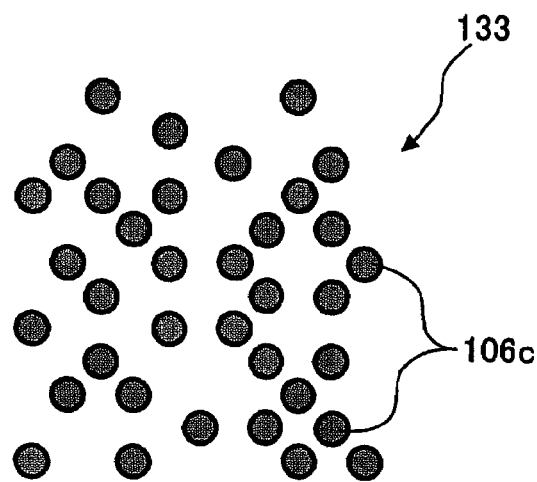
FIG. 11 is an illustration for explaining another arrangement of dots in which more than one different distances between two adjacent dots are provided.
Figure 12:
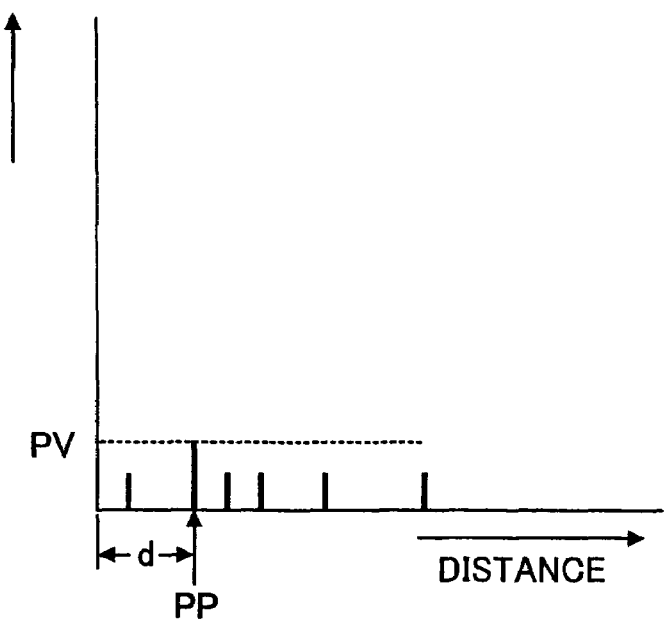
FIG. 12 is a graph representing a relationship between the dot distance and an appearance frequency of the dot distances for the FIG. 11 case.

FIG. 11 shows another background dot pattern 133 devised from the above consideration in order to be able to properly detect a background dot pattern even in the cases described above. The background dot pattern 133 is prepared based on the characteristic quantity using a plurality of different dot distances and a plurality of different appearance frequencies of the measured dot distances. The background dot pattern 133 can be represented by the graph of FIG. 12, which shows a distribution of the peak value PV with respect to the dot distances "d" between two adjacent dots as a characteristic quantity. With this arrangement, the background dot pattern 133 can properly be detected without occurrence of over-detection.

Figure 13:
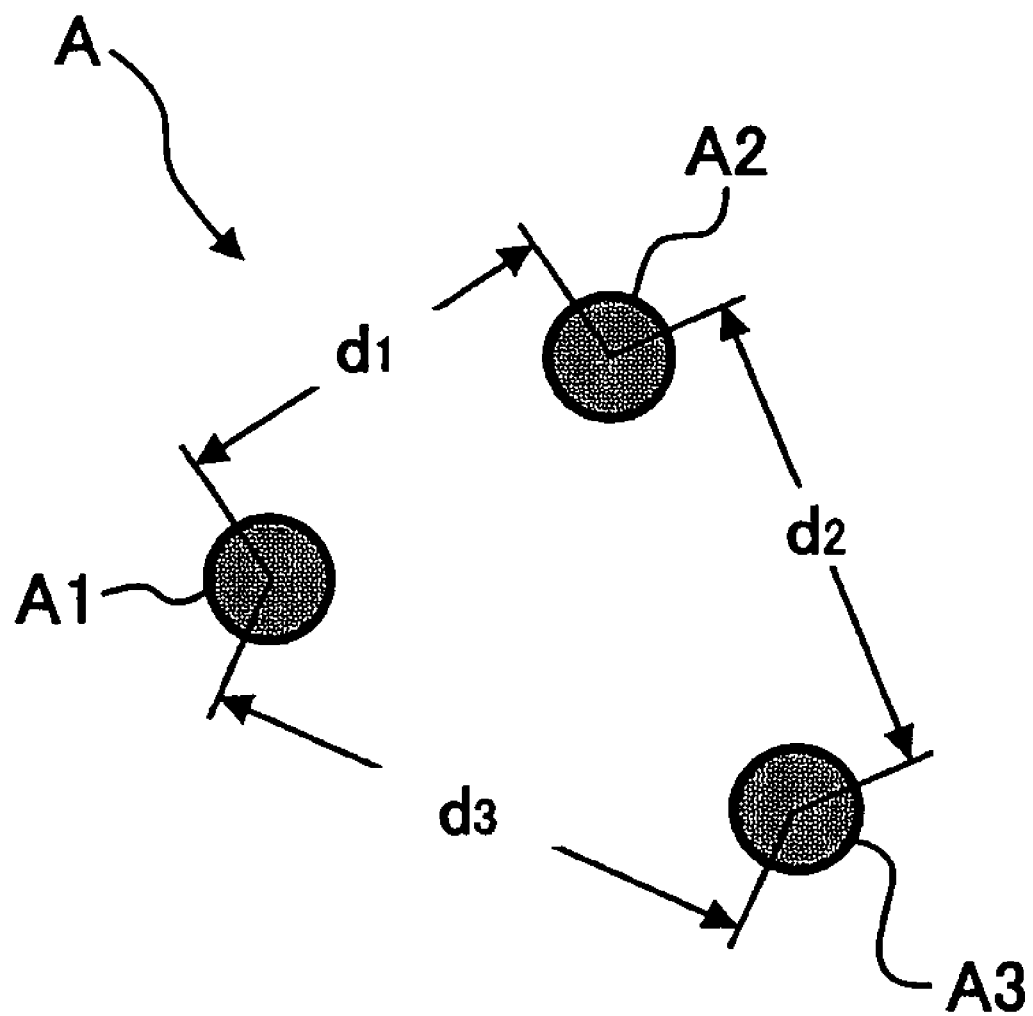
FIG. 13 is an illustration for explaining another arrangement of dots.
Figure 14A:
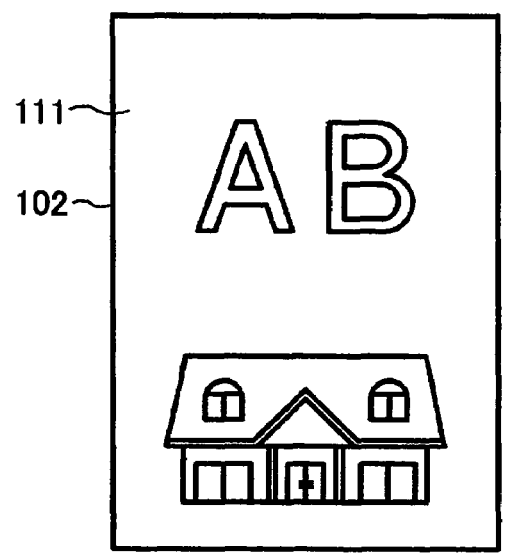
FIGS. 14A and 14B are illustrations of another image by applying the dots of FIG. 13.
Figure 14B:
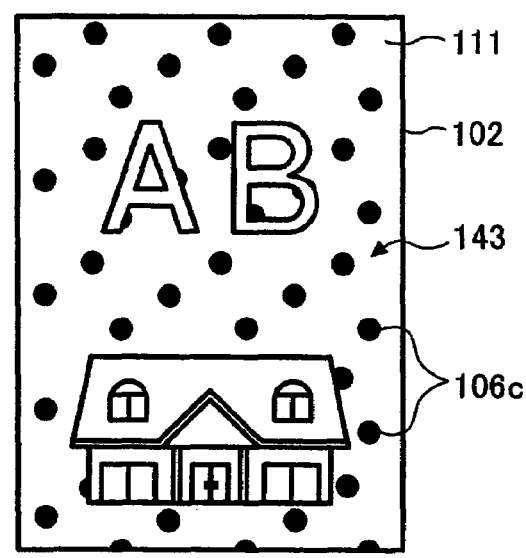

Referring to FIG. 13, another example of a characteristic quantity is explained. FIG. 13 shows a basic unit A of three dots A1, A2, and A3. In the basic unit A, the three dots A1, A2, and A3 are arranged such that a distance d1 between the dots A1 and A2, a distance d2 between the dots A2 and A3, and a distance d3 between the dots A3 and A1 are different from each other. A background dot pattern 143 (FIG. 14B) made of a number of basic units A can readily be detected with, for example, pattern matching or the like. The basic unit A and the background dot pattern 143 formed as an aggregation of the basic units A have a characteristic quantity. The background dot pattern 143 can have a characteristic quantity based on a dot density in a unit area with respect to the basic unit A, for example. FIG. 14A demonstrates a manner in which the original image 111 is printed on the original sheet 102, and FIG. 14B shows a manner in which the background dot pattern 143 is printed under the original image 111.

The background dot pattern 103, 113, 123, 133, or 143 is merely one exemplary dot pattern included in image data and which represents specific characteristic information. The specific characteristic information may be an expression of lines other than dots or other forms or other characteristic than forms, associated with an image, such as colors or the like. Further, examples of characteristic of image to be extracted may include information included in image data, such as identification (ID) information of an original image, and information attached to an original image such as a person who prepared an original image. Further, examples of characteristic of image may include a category of an original image.

Figure 15:
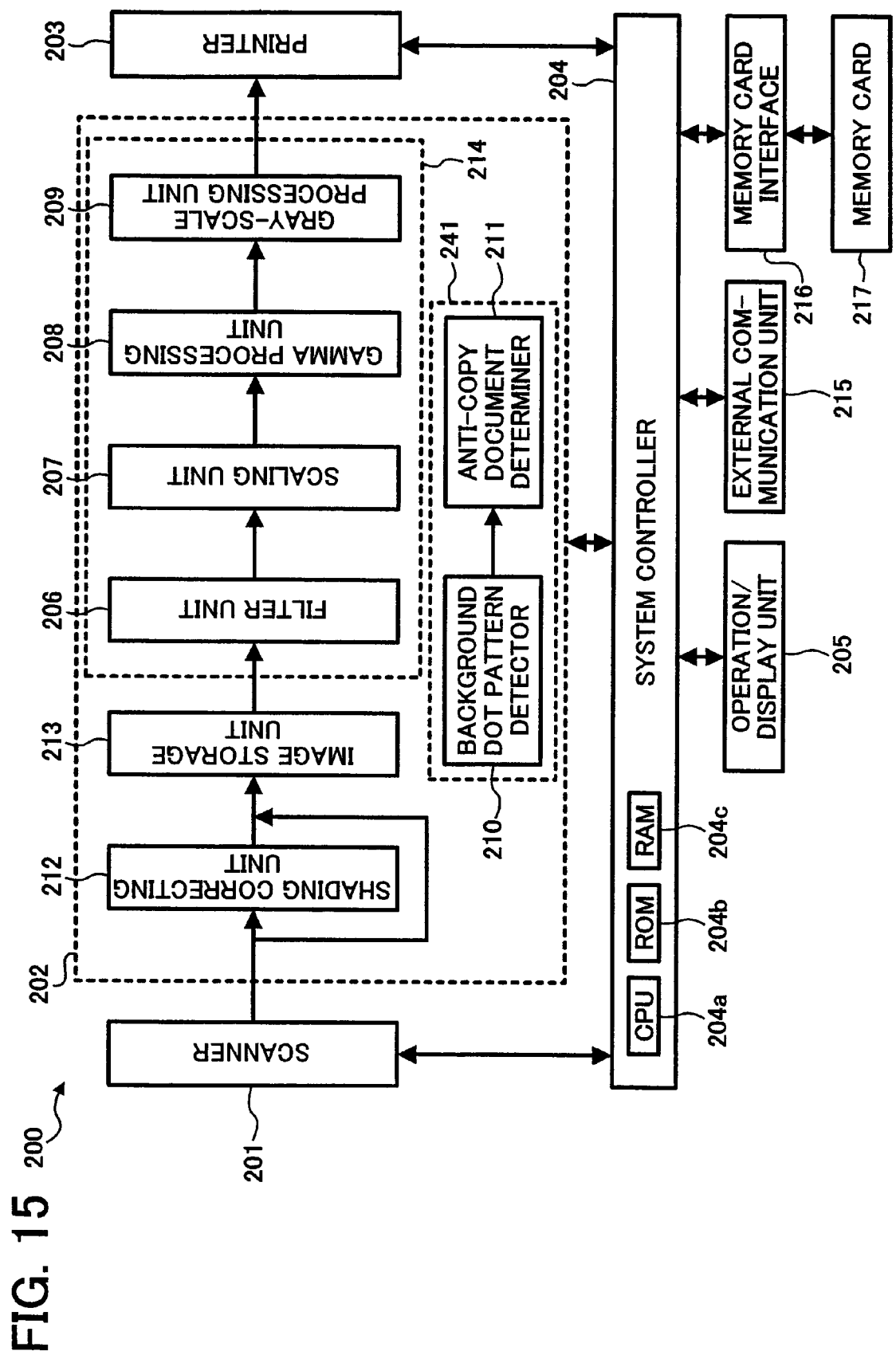
FIG. 15 is a schematic block diagram of an image processing apparatus according to an exemplary embodiment of the present invention.

Next, an image processing apparatus 200 as one example of an embodiment according to the present invention is described with reference to FIG. 15. FIG. 15 shows the image processing apparatus 200 configured to detect the above-described background dot pattern so as to perform a copy protection operation of the invention. As shown in FIG. 15, the image processing apparatus 200 includes a scanner 201 acting as an image input device, an image processor 202 formed from a digital circuit, a specific information extracting processor 241 acting as a special processor, such as a DSP (digital signal processor), and a SIMD (Single Instruction Stream/Multiple Data Stream) processor, a printer 203, a system controller 204, an operation/display unit 205, an external communication unit 215, and a memory card interface 216. The system controller 204 forms a part of a computer which is a general personal computer, and includes a CPU (central processing unit) 204a, a ROM (read only memory) 204b, and a RAM (random access memory) 204c. By using computing functions achieved with these components, the system controller 204 controls the entire operations of the scanner 201, the image processor 202, and the printer 203 according to the instructions input through the operation/display unit 205, and displays information on the operation/display unit 205.

Figure 16:
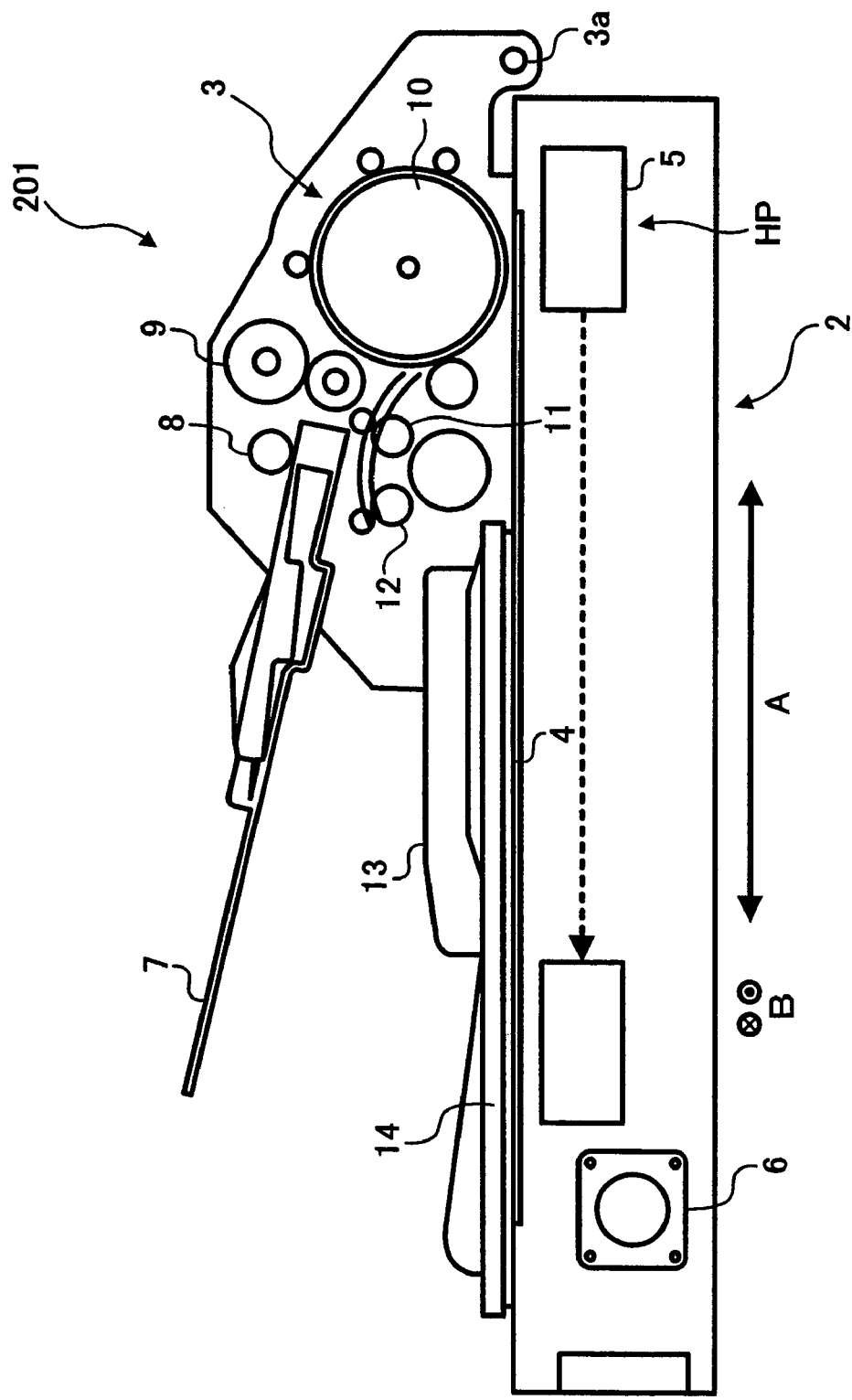
FIG. 16 is a schematic diagram of a scanner included in the image processing apparatus of FIG. 15.

Referring to FIG. 16, the scanner 201 is now described in more detail. FIG. 16 shows the scanner 201 as including a main body 2 and an ADF (automatic document feeder) 3. The main body 2 includes a contact glass 4, an optical scanning unit 5, a drive motor 6, a sheet discharging tray 13, and a platen cover 14. The ADF 3 includes an original tray 7, a pick-up roller 8, a pair of registration rollers 9, a transfer drum 10, a pair of transfer rollers 11, and a pair of sheet discharging rollers 12. The ADF 3 is mounted on the main body 2 with a support shaft 3a such that the ADF 3 is movable about the support shaft 3a to selectively operate in a sheet-scan mode (also referred to as an ADF mode) and a book-scan mode. The contact glass 4 on which an original (e.g., the contract sheet 100) is disposed at a position on the main body 2 underneath the platen cover 14 and facing the optical scanning unit 5 disposed inside the main body 2. The optical scanning unit 5 is generally referred to as a close-contact image sensor and includes a light source (not shown) and a line sensor (not shown) which includes a plurality of charge coupled devices which are arranged in line to cover a width of an original (e.g., the contract sheet 100). In FIG. 16, direction A is referred to as a sub-scanning direction in which the optical scanning unit 5 is moved in the book-scan mode or the original is moved in the sheet-scan mode. Direction B (i.e., direction perpendicular to the surface of FIG. 16) is referred to as a main scanning direction in which the plurality of the charge coupled devices are arranged in line. The optical scanning unit 5 is driven by the drive motor 6 (e.g., a stepping motor) via pulleys and wires so as to move in the sub-scanning direction A.

The optical scanning unit 5 is usually located at a home position "HP" and is moved in a direction towards the drive motor 6, as indicated by a dotted line with an arrow. During the movement in the direction towards the drive motor 6, the optical scanning unit 5 scans and reads the original image 101, for example, placed on the contact glass 4 by irradiating the original image 101, for example, with light from the light source and receiving the reflected light from the original image 101 with the plurality of charge coupled devices. This operation is in the book-scan mode.

In the sheet-scan mode, the optical scanning unit 5 is held at the home position "HP" while scanning and reading the original image 101 which is moved instead in the sub-scanning direction A over the plurality of charge coupled devices with the pick-up roller 8, the pair of registration rollers 9, the transfer drum 10, the pair of transfer rollers 11, and the pair of sheet discharging rollers 12. After the scanning and reading by the optical scanning unit 5, the original is discharged to the sheet discharging tray 13 by the pair of sheet discharging rollers 12. The sheet discharging tray 13 is disposed on the platen cover 14, and the platen cover 14 is movably held on the main body 2 so as to make a wide access area relative to the contact glass 4 when it is moved into an open position. The ADF 3 further includes a drive motor (not shown) which drives the pick-up roller 8, the pair of registration rollers 9, the transfer drum 10, the pair of transfer rollers 11, and the pair of sheet discharging rollers 12 via a series of gears (not shown).

The scanner 201 can change a scanning scaling ratio when scanning and reading the original image 101 by changing the moving speed of the optical scanning unit 5 in the book-scan mode or by changing the moving speed of the original sheet 102 in the sheet-scan mode.

Next, the image processor 202 is described. The image processor 202 includes a shading correcting unit 212, an image storage unit 213, a filter unit 206, a scaling unit 207, a gamma processing unit 208, and a gray-scale processing unit 209. The filter unit 206, the scaling unit 207, the gamma processing unit 208, and the gray-scale processing unit 209 form a pre-processing unit 214.

The scaling unit 207 in the pre-processing unit 214 performs a MTF (modulation transfer function) correction and a smoothing processing when performing a scaling processing. In the scaling processing, an image is magnified or reduced by increasing or decreasing the number of pixels of image data in a main scanning direction and a sub-scanning direction. For example, a nearest neighbor interpolation method and a linear interpolation method are known as non-liming examples of the scaling processing. In the nearest neighbor interpolation method, a scaled image is set to have an image pixel density which is the closest to an image pixel density of the image before being scaled. This method is simple and allows high speed processing. However, image quality tends to be deteriorated, that is, an image typically includes noise. Accordingly, when using the nearest neighbor interpolation method, it is preferable that the MTF correction for subjecting image data thereto should be relatively low. In contrast, in the linear interpolation method, image data is set to new image density calculated based on the density of plural pixels located close to image data before being scaled. This method is complicated and takes a relatively long time for processing. However, a smooth image can be obtained. Accordingly, when using the linear interpolation method, it is preferable that the MTF correction for subjecting image data thereto should be relatively high. For smoothing processing, it is preferable that smoothness should be increased in the nearest neighbor interpolation method, and smoothness should be decreased in the linear interpolation method. With regard to a scaling ratio, it is preferable that a smoothness should be decreased as magnification ratio increases, and a smoothness should be increased as magnification ratio decreases.

The components other than the scaling unit 207, such as the filter unit 206, the gamma processing unit 208, the gray-scale processing unit 209, the shading correcting unit 212, and the image storage unit 213, are substantially equivalent to and have no substantial differences from those circuits employed in a general digital copying machine and therefore a description for these components are omitted.

The image processor 202 includes a background dot pattern detector 210 and an anti-copy document determiner 211. These components detect an anti-copy document such as the contract sheet 100, for example, and prohibit a reproduction of such anti-copy document when it is detected. The background dot pattern detector 210 and the anti-copy document determiner 211 are provided in the specific information extracting processor 241, such as a DSP and a SIMD processor.

Figure 17:
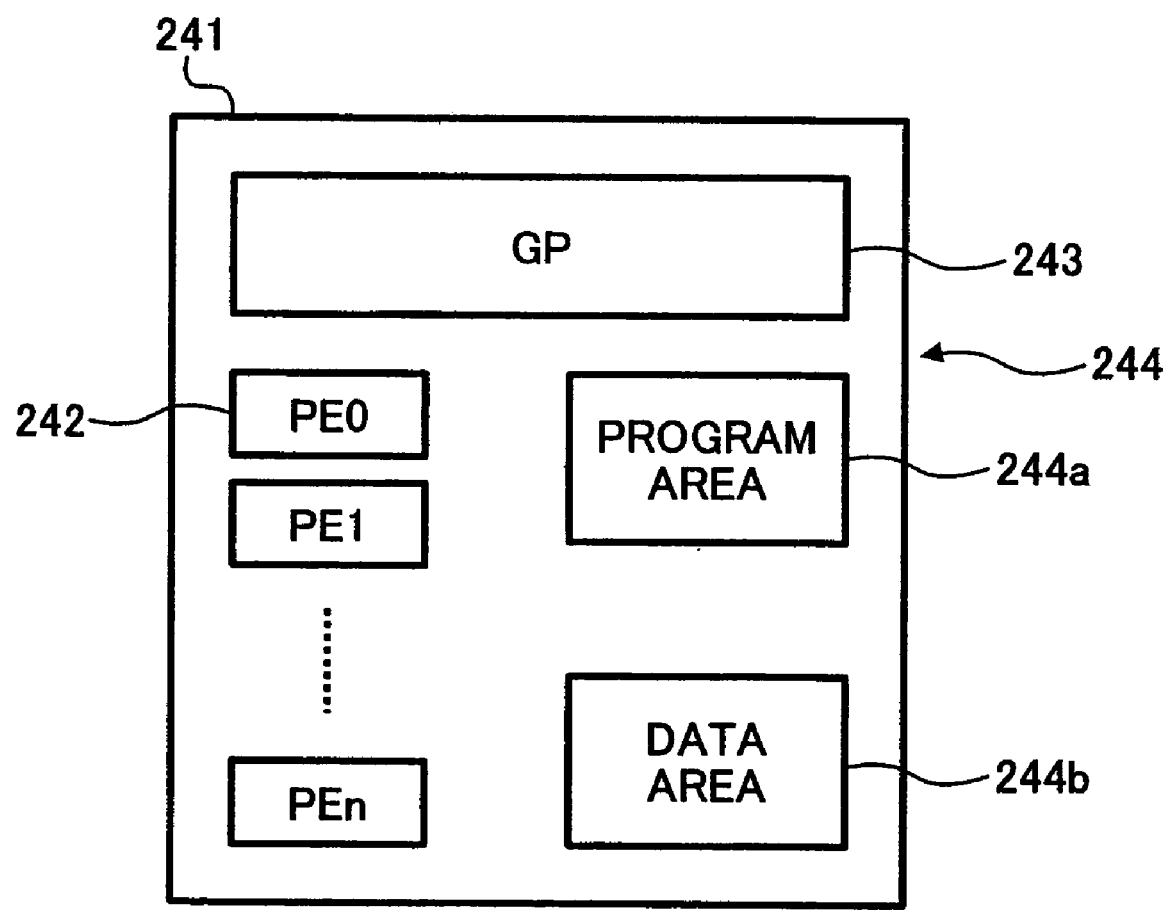
FIG. 17 is a schematic diagram of a specific information extracting processor included in the image processing apparatus of FIG. 15.

FIG. 17 is a schematic diagram of the specific information extracting processor 241. The specific information extracting processor 241 includes a plurality of processor elements 242 (PE0, PE1, . . . PEn), a global processor (GP) 243, and a memory area 244. Each of the processor elements 242 is a basic unit for processing executed in parallel. The global processor 243 performs an entire control. The memory area 244 includes a program area 244a and a data area 244b. In the specific information extracting processor 241, a program for extracting specific information is loaded into the program area 244a, and data, such as dictionary data, necessary for reference when extracting specific information from the image data of the original image 101 is loaded into the data area 244b. The specific information extracting processor 241 performs a specific information extracting processing based on the program loaded in the program area 244a to extract specific information from the image data of the original image 101 with reference to data such as dictionary data.

FIGS. 18A through 18D are schematic block diagrams of the background dot pattern detector 210 included in the image processing apparatus of FIG. 15. The background dot pattern detector 210 performs the following processing: (1) detecting a dot density as a characteristic quantity of the background dot pattern 103 for an anti-copy document implanted in the image data of the original image 101; (2) comparing the detected dot density as the characteristic quantity with a reference characteristic quantity of a reference anti-copy dot pattern prestored in the data area 244b, and (3) performing an identification check for determining whether the detected dot density as the characteristic quantity is identical to the reference characteristic quantity. The processing for extracting specific information from the image data of the original image 101 includes these processing. Other than a dot density, a dot distance between adjacent two dots, a specific dot pattern, a dot density per a unit area of a specific dot pattern can be set as the above-described characteristic quantity.

Figure 18A:
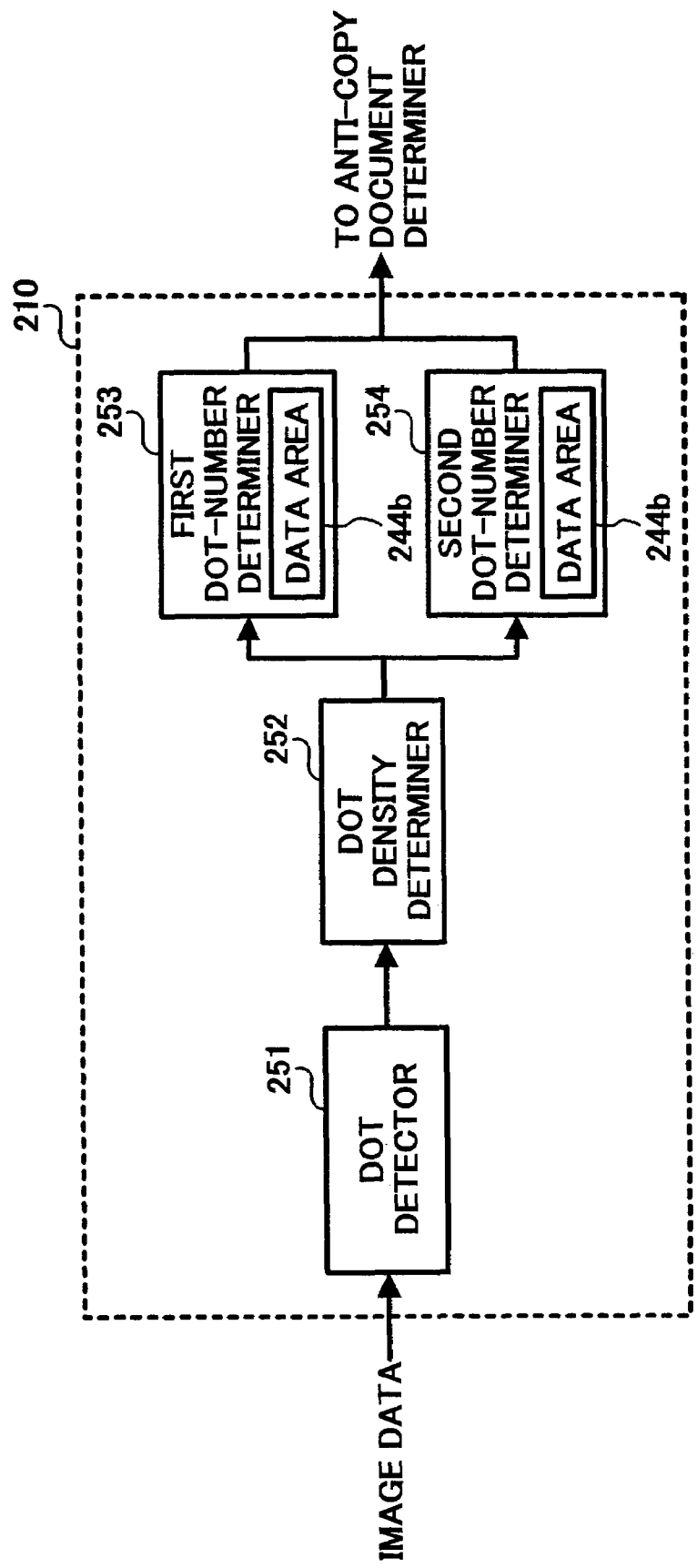
FIGS. 18A through 18D are schematic block diagrams of a background dot pattern detector included in the image processing apparatus of FIG. 15.

To perform these processing, the background dot pattern detector 210 stores a reference characteristic quantity of a reference anti-copy dot pattern as a part of dictionary data in the data area 244b, and has an exemplary configuration as shown in FIG. 18A. As shown in FIG. 18A, the background dot pattern detector 210 includes a dot detector 251, a dot density determiner 252, a first dot-number determiner 253, and a second dot-number determiner 254. The dot detector 251 detects the dots 106 from the image data generated based on the readings of the original image 101 by the scanner 201. An actual method of the detection is selected from among various known techniques for detecting image patterns with digital circuits, such as a pattern matching technique, for example. After the detection of the dots 106, the dot density determiner 252 calculates a dot density within a specific area with respect to the dots 106 detected by the dot detector 251. This calculation can be performed using digital counters, adders, and so on.

In the background dot pattern detector 210, each of the first dot-number determiner 253 and the second dot-number determiner 254 includes the data area 244b. The first dot-number determiner 253 stores a first base area threshold value to be used as a permissible value in the identification determination relative to a dot density detected in a specific unit area of the base area 104 in the background dot pattern 103 in the data area 244b as a part of the dictionary data. The first dot-number determiner 253 also stores a second base area threshold value to be used as a permissible value in the identification determination relative to a dot number detected in the base area 104 in the background dot pattern 103 in the original sheet 102 in the data area 244b as a part of the dictionary data.

The second dot-number-determiner 254 stores a first message area threshold value to be used as a permissible value in the identification determination relative to a dot density detected in a specific unit area of the message area 105 in the background dot pattern 103 in the data area 244b as a part of the dictionary data. The second dot-number determiner 254 also stores a second message area threshold value to be used as a permissible value in the identification determination relative to a dot number detected in the message area 105 in the background dot pattern 103 in the data area 244b as a part of the dictionary data.

The first dot-number determiner 253 accumulates the number of dots 106 in a counter (not shown), for example, which are determined as the identical size, i.e., the dots 106a or the dots 106b, by the dot detector 251, when determining that the density of dots 106 calculated by the dot density determiner 252 is smaller than the first base area threshold value with respect to the dot density stored in the data area 244b. The first dot-number determiner 253 then determines that the base area 104 of the background dot pattern 103 exists when the accumulated dot number is checked out as smaller than the second base area threshold value with respect to the dot number stored in the data area 244b. The first dot-number determiner 253 transmits the determination result to the anti-copy document determiner 211.

The second dot-number determiner 254 accumulates the number of dots 106 in a counter (not shown), for example, which is determined as the identical size, i.e., the dots 106a or the dots 106b, by the dot detector 251, when determining that the density of dots 106 calculated by the dot density determiner 252 is smaller than the first message area threshold value with respect to the dot density stored in the data area 244b. The second dot-number determiner 254 then determines that the message area 105 of the background dot pattern 103 exists when the accumulated dot number is checked out as smaller than the second message area threshold value with respect to the dot number stored in the data area 244b. The second dot-number determiner 254 transmits the determination result to the anti-copy document determiner 211.

Upon receiving the determination result from the background dot pattern detector 210, the anti-copy document determiner 211 performs the determination process for determining whether the present document is an anti-copy document with reference to a predefined standard. This standard can be, for example, established by being input as parameters as a part of the dictionary data through the operation/display unit 205 and is stored in the data area 244b. For example, the anti-copy document determiner 211 determines that the present document is an anti-copy document like a confidential document when determining that one of the base area 104 and the message area 105 of the background dot pattern 103 exists in the original image 101 read by the scanner 201. For another example, the anti-copy document determiner 211 determines that the present document is an anti-copy document like a confidential document when determining that both of the base area 104 and the message area 105 of the background dot pattern 103 exist in the original image 101 read by the scanner 201.

Figure 18B:
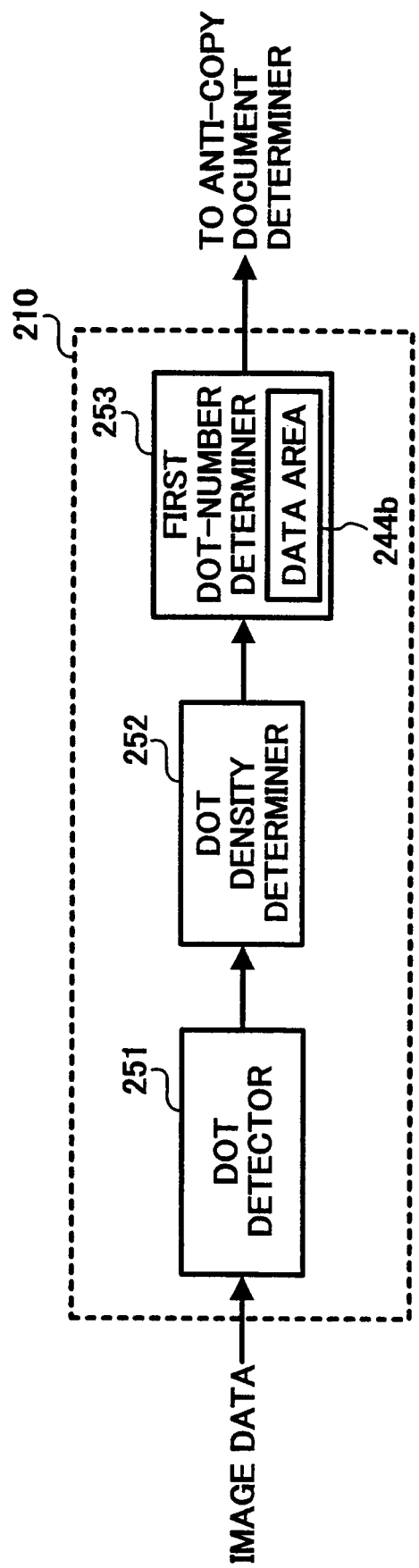
Figure 18C:
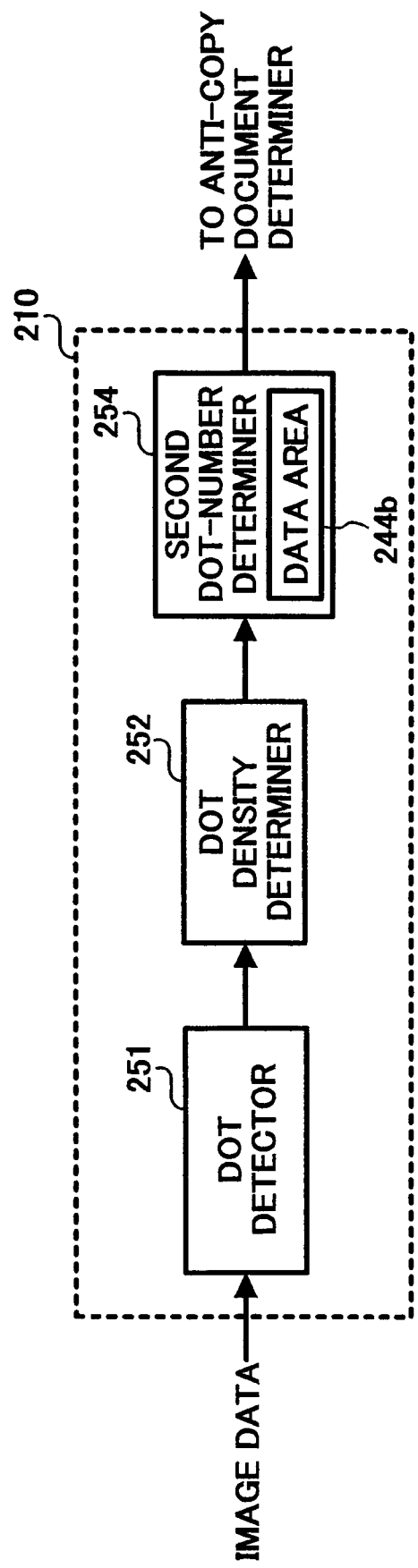

When the anti-copy document determiner 211 is set to the condition for determining that the present document is an anti-copy document when one of the base area 104 and the message area 105 of the background dot pattern 103 is determined as existing in the original image 101, there is no need to provide both of the first dot-number determiner 253 and the second dot-number determiner 254 in the background dot pattern detector 210. When the base area 104 is used and the message area 105 is not used for the anti-copy document determining condition, it is necessary that the background dot pattern detector 210 includes the first dot-number determiner 253 but not the second dot-number determiner 254, as shown in FIG. 18B. When the message area 105 is used and the base area 104 is not used for the anti-copy document determining condition, it is necessary that the background dot pattern detector 210 includes the second dot-number determiner 254 but not the first dot-number determiner 253, as shown in FIG. 18C.

Figure 18D:
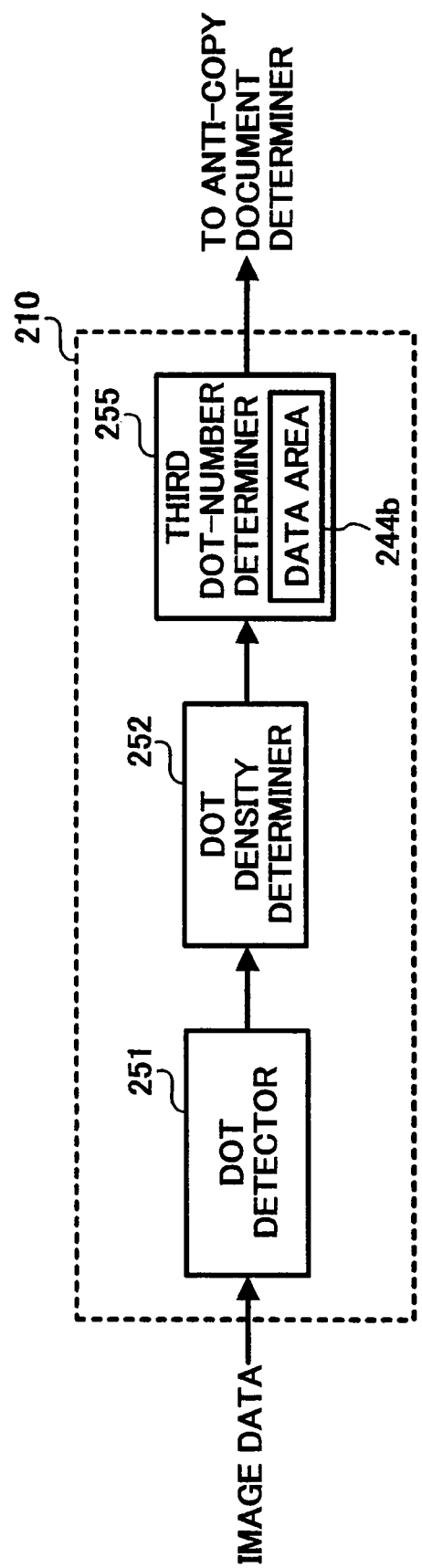

Further, when the original sheet 102 has the original image 111 and the background dot pattern 113 made up with the plurality of single-sized dots 106c as shown in FIGS. 6B and 7B and is determined whether it is an anti-copy document, there is no need to provide both of the first dot-number determiner 253 and the second dot-number determiner 254, but only a third dot-number determiner 255 needs to be provided in the background dot pattern detector 210 as shown in FIG. 18D. The third dot-number determiner 255 stores a first threshold value to be used as a permissible value in the identification determination relative to a dot density detected in a specific unit area of the background dot pattern 113 in the data area 244b. The third dot-number determiner 255 also stores a second threshold value to be used as a permissible value in the identification determination relative to a dot number detected in the background dot pattern 113 in the original sheet 102 in the data area 244b.

The third dot-number determiner 255 accumulates the number of dots 106c in a counter (not shown), for example, which are determined as the identical size, by the dot detector 251, when determining that the density of dots 106c calculated by the dot density determiner 252 is smaller than the first threshold value with respect to the dot density stored in the data area 244b. The third dot-number determiner 255 then determines that the background dot pattern 113 exists when the accumulated dot number is checked out as smaller than the second threshold value with respect to the dot number stored in the data area 244b. The third dot-number determiner 255 transmits the determination result to the anti-copy document determiner 211.

As described above, upon receiving the determination result from the background dot pattern detector 210, the anti-copy document determiner 211 performs the determination process for determining whether the present document is an anti-copy document with reference to a predefined standard. For example, the anti-copy document determiner 211 determines that the present document is an anti-copy document like a confidential document when the third dot-number determiner 255 transmits the determination result to the anti-copy document determiner 211 such that the background dot pattern 113 exists in the original image 111 read by the scanner 201.

Thus, in the image processor 202 formed from a digital circuit of the present embodiment, the background dot pattern detector 210 detects from the image data the background dot pattern 103 embedded in the background image which is included in the image data of the original image 101. Then, the background dot pattern detector 210 compares a dot density as a characteristic quantity with a reference characteristic quantity representing a reference anti-copy dot pattern prestored in the data area 244b, thereby performing the identification determination with respect to the anti-copy document. With this operation, the present embodiment can determine whether it is permissible to output the image data of the original image 101, regardless of the types of the original image, by performing an identification check for determining whether the detected dot density as the characteristic quantity is identical to the reference characteristic quantity.

The anti-copy document determiner 211 receives the results of the identification check and determines whether the image data under examination is an anti-copy document based on the results of the identification check sent from the background dot pattern detector 210. When determining that the image data read from the original image 101 is an anti-copy document, the anti-copy document determiner 211 transmits to the system controller 204 a signal indicating that an anti-copy document is detected.

Upon detecting such signal from the anti-copy document determiner 211, the system controller 204 prohibits reproduction of the image data under process by the printer 203. Specifically, when the system controller 204 determines that the image data read from the original image 101 by the scanner 201 is an anti-copy document, that is, the system controller 204 determines that the characteristic quantity of the detected background dot pattern 103 is identical to the reference characteristic quantity representing a reference anti-copy dot pattern prestored in the data area 244b, the system controller 204 prohibits reproduction of the image data. Thereby, the image processing apparatus 200 can prohibit reproduction of the image data thus determined as an anti-copy document.

The above-described copy prohibition is one exemplary way of prohibiting an output of a copy-prohibited document. As an alternative, particularly in a system in which a scanned document, even a copy-prohibited document, can easily be distributed through e-mail, facsimile transmission, data transmission, etc., the copy prohibition can be achieved by banning a distribution of the original image 101, for example, scanned by the scanner 201 when a document is determined as a copy-prohibited document in the way as described above.

As another alternative, the system controller 204 may change values of pixels included in the image determined as an anti-copy document to a predetermined pixel value so that the image is filled in with a specific color (e.g., a white, gray, or black color) determined by the predetermined pixel value. As an alternative, the system controller 204 may add a repetitive pattern signal to the image to make the image illegible.

Further, as another alternative, the system controller 204 may notify an event that the image data determined as an anti-copy document is read and reproduced, to a remote device through the external communication unit 215 connected to the system controller 204. The remote device may be a computer of an administrator, for example, such as a personal computer, a mobile computer, a cellular phone, etc.

On the other hand, when the image data of the original image 101 read by the scanner 201 is determined as a regular document and not an anti-copy document, the system controller 204 conducts a regular operation for allowing the printer 203 to reproduce the image data.

As an alternative to the above-described hardware structure using the digital circuits or the SIMDs, it is possible to install a program in a memory such as the ROM 204b and the RAM 204c so that the system controller 204 can conduct the anti-copy detection and prohibition operation along with the instructions of the program.

When the original image 101 read by the scanner 201 is determined not to be an anti-copy document, the image processing apparatus 200 performs an ordinary reproduction operation. More specifically, the image data of the original image 101 read by the scanner 201 is processed through the image processor 202 and the resultant image data is reproduced into an image by the printer 203.

The characteristic of the image processing apparatus 200 according to the exemplary embodiment of the present invention is that the specific information extracting processor 241 is configured to perform a specific information extracting processing for extracting specific information such as a specific pattern included in image data, recognize a variable factor such as a scaling ratio, of the image data from which the specific information is extracted by the specific information extracting processor 241, select an information extracting program and dictionary data which correspond to the recognized variable factor of the image data and which are suitable for extracting specific information included in varied image data, and load the selected information extracting program and dictionary data into the specific information extracting processor 241. To perform the above-described processing by the specific information extracting processor 241, as a non-liming example, an information extracting program and dictionary data which correspond to a scaling ratio of image data are stored in a memory area such as the RAM 204c in the system controller 204. Generally, the pattern matching for identifying a specific pattern needs dictionary data containing a number of pattern references to cover variations in a scaling ratio.

Figure 19:
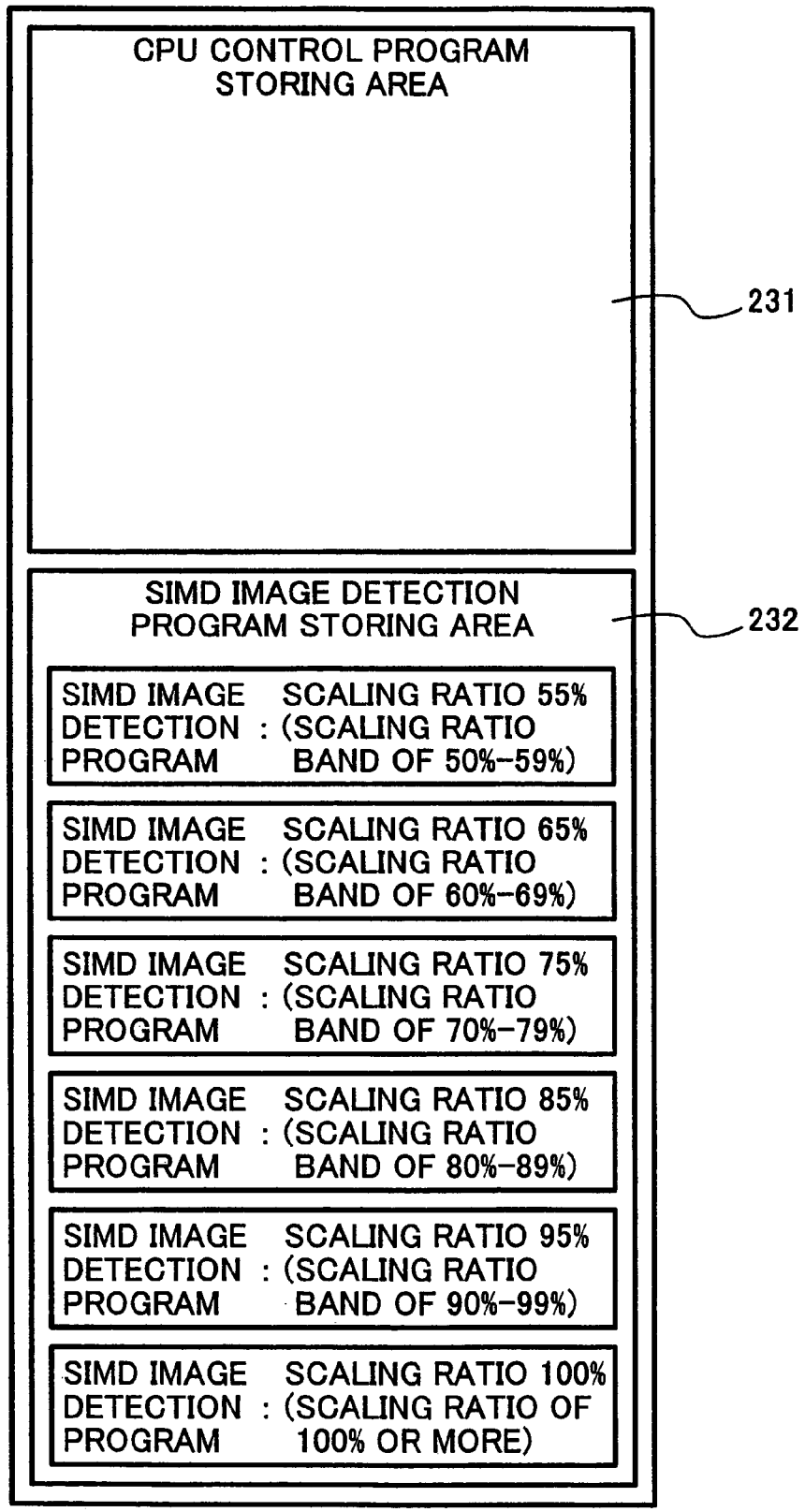
FIG. 19 is a schematic illustration of a memory map of a memory area in a RAM storing information extracting programs used when a scanner performs scaling processing.
Figure 20:
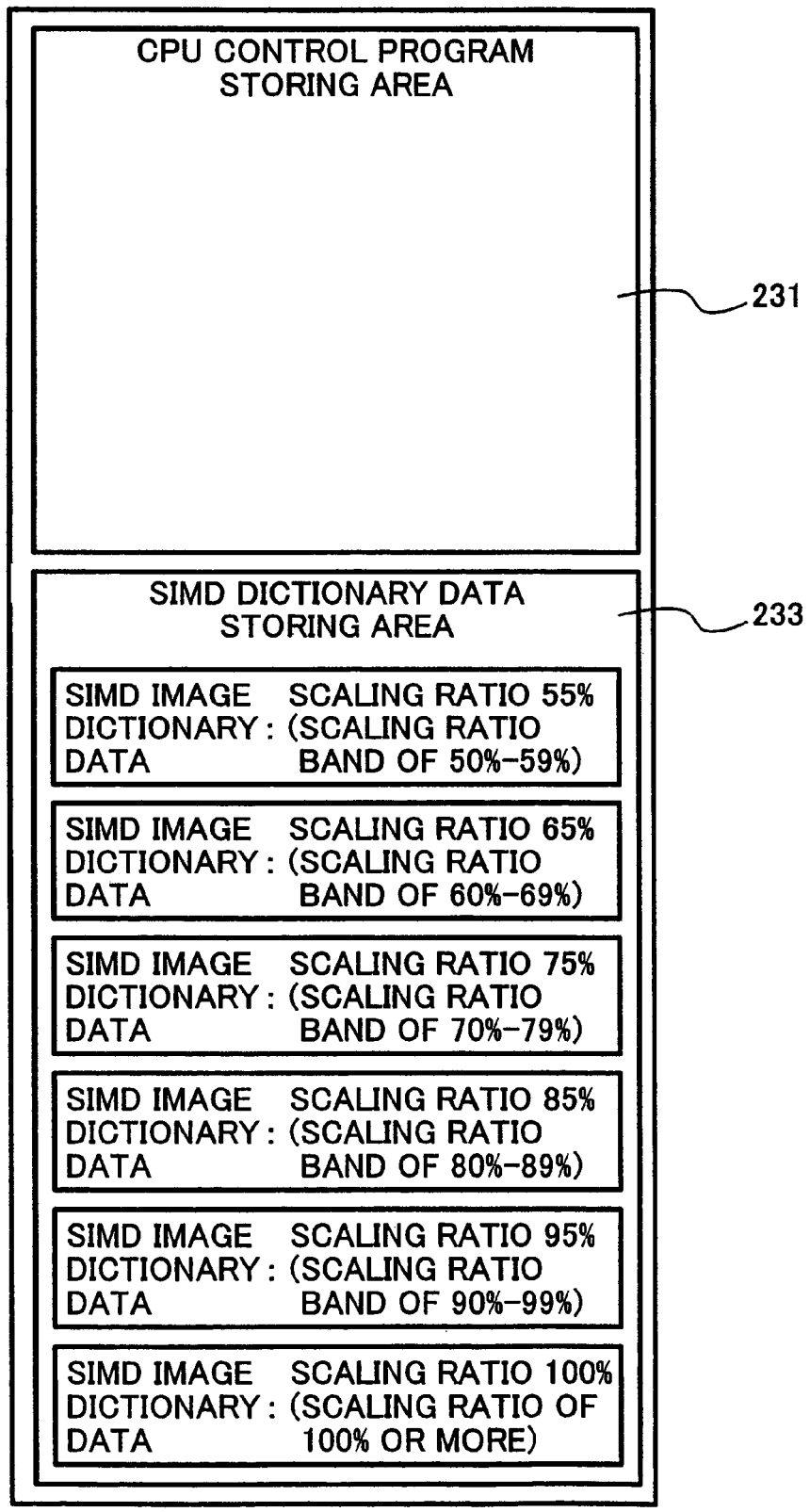
FIG. 20 is a schematic illustration of a memory map of a memory area in the RAM storing dictionary data used when the scanner performs scaling processing.
Figure 21:
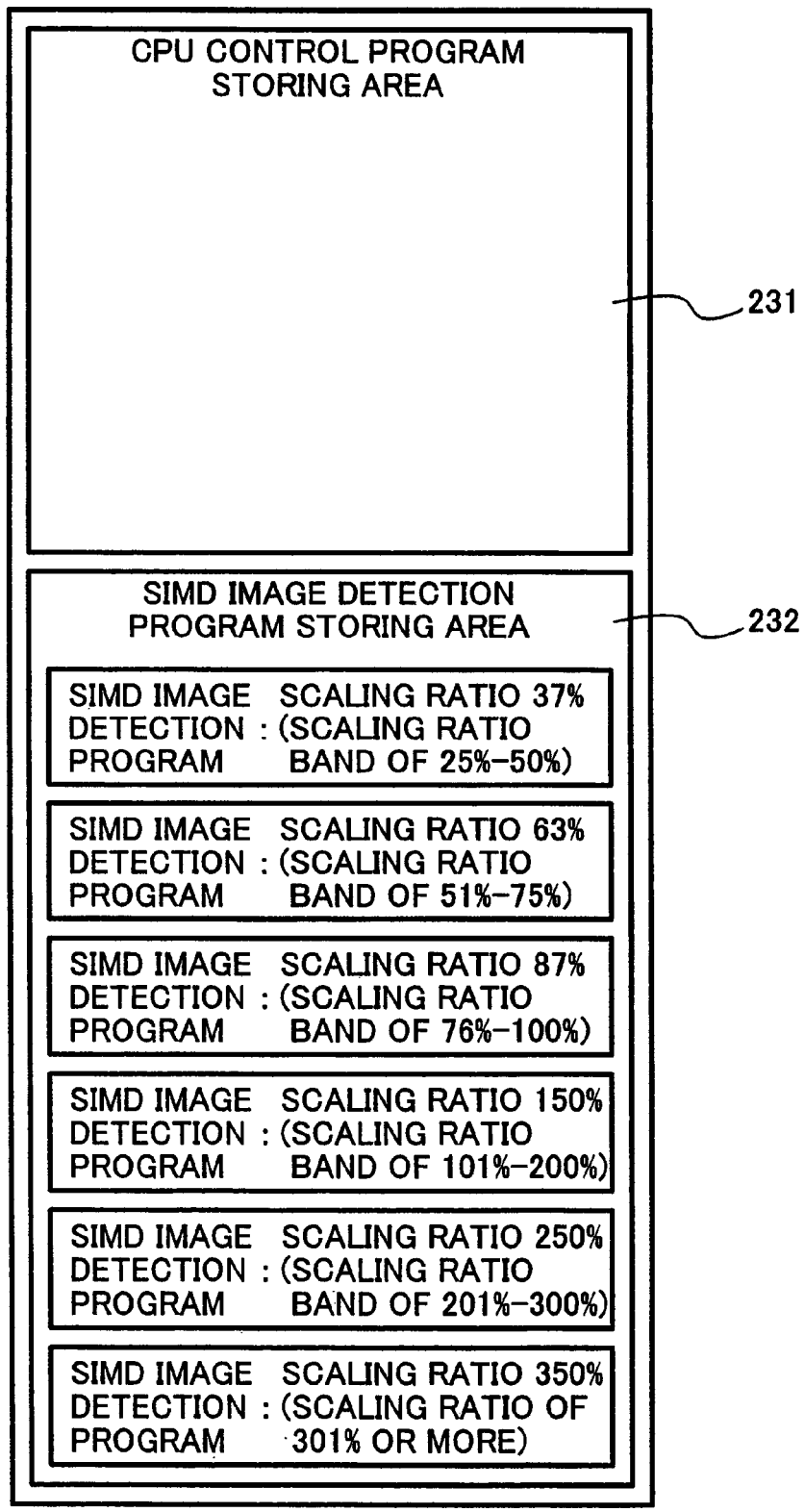
FIG. 21 is a schematic illustration of a memory map of a memory area in the RAM storing information extracting programs used when a scaling unit performs scaling processing.

FIGS. 19 through 21 are schematic illustrations of a memory map of a memory area in the RAM 204c. The memory area in the RAM 204c includes a CPU control program storing area 231 used for storing a CPU control program for controlling the CPU 204a, a SIMD image detection program storing area 232 used for storing an information extracting program, and a SIMD dictionary data storing area 233 used for storing dictionary data. In the SIMD image detection program storing area 232 shown in FIGS. 19 and 21, the information extracting program is each stored by a scaling ratio. In the SIMD dictionary data storing area 233 shown in FIG. 20, the dictionary data is each stored by a scaling ratio. The dictionary data stored in the SIMD dictionary data storing area 233 includes, for example, data of reference dot patterns of various magnified or reduced sizes corresponding to scaling ratio, which are used for detecting background dot patterns by pattern matching.

With respect to the information extracting program and the dictionary data to be stored in the SIMD image detection program storing area 232 and SIMD dictionary data storing area 233, it is preferable that optimum information extracting program and dictionary data are stored by each of all the scaling ratios. However, this neglects the limitation of capacity of the RAM 204c. Accordingly, in this embodiment, scaling ratios are grouped (hereafter, a group of scaling ratios is referred to as a "scaling ratio band") within a range which does not significantly influence the result of the specific information extracting processing. Further, the information extracting program and the dictionary data corresponding to each of representative scaling ratios in the scaling ratio bands are stored in the SIMD image detection program storing area 232 and SIMD dictionary data storing area 233, respectively.

The scaling ratio bands shown in FIGS. 19 and 20 are defined for the scaling processing performed by the scanner 201. When an image is magnified when scanning the image by the scanner 201, the image can be normalized to its original size by thinning out pixels. Therefore, in the specific information extracting processing performed by the specific information extracting processor 241, a background dot pattern of the image can be detected by matching with unmagnified reference dot pattern corresponding to the scaling ratio of 100%. For this reason, the specific information extracting processing can be performed by using single information extracting program and dictionary data corresponding to the scaling ratio of 100%. Therefore, it is not necessary to load the information extracting program and dictionary data into the specific information extracting processor 241 each by scaling (magnification) ratio or scaling (magnification) ratio band.

In contrast, when an image is reduced when scanning the image by the scanner 201, the specific information extracting processing cannot be performed just by using single information extracting program and dictionary data. In this case, a background dot pattern of the reduced image can be detected by matching with reduced reference dot pattern corresponding to respective scaling (reduction) ratios in the specific information extracting processing. Therefore, it is necessary to load information extracting program and dictionary data into the specific information extracting processor 241 each by scaling (reduction) ratio or scaling (reduction) ratio band. As shown in FIGS. 19 and 20, for example, in the scaling ratio band of 50%-59%, the information extracting program and dictionary data tuned to the scaling ratio of 55% are stored in the SIMD image detection program storing area 232 and SIMD dictionary data storing area 233, respectively. Further, in the scaling ratio band of 61%-69%, the information extracting program and dictionary data tuned to the scaling ratio of 65% are stored.

In an exemplary memory map of a memory area in the RAM 204c shown in FIG. 21, scaling ratio bands are defined on the assumption that the scaling processing is performed by the scaling unit 207 in the pre-processing unit 214. In the scaling processing performed by the scaling unit 207, an image is magnified or reduced by increasing or decreasing the number of pixels of image data in a main scanning direction and a sub-scanning direction. Further, a MTF correction and a smoothing processing are performed when performing the scaling processing. Therefore, the specific information extracting processing cannot be properly performed just by using single information extracting program and dictionary data when reducing an image as well as when magnifying an image. As shown in FIG. 21, for example, in the scaling ratio band of 25%-50%, the information extracting program tuned to the scaling ratio of 37% is stored in the SIMD image detection program storing area 232. Further, in the scaling ratio band of 51%-75%, the information extracting program tuned to the scaling ratio of 63% is stored. Moreover, in the scaling ratio band of 301%-400% or more, the information extracting program tuned to the scaling ratio of 350% is stored.

Figure 22:
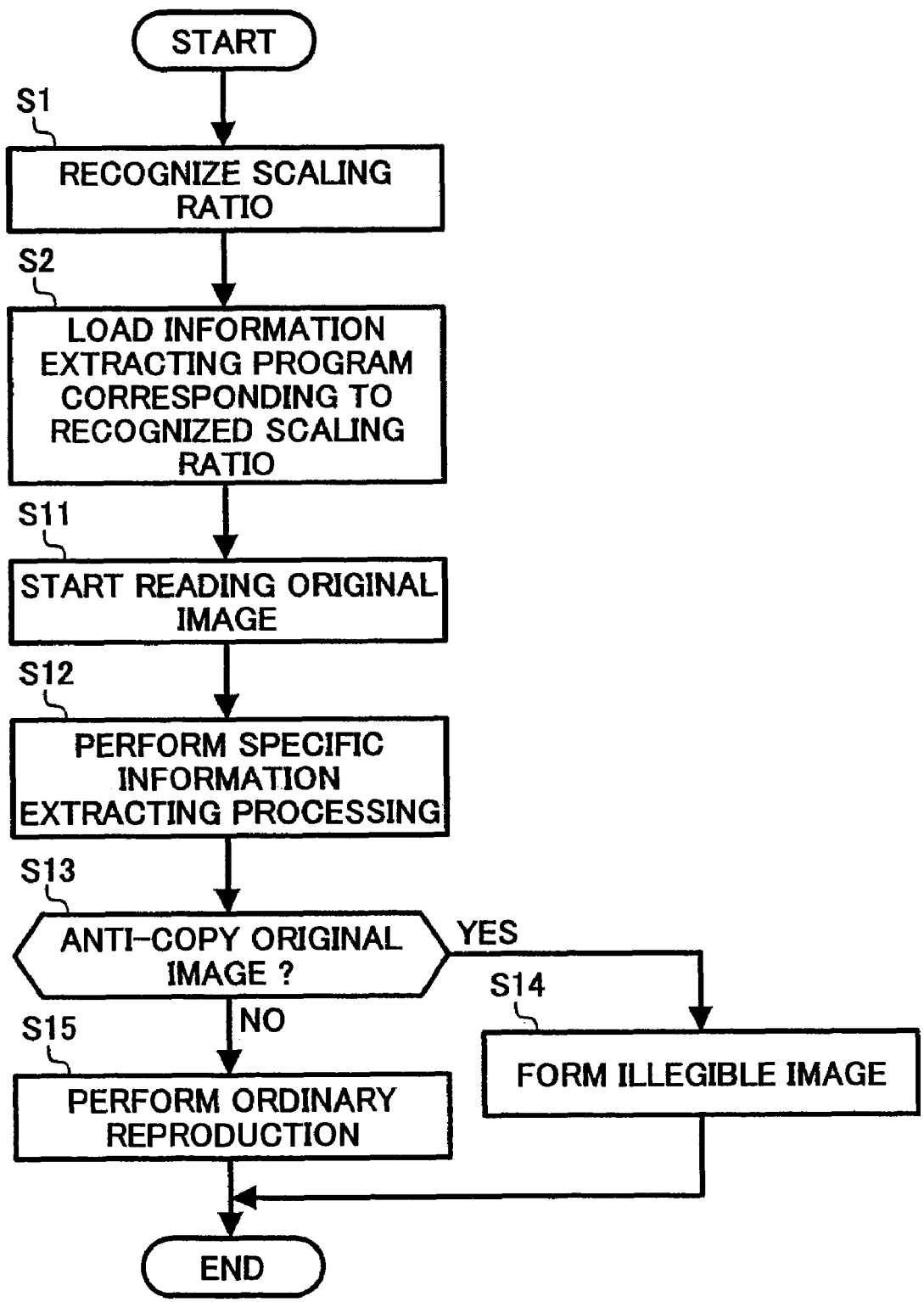
FIG. 22 is a flowchart of an exemplary procedure performed based on a CPU control program according to an exemplary embodiment of the present invention.

FIG. 22 is a flowchart of an exemplary procedure performed based on the CPU control program stored in the CPU control program storing area 231 of the RAM 204c according to an exemplary embodiment of the present invention. Upon detecting the start of a copying operation, the CPU 204a recognizes the condition of a system, for example, a scaling ratio for reading an original image by the scanner 201 or a scaling ratio in the scaling processing performed by the scaling unit 207 in the pre-processing unit 214 in step S1. In step S1, the CPU 204a functions as a variable factor recognizing mechanism configured to recognize a variable factor (i.e., a scaling ratio) of image data of an original image. Then, the CPU 204a loads an information extracting program corresponding to the recognized scaling ratio into the specific information extracting processor 241 in step S2. In step S2, the CPU 204a functions as a program loading mechanism configured to select one of the plurality of information extracting programs which corresponds to the recognized scaling ratio and is suitable for extracting specific information included in scaled image data, and configured to load the selected information extracting program into the specific information extracting processor 241.

Next, in step S11, the scanner 201 starts reading the original image 101. Subsequently, in step S12, the CPU 204a causes the specific information extracting processor 241 to perform the specific information extracting processing in which it is determined if the image data of the original image 101 scanned by the scanner 201 includes specific data.

Next, in step S13, the CPU 204a determines if the original image 101 is an anti-copy original image based on the result of the specific information extracting processing performed by the specific information extracting processor 241. If the original image 101 is determined an anti-copy original image (i.e., the answer is YES in step S13), the image data scanned by the scanner 201 is formed into a illegible image. If the original image 101 is not determined an anti-copy original image (i.e., the answer is NO in step S13), an ordinary reproduction (print) operation is performed in step S15.

Figure 23:
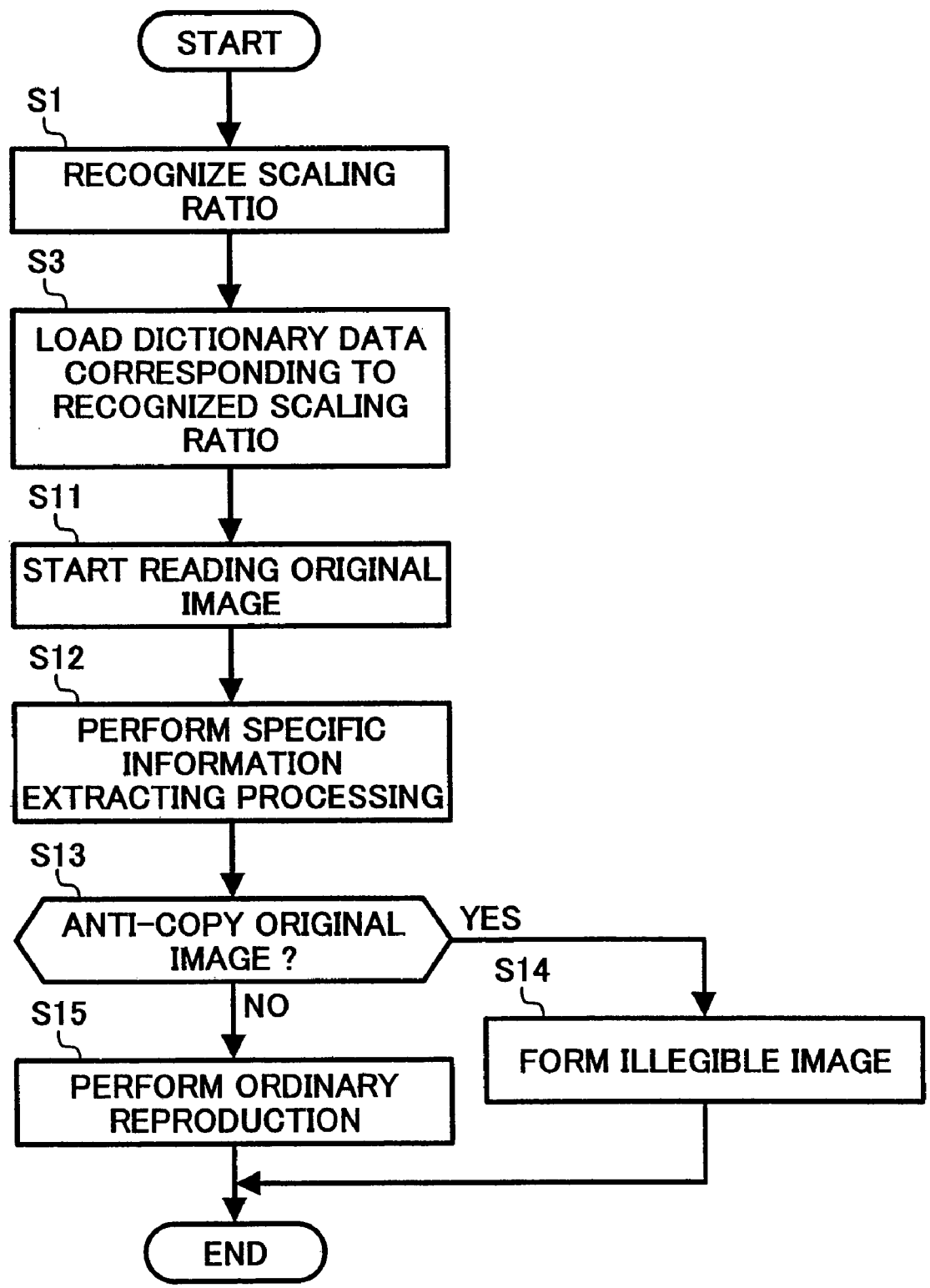
FIG. 23 is a flowchart of an exemplary procedure performed based on a CPU control program according to another exemplary embodiment of the present invention.

FIG. 23 is a flowchart of an exemplary procedure performed based on the CPU control program stored in the CPU control program storing area 231 of the RAM 204c according to another exemplary embodiment of the present invention. Upon detecting the start of a copying operation, the CPU 204a recognizes the condition of a system, for example, a scaling ratio for reading an image by the scanner 201 or a scaling ratio in the scaling processing performed by the scaling unit 207 in the pre-processing unit 214 in step S1. Then, the CPU 204a loads dictionary data corresponding to the recognized scaling ratio into the specific information extracting processor 241 in step S3. In step S3, the CPU 204a functions as a data loading mechanism configured to select one of the plurality of dictionary data which corresponds to the recognized scaling ratio and is suitable for extracting specific information included in scaled image data, and configured to load the selected dictionary data into the specific information extracting processor 241.

Next, in step S11, the scanner 201 starts reading the original image 101. Subsequently, in step S12, the CPU 204a causes the specific information extracting processor 241 to perform the specific information extracting processing in which it is determined if the image data of the original image 101 scanned by the scanner 201 includes specific data.

Next, in step S13, the CPU 204a determines if the original image 101 is an anti-copy original image based on the result of the specific information extracting processing performed by the specific information extracting processor 241. If the original image 101 is determined an anti-copy original image (i.e., the answer is YES in step S13), the image data scanned by the scanner 201 is formed into a illegible image. If the original image 101 is not determined an anti-copy original image (i.e., the answer is NO in step S13), an ordinary reproduction (print) operation is performed in step S15.

The above-described steps S1 and S11-S15 in the procedure of FIGS. 22 and 23 are the same. The characteristic of the procedure of FIG. 22 is that the information extracting program is loaded into the specific information extracting processor 241. In contrast, the characteristic of the procedure of FIG. 23 is that the dictionary data is loaded into the specific information extracting processor 241. To adequately detect specific information included in the image data of the original image 101, both of optimum information extracting program and dictionary data need to be selected according to a variable factor (i.e., a scaling ratio) of image data recognized by the CPU 204a functioning as a variable factor recognizing mechanism. Therefore, steps S1 and S2 in FIG. 22 and steps S1 and S3 in FIG. 23 need to be properly performed prior to steps S11-S15 in FIGS. 22 and 23.

Figure 24:
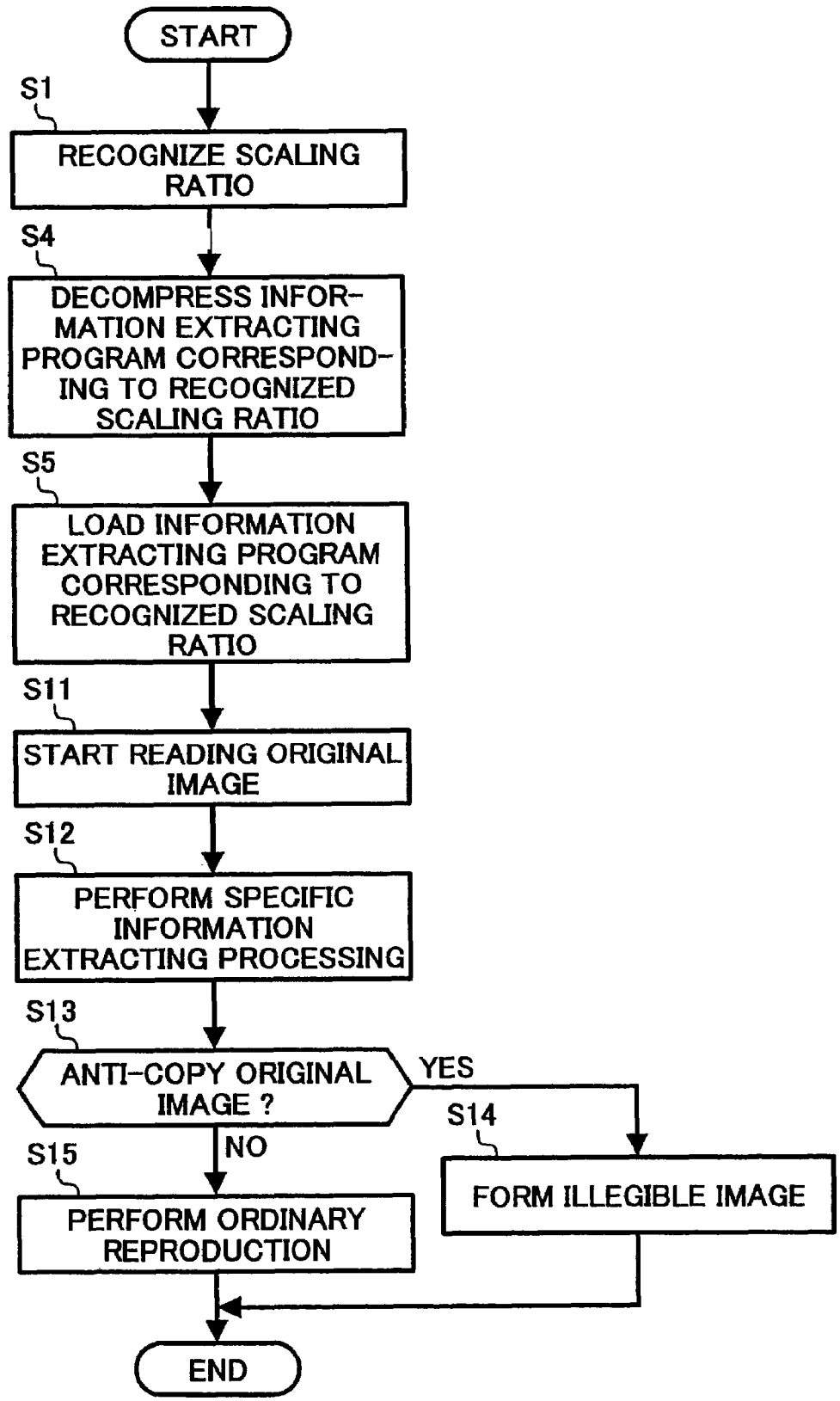
FIG. 24 is a flowchart of an exemplary procedure performed based on the CPU control program according to another exemplary embodiment of the present invention.

FIG. 24 is a flowchart of an exemplary procedure performed based on the CPU control program stored in the CPU control program storing area 231 of the RAM 204c according to another exemplary embodiment of the present invention.

In this embodiment, an information extracting program is compressed and stored in the SIMD image detection program storing area 232 of the RAM 204c. Referring to FIG. 24, upon detecting the start of a copying operation, the CPU 204a recognizes the condition of a system, for example, a scaling ratio for reading an image by the scanner 201 or a scaling ratio in the scaling processing performed by the scaling unit 207 in step S1. Then, the CPU 204a selects a compressed information extracting program corresponding to the recognized scaling ratio from the SIMD image detection program storing area 232 and decompresses the selected information extracting program in step S4. Subsequently, the CPU 204a loads the decompressed information extracting program into the specific information extracting processor 241 in step S5.

The steps S11 through S15 in FIG. 24 are similarly performed as shown in the flowcharts of FIGS. 22 and 23.

Figure 25:
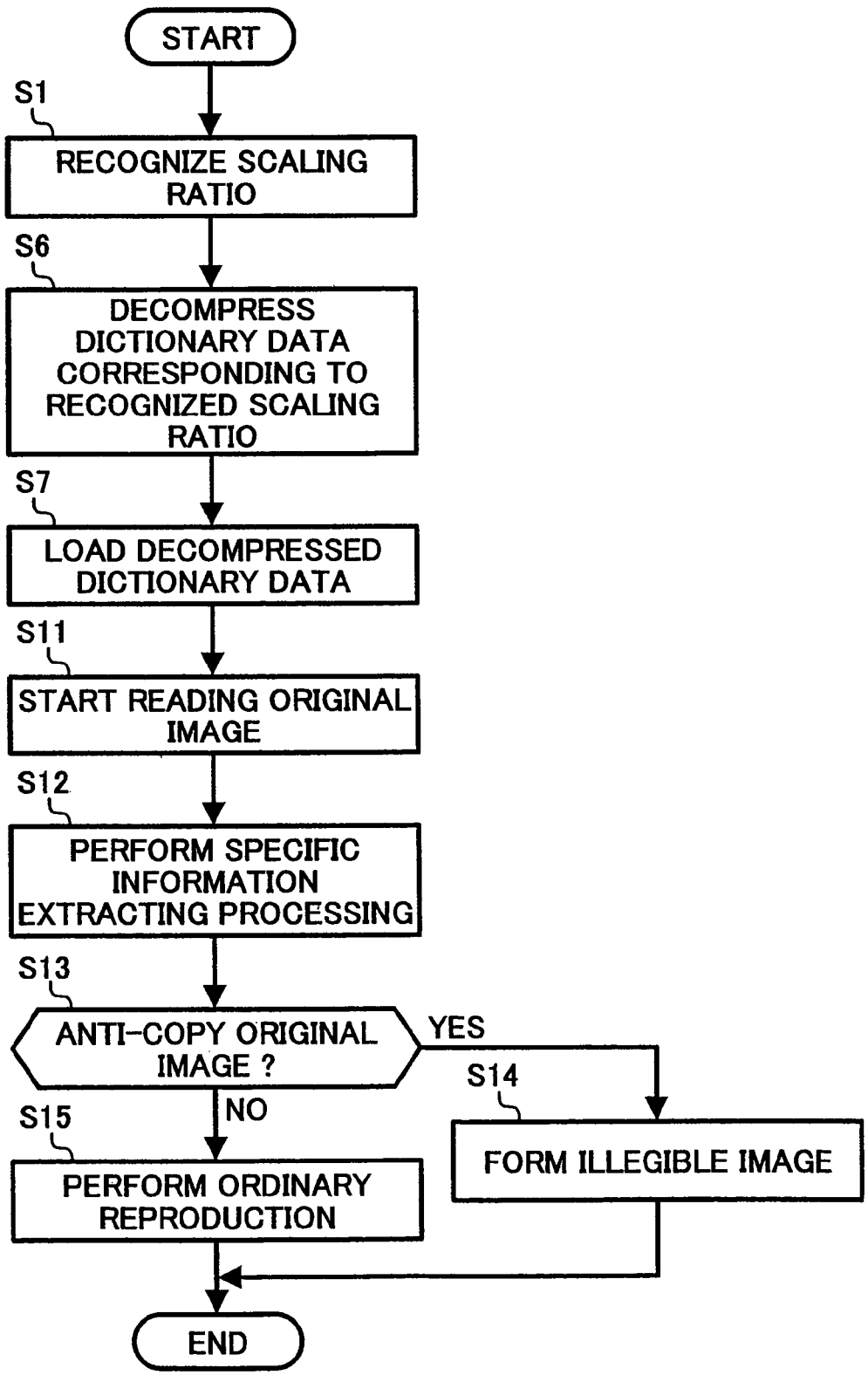
FIG. 25 is a flowchart of an exemplary procedure performed based on the CPU control program according to another exemplary embodiment of the present invention.

FIG. 25 is a flowchart of an exemplary procedure performed based on the CPU control program stored in the CPU control program storing area 231 of the RAM 204c according to another exemplary embodiment of the present invention. In this embodiment, dictionary data is compressed and stored in the SIMD dictionary data storing area 233 of the RAM 204c. Referring to FIG. 25, upon detecting the start of a copying operation, the CPU 204a recognizes the condition of a system, for example, a scaling ratio for reading an image by the scanner 201 or a scaling ratio in the scaling processing performed by the scaling unit 207 in step S1. Then, the CPU 204a selects a compressed dictionary data corresponding to the recognized scaling ratio from the SIMD dictionary data storing area 233 and decompresses the selected dictionary data in step S6. Subsequently, the CPU 204a loads the decompressed dictionary data into the specific information extracting processor 241 in step S7.

The steps S11 through S15 in FIG. 25 are similarly performed as shown in the flowcharts of FIGS. 22 and 23.

In the above-described flowchart of FIG. 22, assuming that the CPU 204a recognizes the condition of a system such as a scaling ratio in the scaling processing performed by the scaling unit 207 in the pre-processing unit 214 upon detecting the start of a copying operation, the scaling unit 207 performs a MTF correction and smoothing processing when performing scaling processing based on the information extracting program corresponding to the recognized scaling ratio. If a nearest neighbor interpolation method is selected as a method of scaling processing, a MTF correction for subjecting image data thereto is set to be relatively low. If a linear interpolation method is selected as a method of scaling processing, the MTF correction for subjecting image data thereto is set to be relatively high. FIG. 26 shows an exemplary 3×3 filter including factors used in the MTF correction.

With regard to the smoothing processing, smoothness is increased in the nearest neighbor interpolation method, and smoothness is decreased in the linear interpolation method. With regard to a scaling ratio, smoothness is decreased as a magnification ratio increases, and smoothness is increased as a magnification ratio decreases. FIG. 27 shows an exemplary 3×3 filter including factors used in smoothing processing.

As described above in FIGS. 19 through 21, the memory area of the RAM 204c includes the SIMD image detection program storing area 232 used for storing an information extracting program, and the SIMD dictionary data storing area 233 used for storing dictionary data. As a non-limiting example, the information extracting program and the dictionary data may be stored in a memory card 217 (shown in FIG. 15) and may be loaded into the RAM 204c via the memory card interface 216.

Figure 28:
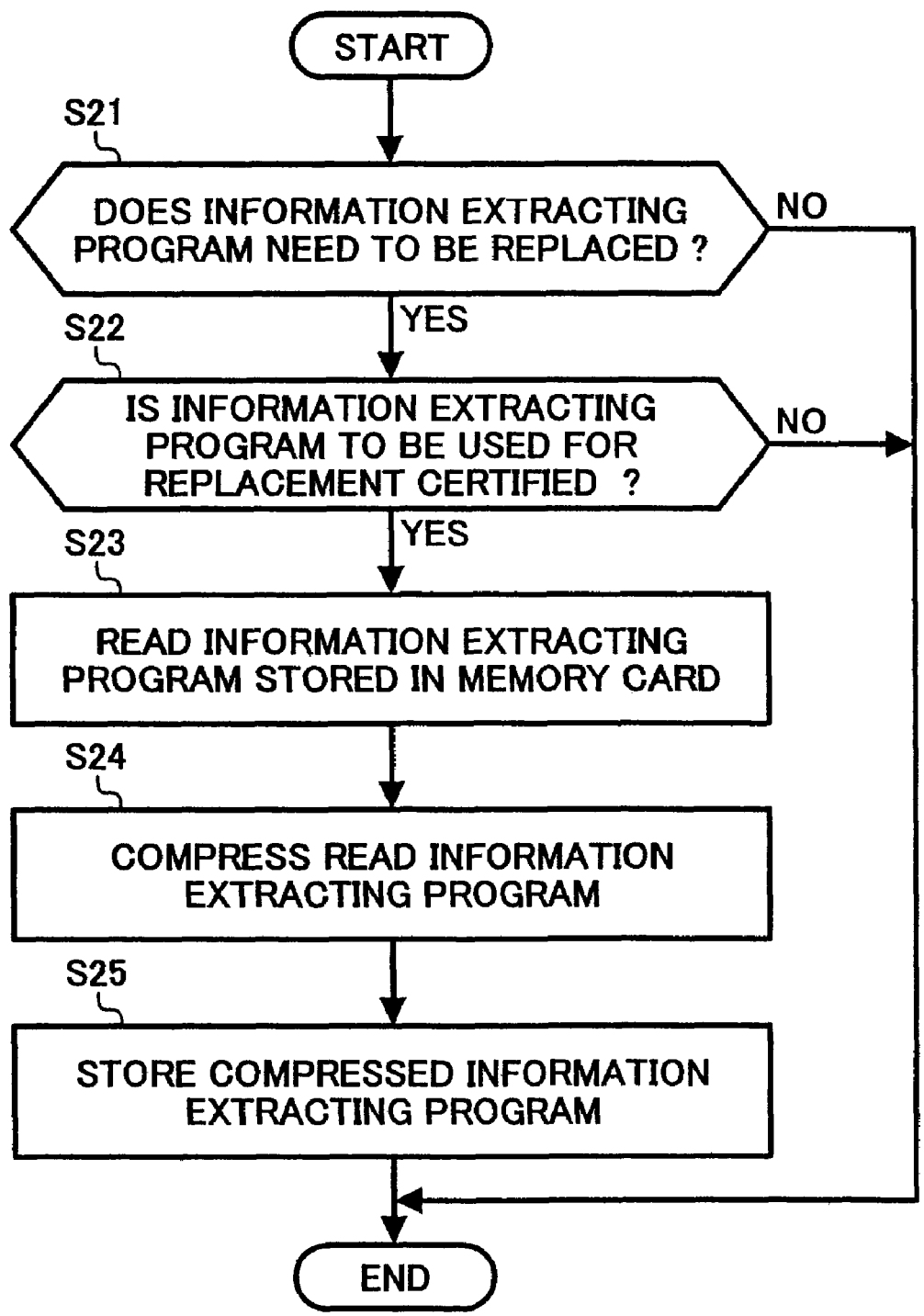
FIG. 28 is a flowchart of information extracting program replacement operation of a CPU according to another exemplary embodiment of the present invention.

FIG. 28 is a flowchart of information extracting program replacement operation steps of the CPU 204a according to another exemplary embodiment of the present invention. The information extracting program replacement operation is performed based on a CPU control program stored in the CPU control program storing area 231 of the RAM 204c.

Upon detecting an attachment of the memory card 217 to the system controller 204, the CPU 204a determines if the information extracting program stored in the SIMD image detection program storing area 232 needs to be replaced in step S21. If the answer is YES in step S21, the CPU 204a determines if an information extracting program to be used for replacement is certified in step S22. If the answer is YES in step S22, the CPU 204a reads the information extracting program stored in the memory card 217 in step S23. Subsequently, the CPU 204a compresses the read information extracting program in step S24. Then, the CPU 204a stores the compressed information extracting program in the SIMD image detection program storing area 232 of the RAM 204c through the memory card interface 216 in step S25. In the flowchart of FIG. 28, the CPU 204a functions as a program loading mechanism configured to load a plurality of information extracting programs stored in the memory card 217 into the SIMD image detection program storing area 232 of the RAM 204c through the memory card interface 216.

Figure 29:
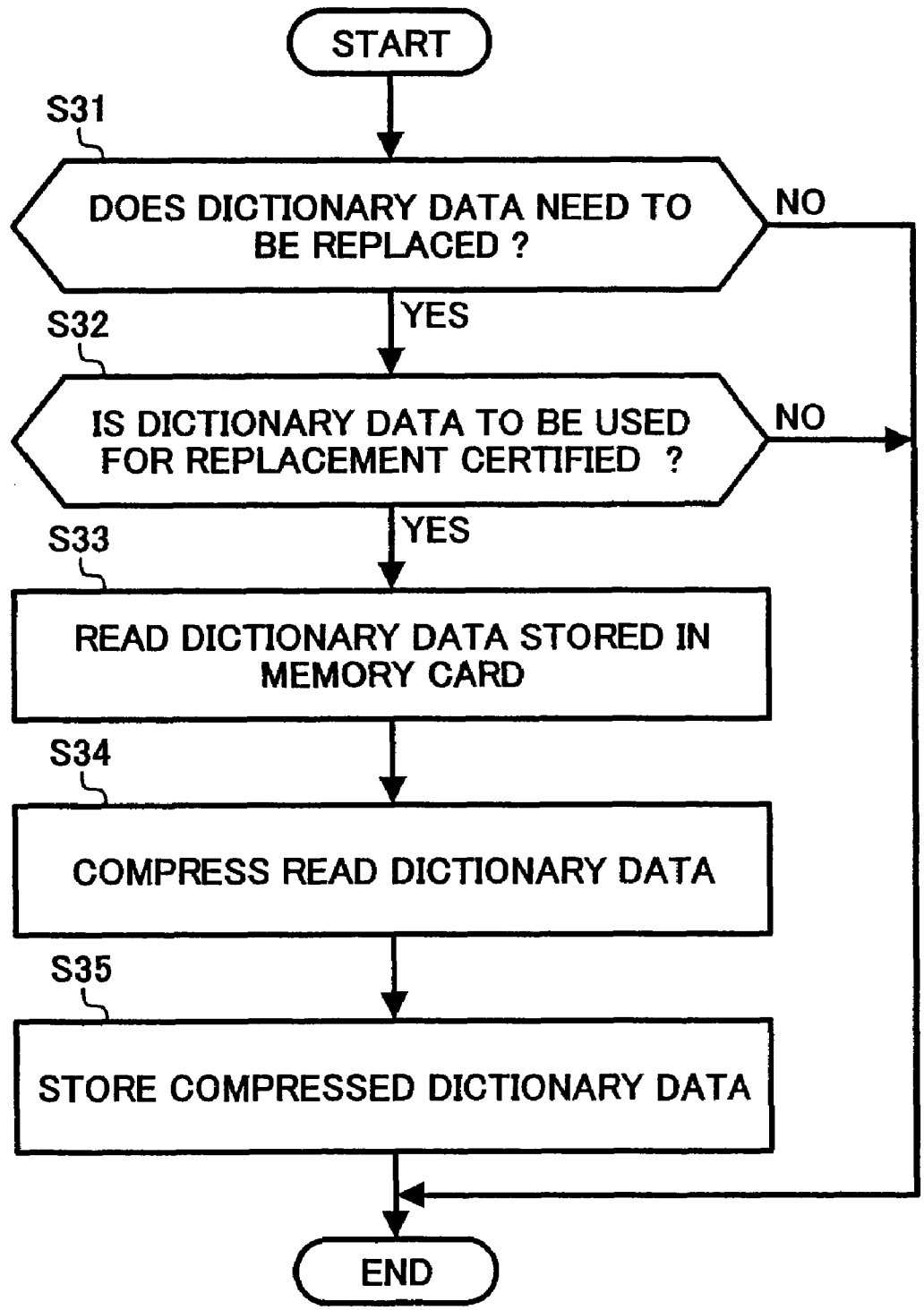
FIG. 29 is a flowchart of dictionary data replacement operation of the CPU according to another exemplary embodiment of the present invention.

FIG. 29 is a flowchart of dictionary data replacement operation steps of the CPU 204a according to another exemplary embodiment of the present invention. The dictionary data replacement operation is performed based on a CPU control program stored in the CPU control program storing area 231 of the RAM 204c.

Upon detecting an attachment of the memory card 217 to the system controller 204, the CPU 204a determines if the dictionary data stored in the SIMD dictionary data storing area 233 needs to be replaced in step S31. If the answer is YES in step S31, the CPU 204a determines if dictionary data to be used for replacement is certified in step S32. If the answer is YES in step S32, the CPU 204a reads the dictionary data stored in the memory card 217 in step S33. Subsequently, the CPU 204a compresses the read dictionary data in step S34. Then, the CPU 204a stores the compressed dictionary data in the SIMD dictionary data storing area 233 of the RAM 204c through the memory card interface 216 in step S35. In the flowchart of FIG. 29, the CPU 204a functions as a data loading mechanism configured to load a plurality of dictionary data stored in the memory card 217 into the SIMD dictionary data storing area 233 of the RAM 204c through the memory card interface 216.

Figure 30:
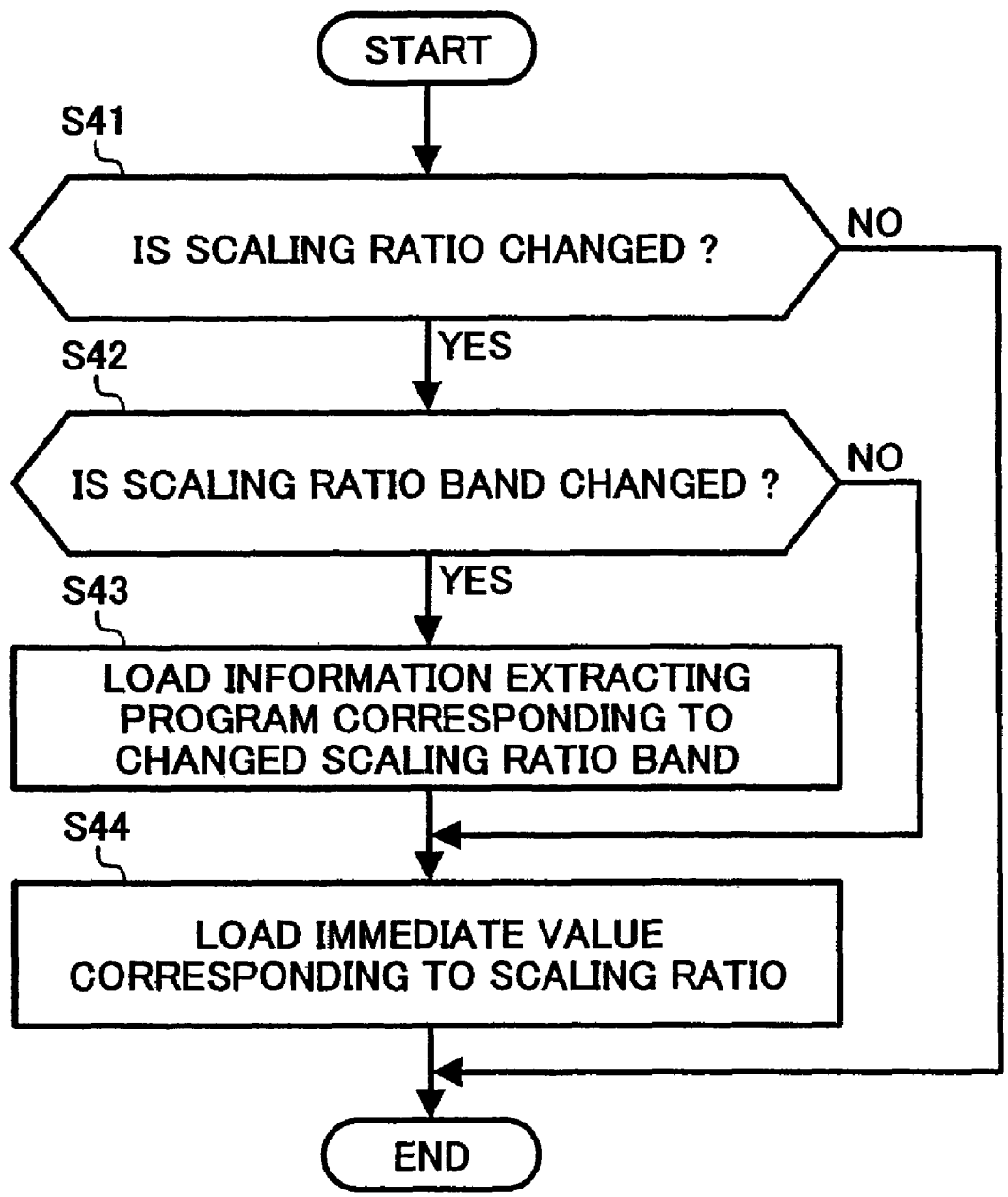
FIG. 30 is a flowchart of a program loading operation of the CPU according to another exemplary embodiment of the present invention.

FIG. 30 is a flowchart of a program loading operation of the CPU 204a according to another exemplary embodiment of the present invention. The program loading operation is performed based on a CPU control program stored in the CPU control program storing area 231 of the RAM 204c.

First, the CPU 204a monitors if a scaling ratio is changed in step S41. If the answer is YES in step S41, the CPU 204a determines if a scaling ratio band is changed in step S42. If the answer is YES in step S42, the CPU 204a loads an information extracting program corresponding to the changed scaling ratio band into the specific information extracting processor 241 from the SIMD image detection program storing area 232 in step S43. If the information extracting program has been compressed, the compressed information extracting program is decompressed and loaded into the specific information extracting processor 241 in step S43.

Subsequently, an immediate value corresponding to the scaling ratio is loaded into the specific information extracting processor 241 in step S44. If the answer is NO in step S42 (i.e., the scaling ratio is changed but the scaling ratio band is not changed), only an immediate value corresponding to the scaling ratio is loaded into the specific information extracting processor 241 in step S44. If the scaling ratio band is not changed, it is not necessary to reload all the information extracting program into the specific information extracting processor 241. In this case, only a part of the information extracting program corresponding to an immediate value, which is changed according to the scaling ratio, can be loaded, thereby reducing a loading time. Generally, a program relating to processing is loaded into the program area 244a, and a parameter portion without depending on the processing is loaded into the data area 244b according to the condition of the system. If a frequently-used parameter is set as an immediate value of the program, a cycle for reading data in the data area 244b is not necessary, so that processing speed can be increased.

According to the above-described image processing apparatus, image processing method, and computer program of the present embodiment, when a special processor, such as a DSP and a SIMD type processor, is used as the specific information extracting processor 241, an optimum image recognition processing (e.g., a pattern matching processing) according to the condition (e.g., a scaling ratio in scaling processing) of the image processing apparatus can be performed without using a large storage capacity for the program area 244a and the data area 244b included in the special processor.

Figure 31:
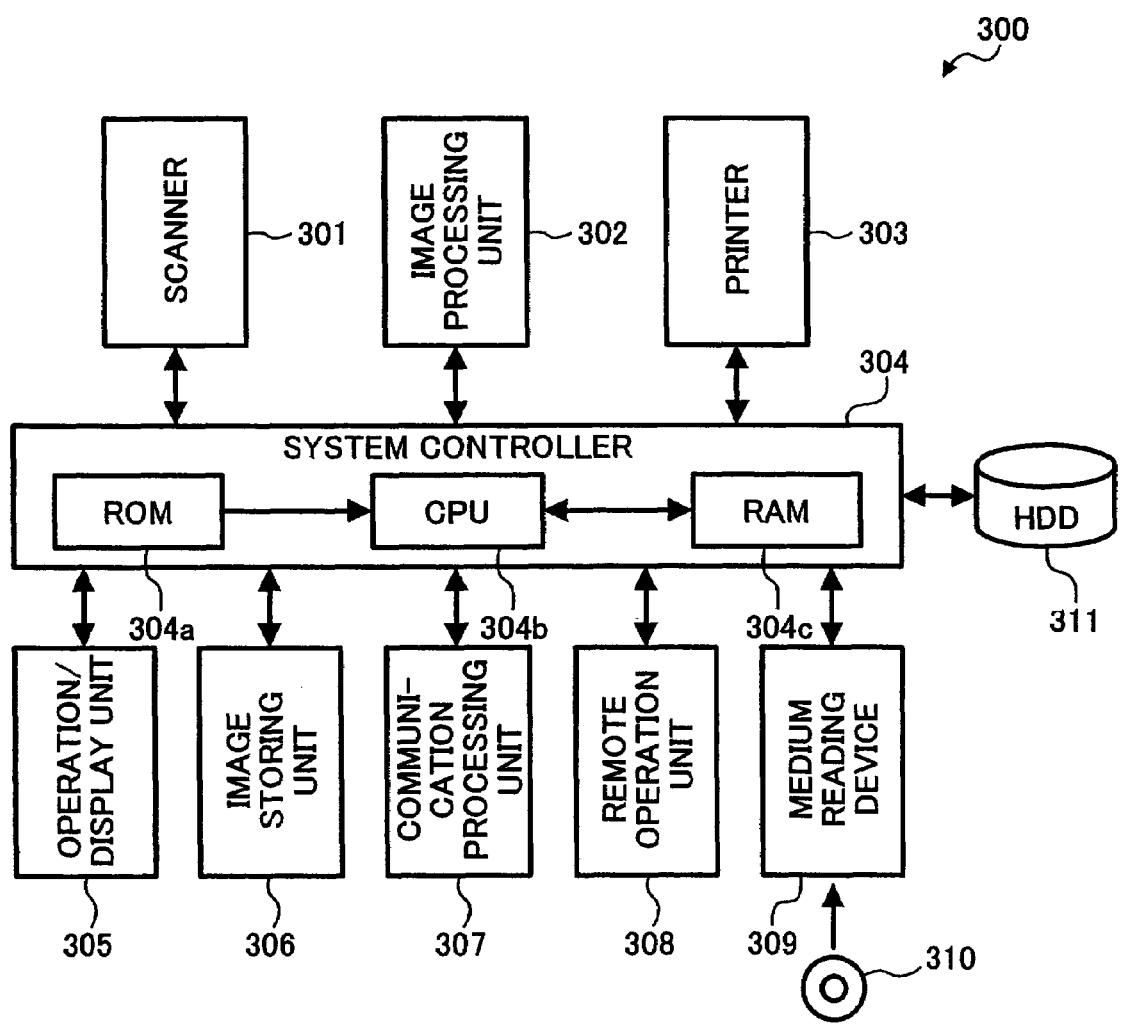
FIG. 31 is a block diagram of a configuration of an image processing apparatus according to another exemplary embodiment of the present invention.

FIG. 31 is a block diagram of a configuration of an image processing apparatus 300 according to another exemplary embodiment of the present invention. As shown in FIG. 31, the image processing apparatus 300 acts as a digital copying machine in which a scanner 301 and a printer 303 are controlled by a system controller 304. Alternatively, the system controller 304 may be constructed from a personal computer (PC), and the scanner 301 and the printer 303 may be connected to the PC. An image processing unit 302 can be achieved by processing performed by the system controller, or can be achieved by a signal processing processor for image processing which is independent of the system controller 304, or can be achieved by a wired logic, or can be achieved by the combination of these. In this embodiment, a non-liming example in which the image processing unit 302 is achieved by the processing performed by the system controller 304 is described.

The system controller 304 includes a ROM 304a, a CPU 304b, and a RAM 304c and performs a computer function. The system controller 304 controls the scanner 301, the image processing unit 302, and the printer 303 in accordance with the instruction input through an operation/display unit 305, and sends necessary information to the operation/display unit 305 to display the information thereon. Further, an image storing unit 306 and a communication processing unit 307 are connected to the system controller 304. The image storing unit 306 is formed from an image memory and configured to store image data of an original image scanned by the scanner 301. The communication processing unit 307 acts as an external interface. The image processing apparatus 300 is connected to a communication network via the communication processing unit 307. Further, a remote operation unit 308 is connected to the communication processing unit 307 and is configured to control the image processing apparatus 300.

If the image processing apparatus 300 acts as a digital copying machine, the processing of the image processing unit 302 is performed by software. Alternatively, the processing of the image processing unit 302 may be performed by using software and an image processing circuit based on a control program stored in the ROM 304a. If the image processing apparatus 300 acts as a PC, the processing of the image processing unit 302 is performed based on a control program which is read out from a storage medium 310 by a medium reading device 309 and is installed in a magnetic storage device 311 such as an HDD (Hard Disk Drive). The control program may be downloaded from a communication network such as the Internet via the communication processing unit 307 and installed in the magnetic storage device 311. The medium reading device 309 can be an optical disk drive or a flexible disk drive depending on a type of the storage medium 310, such as a CD (compact disk), a DVD (digital versatile disk), and a flexible disk.

The scanner 301 is configured to read an image by scaling an image in a sub-scanning direction by changing a moving speed of a carriage of the scanner 301. An image scaling in a main scanning direction is performed by image processing after an image is read by the scanner 301.

The printer 303 forms an image on a recording medium such as a sheet based on image data of the image scanned by the scanner 301. The printer 303 can employ various printing methods, such as an inkjet method, a dye-sublimation thermal-transfer method, a silver halide photography method, a direct thermal recording method, and a fusion thermal-transfer method, in addition to an electrophotographic method.

The image processing apparatus 300 can act as an image reading apparatus other than a digital copying machine, and as a PC connected to the scanner 301 and the printer 303. In the case of the image reading apparatus, an arbitrary interface may be provided in place of the printer 303 to output the image data subjected to the processing performed by the image processing unit 302 to the outside of the image reading apparatus.

Figure 32:
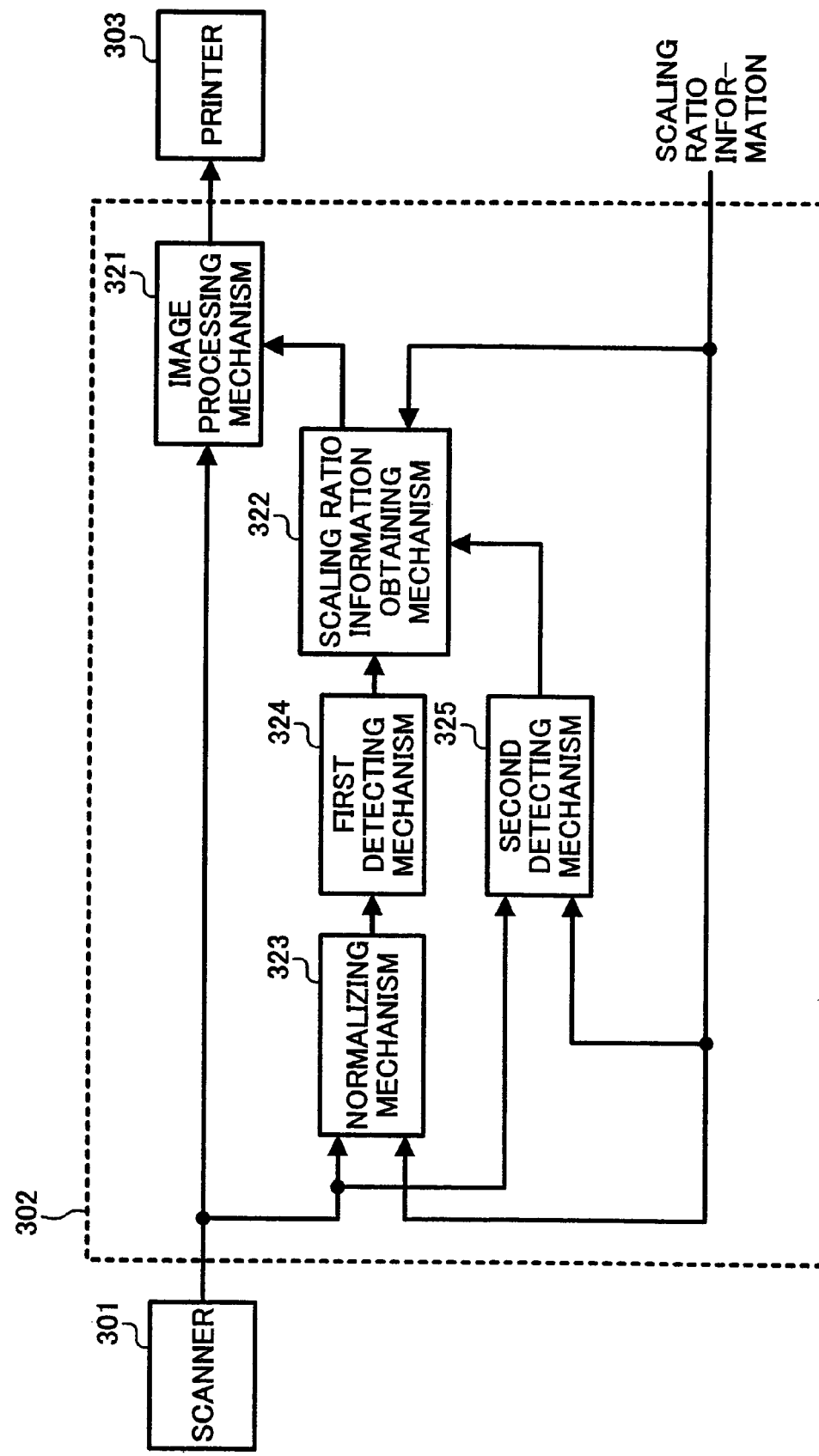
FIG. 32 is a block diagram of an image processing unit of the image processing apparatus of FIG. 31.
Figure 33:
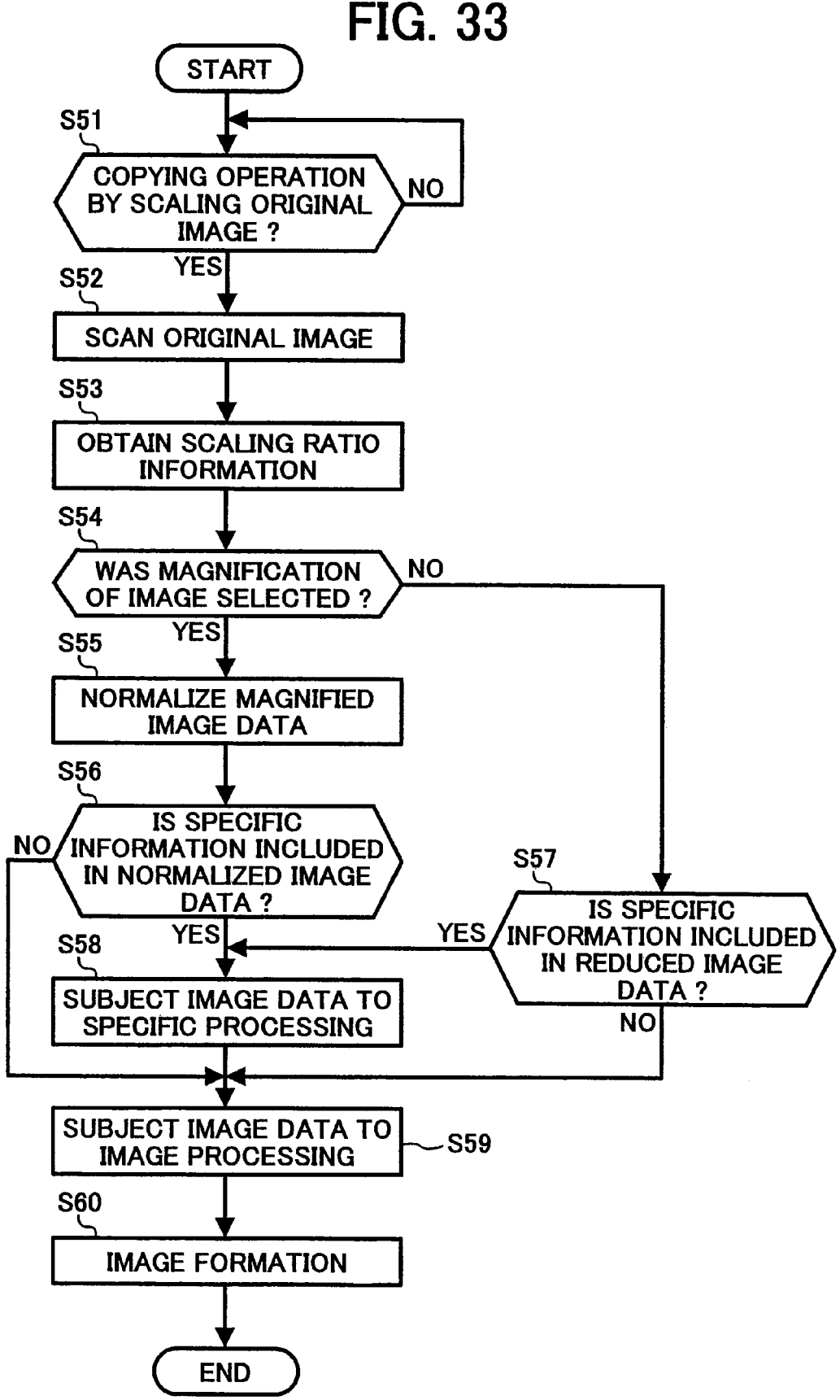
FIG. 33 is a flowchart of processing of the image processing apparatus when reproducing an original image.

FIG. 32 is a block diagram of the image processing unit 302. The image processing unit 302 includes an image processing mechanism 321, a scaling ratio information obtaining mechanism 322, a normalizing mechanism 323, a first detecting mechanism 324, and a second detecting mechanism 325. FIG. 33 is a flowchart of processing of the image processing apparatus 300 when reproducing an original image. In step S51, the CPU 304b determines if a user operates the operation/display unit 305 and instructs a copying operation by scaling an original image at a desired scaling ratio. If the answer is YES in step S51, the scanner 301 scans an original image by scaling the image in the sub-scanning direction by changing the moving speed of the carriage of the scanner 301 in step S52. In this condition, the scanned image is compressed or extended in the sub-scanning direction as compared to an image of its original size. The scanned image is not scaled in the main scanning direction. The image data of the scanned image is output to the image processing mechanism 321 of the image processing unit 302. Subsequently, the scaling ratio information obtaining mechanism 322 obtains the information of scaling ratio (hereafter referred to as a "scaling ratio information") which has been set by a user by operating the operation/display unit 305 in step S53. Then, the CPU 304b determines if the magnification of the image was selected based on the scaling ratio information in step S54. If the answer is YES in step S54, the normalizing mechanism 323 normalizes the image data by reducing the magnified image to its original size in step S55. Then, the first detecting mechanism 324 detects if specific information, such as the background dot pattern 113 (FIGS. 6B and 7B) representing the prohibition of an output of image data is included in the normalized image data in step S56.

If the CPU 304b determines that the reduction of the image was selected based on the scaling ratio information in step S54 (i.e., the answer is NO in step S54), the second detecting mechanism 325 detects if specific information, such as the background dot pattern 113 (FIGS. 6B and 7B) representing the prohibition of an output of image data is included in the reduced image data by reference to the prestored background dot pattern 113 as a pattern matching reference, which is reduced at the reduction ratio designated by the user, in step S57.

If the background dot pattern 113 is detected in steps S56 and S57, the image processing mechanism 321 subjects the image data of the read image to specific processing which makes an image illegible (e.g., an image is filled in with a black color) in step S58. Alternatively, the output of the image from the printer 303 may be prohibited and the image data may be abandoned. Further, the image processing mechanism 321 subjects the image data of the read image to various necessary image processing in step S59 irrespective of the detection result in steps S56 and S57. Then, the printer 303 forms an image on a recording medium, such as a sheet, based on the image data subjected to the above-described processing performed by the image processing mechanism 321 in step S60. Thus, the copying operation of an original image ends.

Next, the processing performed by the normalizing mechanism 323 and the first and second detecting mechanisms 324 and 325 are described. FIG. 34A is an enlarged illustration of the dot 106c of its original size that forms the background dot pattern 113 (FIGS. 6B and 7B) included in the image read by the scanner 301. FIG. 34B is an enlarged illustration of the dot 106c reduced at 50%. FIG. 34C is an enlarged illustration of the dot 106c magnified at 125%. As shown in FIG. 34B, the reduced dot 106c is contracted in the sub-scanning direction as compared to the dot 106c of FIG. 34A. Further, as shown in FIG. 34C, the magnified dot 106c is extended in the sub-scanning direction as compared to the dot 106c of FIG. 34A.

When an anti-copy original image is scaled and read by the scanner 301, the image processing unit 302 subjects an image including the background dot pattern 113 formed from the dots 106c to specific processing. The dots 106c are reduced or magnified in the sub-scanning direction as shown in FIGS. 34B and 34C, respectively. In this condition, if the detecting mechanism detects if the background dot pattern 113 formed from the dots 106c of its original size is included in the scaled image data of an original image scanned by the scanner 301, the detecting mechanism cannot detect the background dot pattern 113 adequately because the shape of the background dot pattern 113 is changed in the sub-scanning direction by scaling the image data of the original image. To adequately detect the background dot pattern 113 in the scaled image data of the original image, the following proceeding is performed.

First, an exemplary processing of the normalizing mechanism 323 is described. For example, when normalizing an image magnified by 125% in the sub-scanning direction to its original size (about 100%), the magnified image needs to be reduced by 80% (i.e., $100/125$). With reference to FIG. 35, a symbol "+" represents a pixel value of an image magnified by 125%. A symbol "*" represents a pixel value of an image of original size (100%) and a pixel value of an image normalized to its original size (100%). Each of the interval between the two adjacent symbols "+" and the interval between the two adjacent symbols "*" represents an interval between pixels (i.e., an interval between lines) in the sub-scanning direction. For example, to normalize an image magnified by 125% to its original size (about 100%), a pixel value "*" of an additional line is obtained based on a pixel value "+" of a preceding line and a pixel value "+" of a succeeding line by using a linear interpolation method as shown schematically in FIG. 35. The interval between the two adjacent pixel values "*" of the image normalized to its original size is obtained by multiplying the interval between the two adjacent pixel values "+" of the image magnified by 125% by 125/100.

Figure 36:
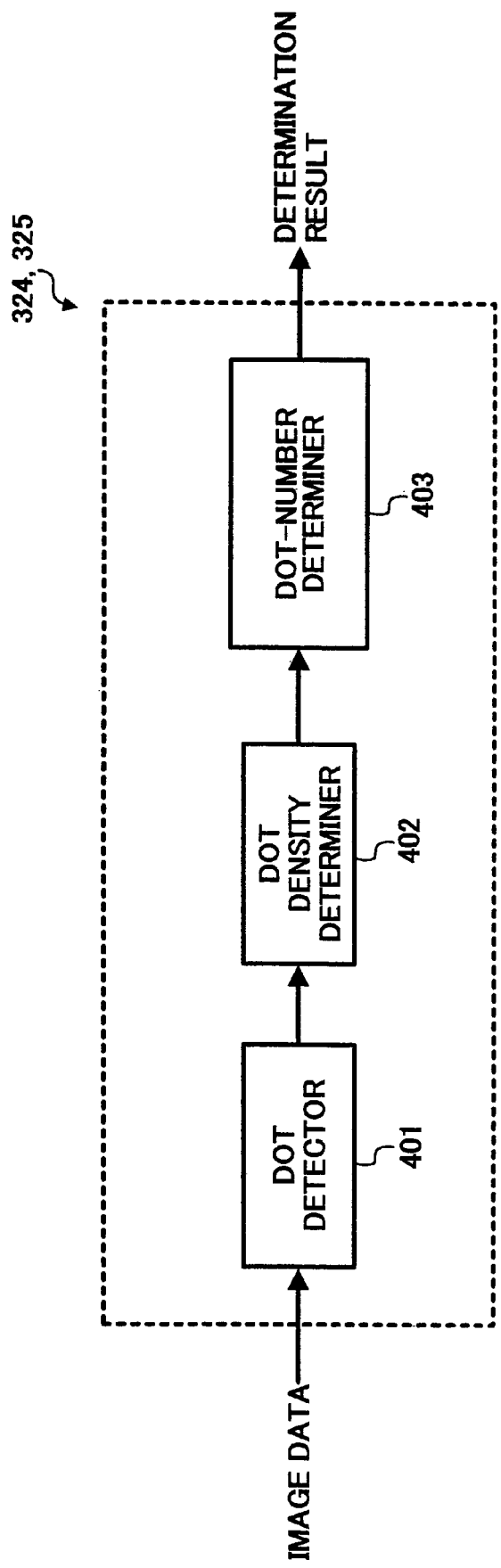
FIG. 36 is a block diagram of an exemplary configuration of a first detecting mechanism.
Figure 37:
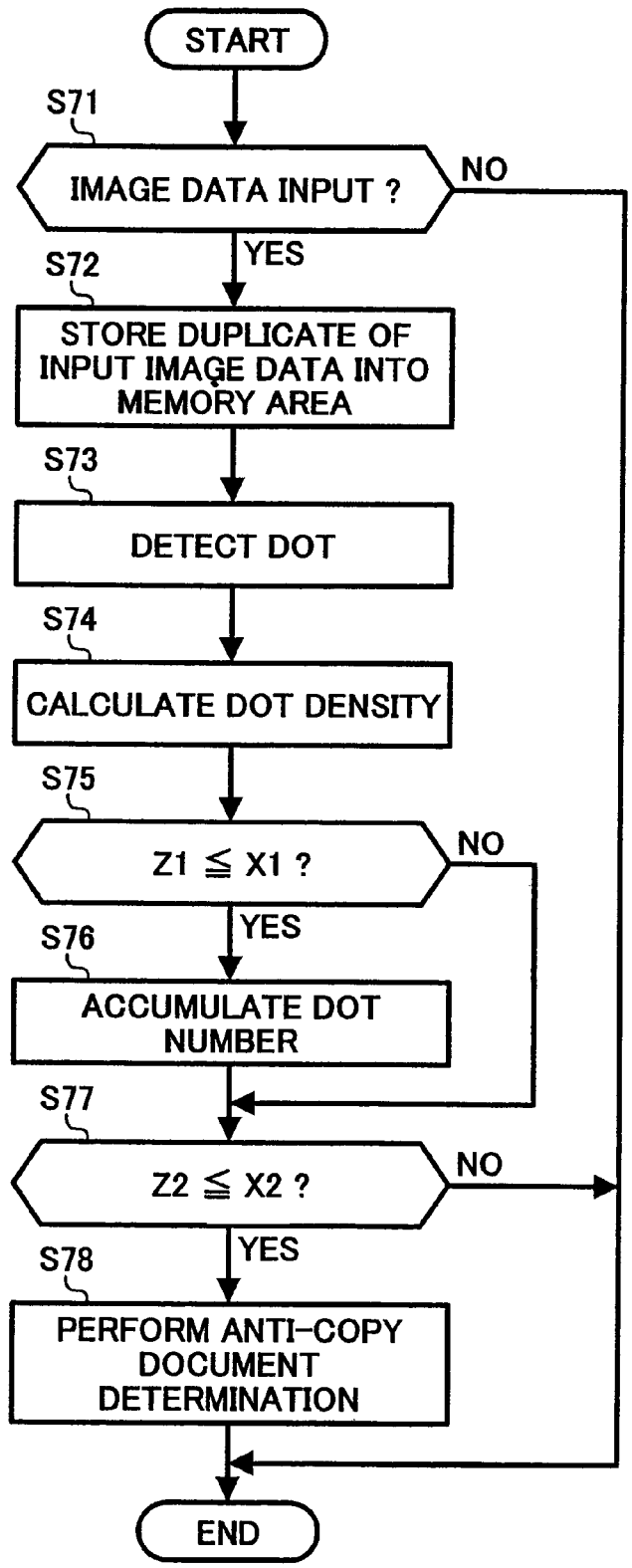
FIG. 37 is a flowchart of processing performed by the first detecting mechanism.

Next, a processing performed by the first detecting mechanism 324 is described. FIG. 36 is a block diagram of an exemplary configuration of the first detecting mechanism 324. The first detecting mechanism 324 includes a dot detector 401, a dot density determiner 402, and a dot-number determiner 403. FIG. 37 is a flowchart of the processing performed by the first detecting mechanism 324. In step S71 of FIG. 37, the CPU 304 checks if image data read from the original image 111 (FIG. 6A) by the scanner 301 is input to the RAM 304c. If the answer is YES in step S71, the CPU 304 stores the duplicate of the input image data into a memory area of the image storing unit 306 in step S72. Then, in step S73, the dot detector 401 detects the dots 106c (FIG. 6B) from the input image data stored in the memory area of the image storing unit 306. An actual detection method may be one of various conventional methods for detecting images such as a pattern matching method. Then, in step S74, the dot density determiner 402 calculates a dot density (Z1) in a unit area with respect to the dots 106c detected by step S73. Subsequently, the dot density determiner 402 determines if the calculated density (Z1) of the dots 106c is smaller than or equal to a prestored threshold value (X1) in step S75. If the answer is YES in step S75, the dot-number determiner 403 accumulates the number of dots 106c (Z2) in a counter (not shown) in step S76. Then, the dot-number determiner 403 determines if the accumulated dot number (Z2) is smaller than or equal to a prestored threshold value (X2) in step S77. If the answer is YES in step S77, the dot-number determiner 403 determines that the background dot pattern 113 (FIG. 6B) is included in the image data of the original image 111 (FIG. 6B) and the original sheet 102 (FIG. 6B) is an anti-copy document in step S78. Further, the image processing mechanism 321 subjects the image data of the read original image 111 to specific processing which makes an image illegible (e.g., an image is filled in with a black color) in step S78.

Figure 38:
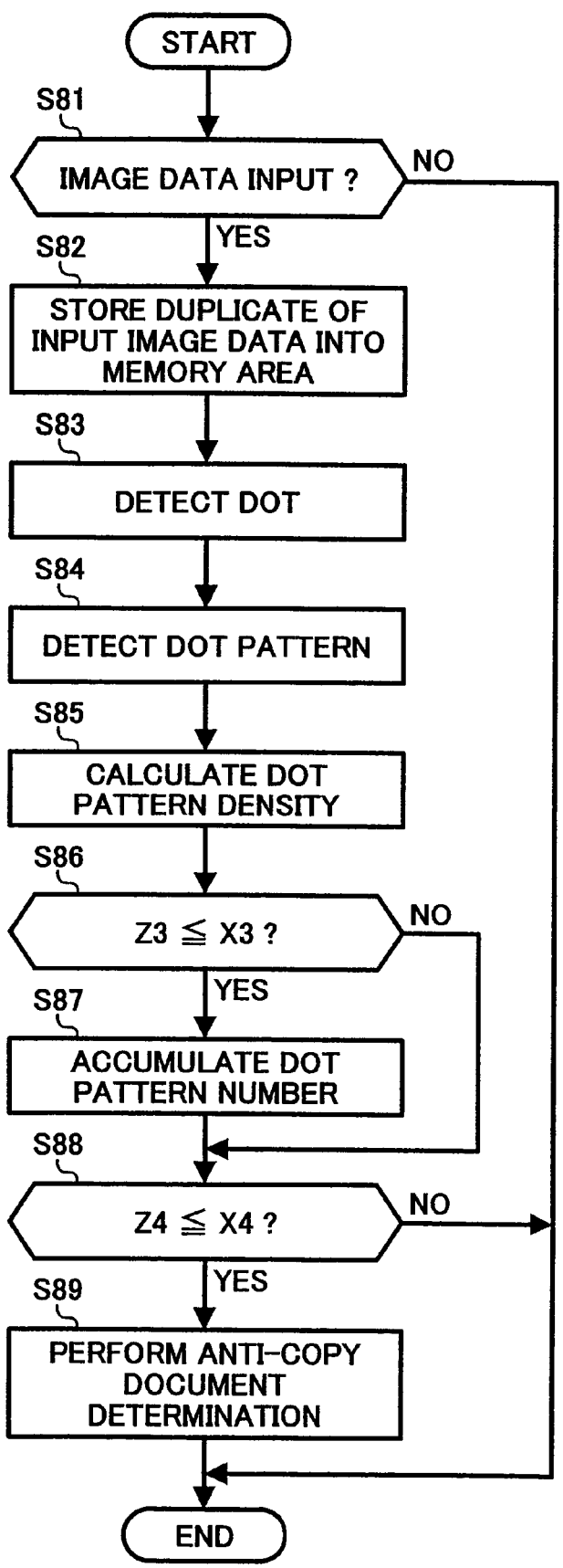
FIG. 38 is a flowchart of the processing performed by the first detecting mechanism according to another exemplary embodiment of the present invention.

FIG. 38 is a flowchart of the processing performed by the first detecting mechanism 324 according to another exemplary embodiment of the present invention. In step S81 of FIG. 38, the CPU 304 checks if image data read from the original image 111 (FIG. 6A) by the scanner 301 is input to the RAM 304c. If the answer is YES in step S81, the CPU 304 stores the duplicate of the input image data into a memory area of the image storing unit 306 in step S82. Then, in step S83, the dot detector 401 detects the dots 106c (for example, FIG. 14B) from the input image data stored in the memory area of the image storing unit 306. An actual detection method may be one of various conventional methods for detecting images such as a pattern matching method. Then, the dot detector 401 detects, for example, the background dot pattern 143 (FIG. 14B) made of a number of the basic units A (FIG. 13) in step S84. Then, in step S85, the dot density determiner 402 calculates a dot pattern density (Z3) in a unit area with respect to the background dot pattern 143 detected by step S84. Subsequently, the dot density determiner 402 determines if the calculated dot pattern density (Z3) of the background dot pattern 143 is smaller than or equal to a prestored threshold value (X3) in step S86.

If the answer is YES in step S86, the dot-number determiner 403 accumulates the number of background dot pattern 143 (Z4) in a counter (not shown) in step S87. Then, the dot-number determiner 403 determines if the accumulated background dot pattern number (Z4) is smaller than or equal to a prestored threshold value (X4) in step S88. If the answer is YES in step S88, the dot-number determiner 403 determines that the background dot pattern 143 is included in the image data of the original image 111 and the original sheet 102 is an anti-copy document in step S89. Further, the image processing mechanism 321 subjects the image data of the read original image 111 to specific processing which makes an image illegible (e.g., an image is filled in with a black color) in step S89.

Figure 39A:
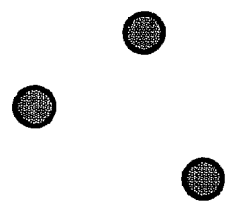
FIGS. 39A through 39D are illustrations for explaining arrangement of basic unit of original size.
Figure 39B:
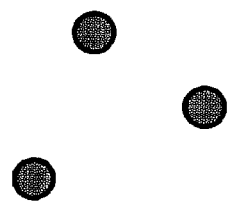
Figure 39C:
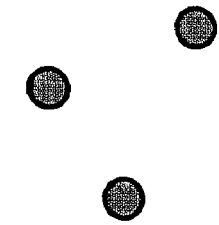
Figure 39D:
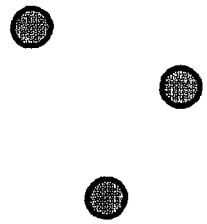

In the processing performed by the first detecting mechanism 324, only one kind of the background dot pattern 113 or 143 used as a pattern matching reference needs to be prestored because the normalizing mechanism 323 normalizes image data to its original size. There is a case where a slanted original sheet is scanned by the scanner 301. To deal with such a case in the pattern detection by the dot detector 401, as shown in FIGS. 39B, 39C, and 39D, a plurality of units are prepared by turning the basic unit A shown in FIG. 13 by predetermined degrees. As described above, the background dot pattern 143 (FIG. 14B) is made of a number of basic units A. FIG. 39A is an illustration of the basic unit A of FIG. 13. FIG. 39B is an illustration of a first unit B made by turning the basic unit A rightward by 90 degrees. FIG. 39C is an illustration of a second unit C made by turning the basic unit A leftward by 90 degrees. FIG. 39D is an illustration of a third unit D made by turning the basic unit A by 180 degrees.

Figure 40A:
FIGS. 40A through 40D are illustrations for explaining arrangement of basic unit of reduced at 50%.
Figure 40B:
Figure 40C:
Figure 40D:

The second detecting mechanism 325 is used when an image is reduced. The processing performed by the second detecting mechanism 325 is similar to the processing performed by the first detecting mechanism 324 described with reference to FIGS. 36 through 38, therefore its description is omitted here. In the processing performed by the second detecting mechanism 325, the second detecting mechanism 325 deals with an image which is not subjected to the processing in the normalizing mechanism 323. Therefore, it is necessary to preregister a plurality of background dot pattern 113 or 143 used as pattern matching references which are reduced according to scaling (reduction) ratios. One of the plurality of prestored background dot pattern 113 or 143 is selected based on the scaling ratio information obtained by the scaling ratio information obtaining mechanism 322. For detecting the background dot pattern 143 shown in FIG. 14B, as shown in FIGS. 39B, 39C, and 39D, a plurality of units are prepared by turning the basic unit A shown in FIG. 13 by predetermined degrees. In addition, it is necessary to prepare a plurality of units by turning the basic unit A reduced at an arbitrary reduction ratio by predetermined degrees. For example, FIG. 40A is an illustration of the basic unit A reduced at 50% in the sub-scanning direction. FIG. 40B is an illustration of a first unit B made by turning the reduced basic unit A of FIG. 40A rightward by 90 degrees. FIG. 40C is an illustration of a second unit C made by turning the reduced basic unit A of FIG. 40A leftward by 90 degrees. FIG. 40D is an illustration of a third unit D made by turning the reduced basic unit A of FIG. 40A by 180 degrees.

In the above-described processing of the image processing apparatus 300 in the flowchart of FIG. 33, when the CPU 304b determines that the magnification of the image was selected based on the scaling ratio information in step S54, the normalizing mechanism 323 normalizes the image data by reducing the magnified image to its original size in step S55. Then, the first detecting mechanism 324 detects if specific information, such as the background dot pattern 113 (FIGS. 6B and 7B) representing the prohibition of an output of image data is included in the normalized image data in step S56. When the CPU 304b determines that the reduction of the image was selected based on the scaling ratio information in step S54, the second detecting mechanism 325 detects if specific information, such as the background dot pattern 113 (FIGS. 6B and 7B) representing the prohibition of an output of image data is included in the reduced image data by reference to the prestored background dot pattern 113 as a pattern matching reference, which is reduced at the reduction ratio designated by the user, in step S57. By performing the above-described processing, the background dot pattern 113 representing the prohibition of an output of image data can be detected with high accuracy while achieving a real-time processing irrespective of a scaling ratio.

Figure 41:
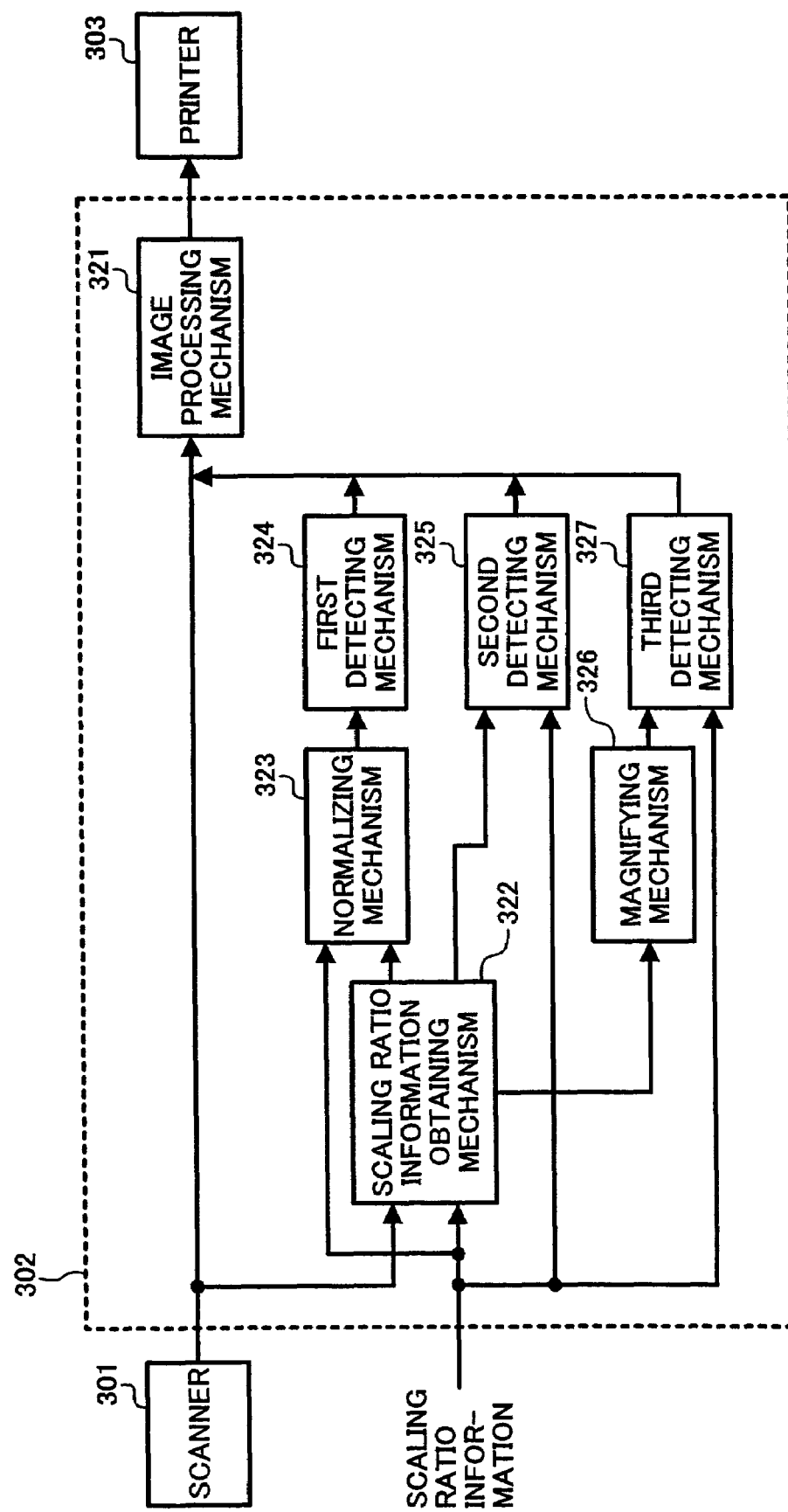
FIG. 41 is a block diagram of the image processing unit according to another exemplary embodiment.
Figure 42:
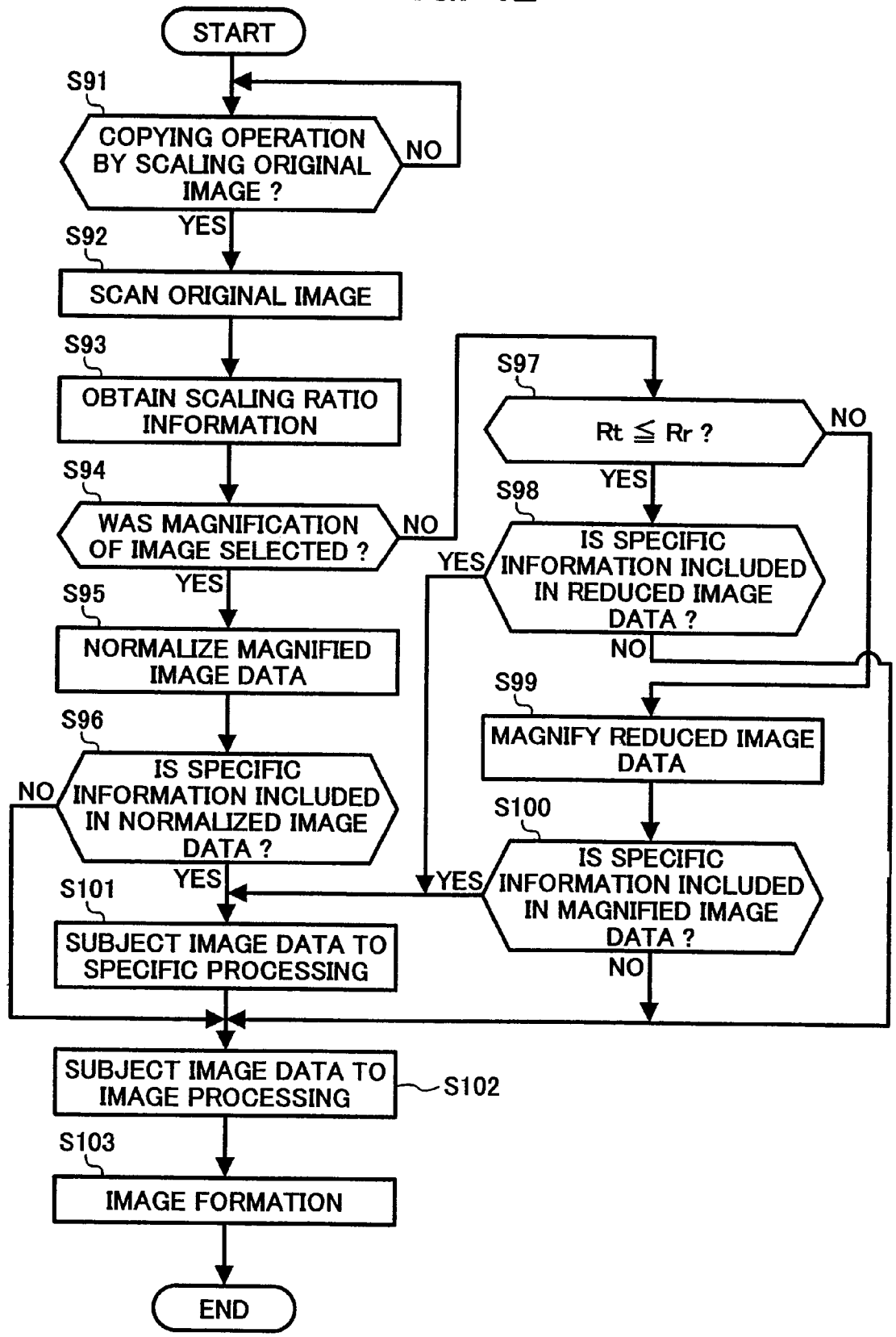
FIG. 42 is a flowchart of processing of the image processing apparatus when reproducing an original image according to another exemplary embodiment.

FIG. 41 is a block diagram of the image processing unit 302 according to another exemplary embodiment. As compared to the configuration of the image processing unit 302 of FIG. 32, the image processing unit 302 further includes a magnifying mechanism 326 and a third detecting mechanism 327 in addition to the image processing mechanism 321, the scaling ratio information obtaining mechanism 322, the normalizing mechanism 323, the first detecting mechanism 324, and the second detecting mechanism 325. FIG. 42 is a flowchart of processing of the image processing apparatus 300 when reproducing an original image according to another exemplary embodiment.

In step S91, the CPU 304b determines if a user operates the operation/display unit 305 and instructs a copying operation by scaling an original image at a desired scaling ratio. If the answer is YES in step S91, the scanner 301 scans an original image by scaling the image in the sub-scanning direction by changing the moving speed of the carriage of the scanner 301 in step S92. In this condition, the scanned image is compressed or extended in the sub-scanning direction as compared to an image of its original size. The scanned image is not scaled in the main scanning direction. The image data of the scanned image is output to the image processing mechanism 321 and the scaling ratio information obtaining mechanism 322 of the image processing unit 302. Subsequently, the scaling ratio information obtaining mechanism 322 obtains the information of scaling ratio which has been set by a user by operating the operation/display unit 305 in step S93. Then, the CPU 304b determines if the magnification of the image was selected based on the scaling ratio information in step S94. If the answer is YES in step S94, the normalizing mechanism 323 normalizes the image data by reducing the magnified image to its original size in step S95. Then, the first detecting mechanism 324 detects if specific information, such as the background dot pattern 113 (FIGS. 6B and 7B) representing the prohibition of an output of image data is included in the normalized image data in step S96.

If the CPU 304b determines that the reduction of the image was selected based on the scaling ratio information in step S94 (i.e., the answer is NO in step S94), the CPU 304b further determines if a reduction ratio (Rr) designated by the user is greater than or equal to a predetermined reduction ratio (Rt) in step S97. If the answer is YES in step S97, for example, Rr is 60% (0.6) and Rt is 50% (0.5), the second detecting mechanism 325 detects if specific information, such as the background dot pattern 113 (FIGS. 6B and 7B) representing the prohibition of an output of image data is included in the reduced image data by reference to the prestored background dot pattern 113 as a pattern matching reference, which is reduced at the reduction ratio designated by the user, in step S98. If the answer is NO in step S97, for example, Rr is 40% (0.4) and Rt is 50% (0.5), the magnifying mechanism 326 magnifies the reduced image data at a fixed magnification ratio, for example, two, in step S99. Then, the third detecting mechanism 327 detects if specific information, such as the background dot pattern 113 (FIGS. 6B and 7B) representing the prohibition of an output of image data is included in the image data magnified by the magnifying mechanism 326 at the fixed magnification ratio by reference to the prestored background dot pattern 113 as a pattern matching reference, which is changed according to a scaling ratio calculated by multiplying the scaling ratio obtained by the scaling ratio information obtaining mechanism 322 by the fixed magnification ratio in step S100. For example, a scaling ratio (80%=0.8) is calculated by multiplying a scaling ratio (40%=0.4) obtained by the scaling ratio information obtaining mechanism 322 by a fixed magnification ratio (2).

If the background dot pattern 113 is detected in steps S96, S98, and S100, the image processing mechanism 321 subjects the image data of the read image to specific processing which makes an image illegible (e.g., an image is filled in with a black color) in step S101. Alternatively, the output of the image from the printer 303 may be prohibited and the image data may be abandoned. Further, the image processing mechanism 321 subjects the image data of the read image to various necessary image processing in step S102 irrespective of the detection result in steps S96, S98, and S100. Then, the printer 303 forms an image on a recording medium, such as a sheet, based on the image data subjected to the above-described processing performed by the image processing mechanism 321 in step S103. Thus, the copying operation of an original image ends.

Figure 45:
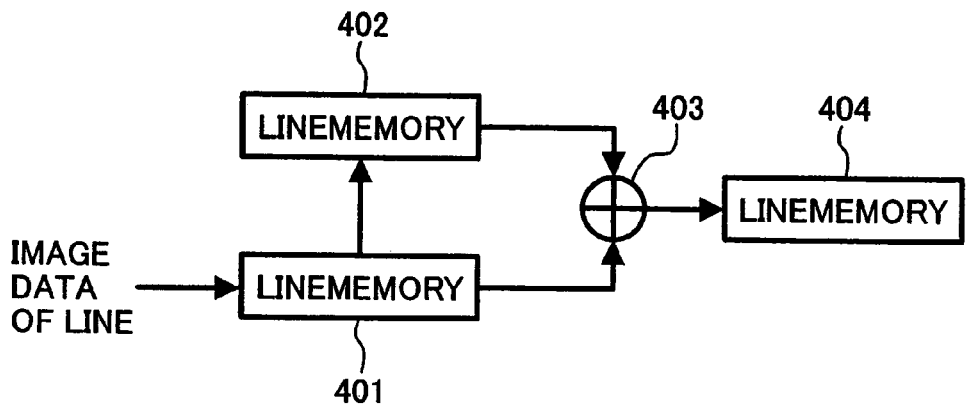
FIG. 45 is a schematic illustration of a circuit used when a magnifying mechanism magnifies reduced image data by two times.

In step S99, the magnifying mechanism 326 magnifies the reduced image data at a fixed magnification ratio by forming a pixel value of an additional line based on image data of a preceding line and image data of a succeeding line by using a linear interpolation method, for example. If the magnifying mechanism 326 magnifies the reduced image data by two times, the magnification can be achieved simply by using a circuit shown in FIG. 45. For example, image data is input to the circuit of FIG. 45 line by line. The image data of the present line is held in a linememory 401, and the image data of the immediately preceding line is held in a linememory 402. Further, image data of additional one line is formed based on the image data of the present line and the image data of the immediately preceding line by using a linear interpolation method in a line interpolation section 403, and is held in a linememory 404.

Figure 43:
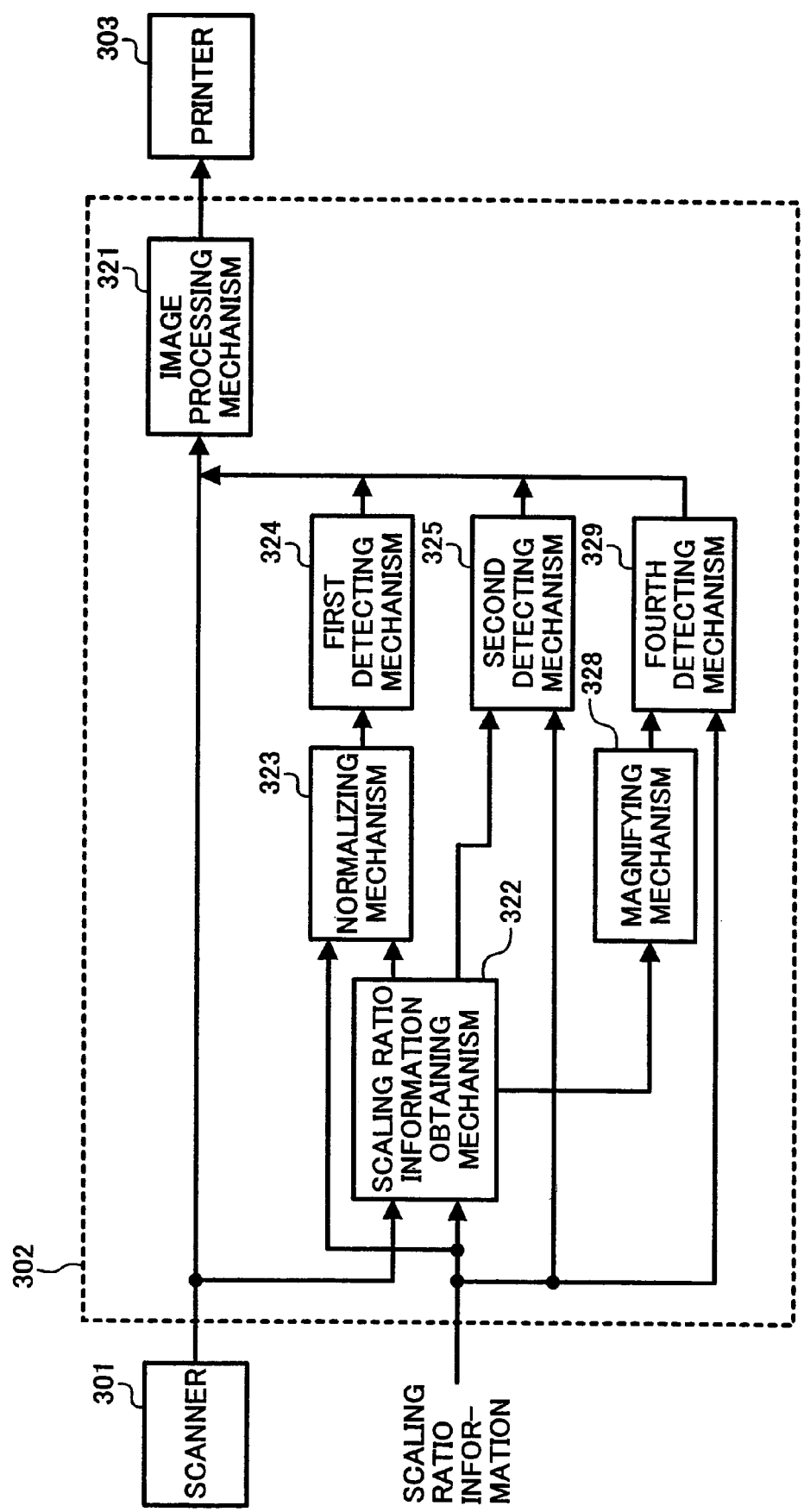
FIG. 43 is a block diagram of the image processing unit according to another exemplary embodiment.
Figure 44:
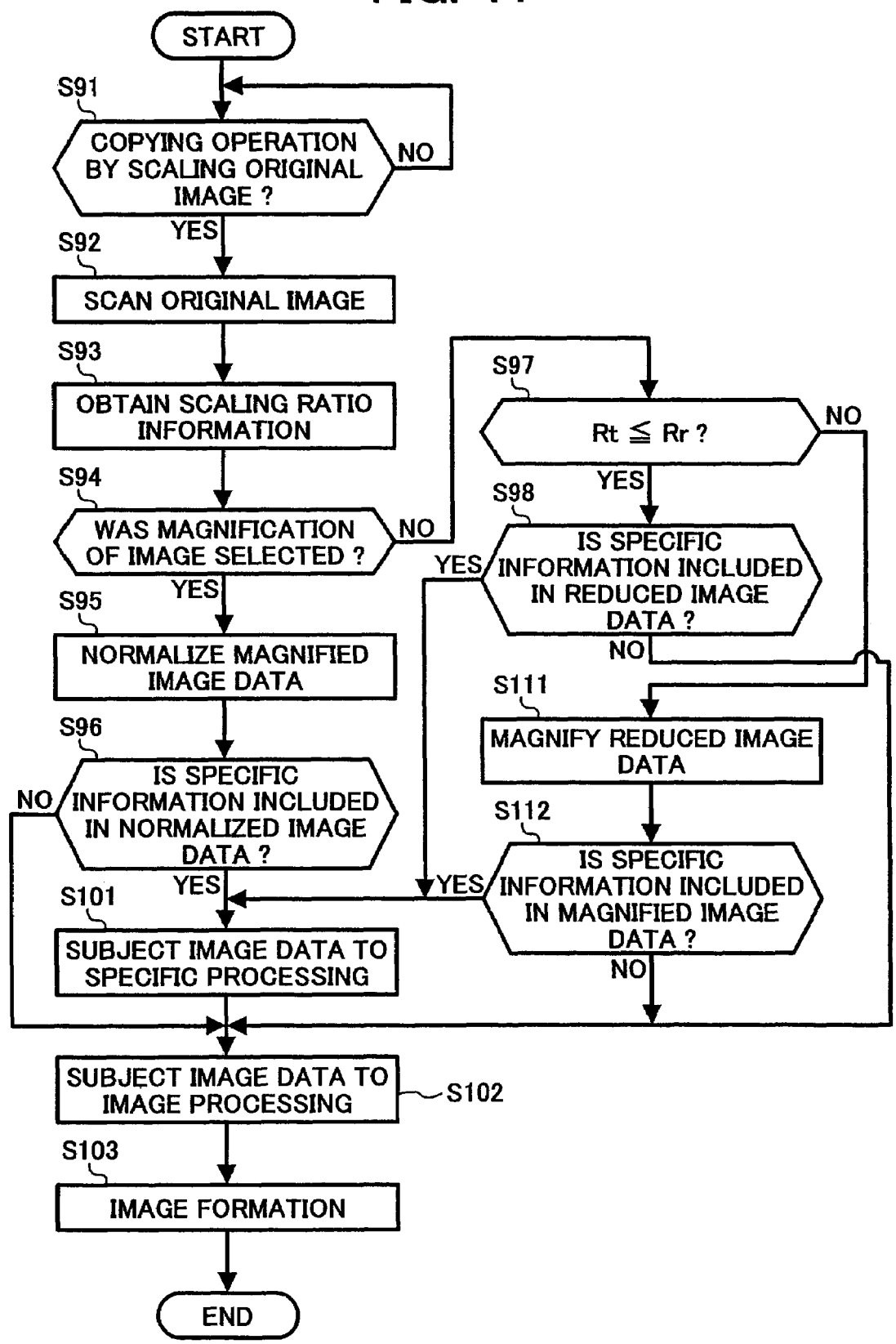
FIG. 44 is a flowchart of processing of the image processing apparatus when reproducing an original image according to another exemplary embodiment.

FIG. 43 is a block diagram of the image processing unit 302 according to another exemplary embodiment. As compared to the configuration of the image processing unit 302 of FIG. 32, the image processing unit 302 further includes a magnifying mechanism 328 and a fourth detecting mechanism 329 in addition to the image processing mechanism 321, the scaling ratio information obtaining mechanism 322, the normalizing mechanism 323, the first detecting mechanism 324, and the second detecting mechanism 325. FIG. 44 is a flowchart of processing of the image processing apparatus 300 when reproducing an original image according to another exemplary embodiment.

The steps S91 through S98 and the steps S101 through S103 in FIG. 44 are similarly performed as shown in the flowchart of FIG. 42. If the reduction ratio (Rr) designated by the user is less than the predetermined reduction ratio (Rt) in step S111, the magnifying mechanism 328 magnifies the reduced image data such that the scaling ratio of the image data becomes a fixed scaling ratio of greater than or equal to the predetermined reduction ratio (Rt) in step S111. For example, assuming that Rr is 40% and Rt is 50%, the magnifying mechanism 328 magnifies the reduced image data such that the scaling ratio of the image data becomes 60% as a fixed scaling ratio irrespective of the value of Rr. In step S111, the magnifying mechanism 328 magnifies the reduced image data by forming a pixel value of an additional line based on image data of a preceding line and image data of a succeeding line by using a linear interpolation method, for example. Then, the fourth detecting mechanism 329 detects if specific information, such as the background dot pattern 113 (FIGS. 6B and 7B) representing the prohibition of an output of image data is included in the image data magnified by the magnifying mechanism 328 by reference to the prestored background dot pattern 113 as a pattern matching reference, which is changed to the fixed scaling ratio (e.g. 60%) in step S112.

Each of the processing performed by the third detecting mechanism 327 and the processing performed by the fourth detecting mechanism 329 is similar to the processing performed by the first detecting mechanism 324 described with reference to FIGS. 36 through 38, therefore its description is omitted here. In the processing performed by the third detecting mechanism 327, the third detecting mechanism 327 deals with an image which is magnified at a fixed magnification ratio by the magnifying mechanism 326. Therefore, it is necessary to preregister a plurality of background dot pattern 113 or 143 used as pattern matching references which are changed according to a scaling ratio calculated by multiplying the scaling ratio obtained by the scaling ratio information obtaining mechanism 322 by the fixed magnification ratio. One of the plurality of prestored reference background dot pattern 113 or 143 is selected based on a scaling ratio calculated by multiplying the scaling ratio obtained by the scaling ratio information obtaining mechanism 322 by the fixed magnification ratio. For example, when the scaling ratio set by the user when scanning an original image is 40% and the fixed magnification ratio is two, the reference background dot pattern 113 or 143 reduced at the scaling ratio of 80% is selected.

In the processing performed by the fourth detecting mechanism 329, the fourth detecting mechanism 329 deals with an image which is magnified such that the scaling ratio of the image becomes a fixed scaling ratio of greater than or equal to the predetermined reduction ratio (Rt). In this case, only one background dot pattern 113 or 143 needs to be prestored as a pattern matching reference. For example, when the fixed scaling ratio is 60%, only the reference background dot pattern 113 or 143 reduced at the scaling ratio of 60% is used as a pattern matching reference irrespective of the reduction ratio (Rr) designated by the user, so long as the reduction ratio (Rr) is less than the predetermined reduction ratio (Rt).

In the above-described processing of the image processing apparatus 300 in the flowcharts of FIG. 42 and FIG. 44, when the CPU 304b determines that the magnification of the image was selected based on the scaling ratio information in step S94, the normalizing mechanism 323 normalizes the image data by reducing the magnified image to its original size in step S95. Then, the first detecting mechanism 324 detects if specific information, such as the background dot pattern 113 (FIGS. 6B and 7B) representing the prohibition of an output of image data is included in the normalized image data in step S96. When the CPU 304b determines that the reduction of the image was selected and the reduction ratio (Rr) designated by the user is greater than or equal to the predetermined reduction ratio (Rt) in step S97, the second detecting mechanism 325 detects if specific information, such as the background dot pattern 113 (FIGS. 6B and 7B) representing the prohibition of an output of image data is included in the reduced image data by reference to the prestored background dot pattern 113 as a pattern matching reference, which is reduced at the reduction ratio designated by the user, in step S98. By performing the above-described processing, the background dot pattern 113 representing the prohibition of an output of image data can be detected with high accuracy while achieving a real-time processing irrespective of a scaling ratio.

When the CPU 304b determines that the reduction of the image was selected and the reduction ratio (Rr) designated by the user is less than the predetermined reduction ratio (Rt) in step S97, the magnifying mechanism 326 magnifies the reduced image data at a fixed magnification ratio, for example, two, in step S99. Then, the third detecting mechanism 327 detects if specific information, such as the background dot pattern 113 (FIGS. 6B and 7B) representing the prohibition of an output of image data is included in the image data magnified by the magnifying mechanism 326 at the fixed magnification ratio by reference to the prestored background dot pattern 113 as a pattern matching reference, which is changed according to a scaling ratio calculated by multiplying the scaling ratio obtained by the scaling ratio information obtaining mechanism 322 by the fixed magnification ratio in step S100. Alternatively, the magnifying mechanism 328 magnifies the reduced image data such that the scaling ratio of the image data becomes a fixed scaling ratio of greater than or equal to the predetermined reduction ratio (Rt) in step S111. Then, the fourth detecting mechanism 329 detects if specific information, such as the background dot pattern 113 (FIGS. 6B and 7B) representing the prohibition of an output of image data is included in the image data magnified by the magnifying mechanism 328 by reference to the prestored background dot pattern 113 as a pattern matching reference, which is changed to the fixed scaling ratio in step S112.

Figure 46:
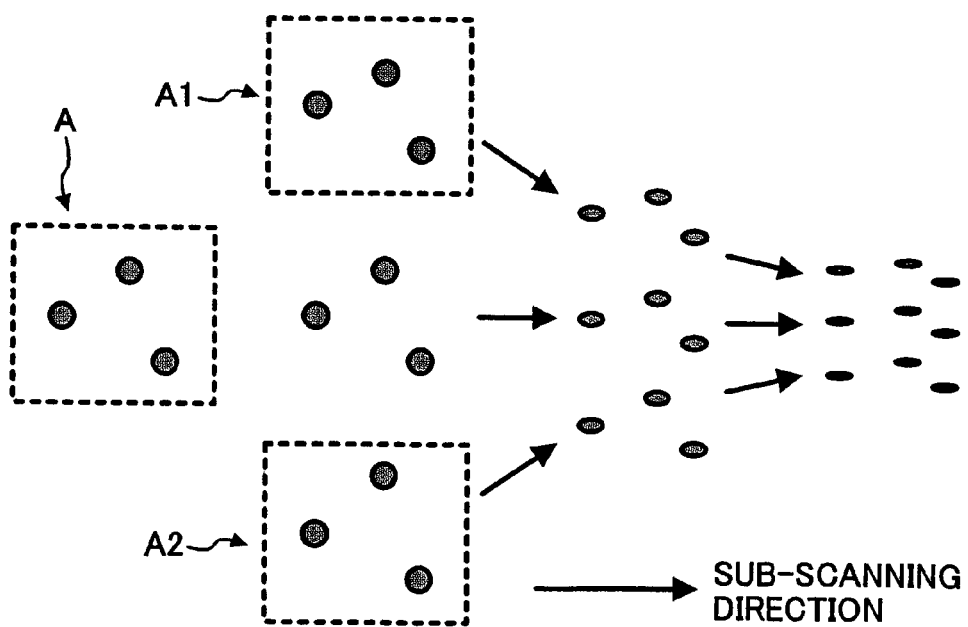
FIG. 46 is a schematic illustration of a basic unit included in a background dot pattern, and other basic units similar to the basic unit.

If the degree of reduction increases, the size of the background dot pattern 113 (FIGS. 6B and 7B) or the background dot pattern 143 (FIG. 14B) used as a pattern matching reference decreases. FIG. 46 illustrates the basic unit A included in the background dot pattern 143 representing the prohibition of an output of image data, and basic units A1 and A2 which are similar to the basic unit A. As shown in FIG. 46, as the basic units A, A1, and A2 are reduced in the sub-scanning direction, there is little difference between the basic units A, A1, and A2. If the degree of reduction designated by the user is significantly great, that is, if the reduction ratio (Rr) designated by the user is less than the predetermined reduction ratio (Rt), an erroneous dot pattern detection occurs due to the above-described similarity of reduced reference dot pattern. However, in the present embodiment, the image data reduced at a small reduction ratio (e.g., 20%) is magnified by the magnifying mechanism 326 or 328 in step S99 or S111. Then, the detecting mechanism 327 or 329 can detect a background dot pattern adequately by reference to a reference dot pattern which is not reduced to such a degree causing an erroneous dot pattern detection.

In the magnification processing performed by the magnifying mechanism 326 or 328 in step S99 or S111, the number of lines to be processed increases by magnifying the image data before the detecting processing performed by the detecting mechanism 327 or 329, resulting in deterioration of real-time processing. The degree of pattern detection accuracy decreases when the reduction ratio falls below the predetermined ratio (Rt). Therefore, in the magnification processing performed by the magnifying mechanism 326 or 328, it is not necessary for magnifying the image data to its original size, but it is necessary for magnifying the image data to at least the predetermined ratio (Rt) at which pattern detection accuracy can be prevented from decreasing. By doing so, the significant increase of the number of lines to be processed can be prevented. Further, if the magnifying mechanism 326 magnifies the reduced image data at a fixed magnification ratio, for example, two, in step S99, the magnifying processing performed by the magnifying mechanism 326 can be simplified. Thereby, the increase of amount of processing by software and the increase of the scale of a circuit which performs software processing can be prevented.

Figure 47:
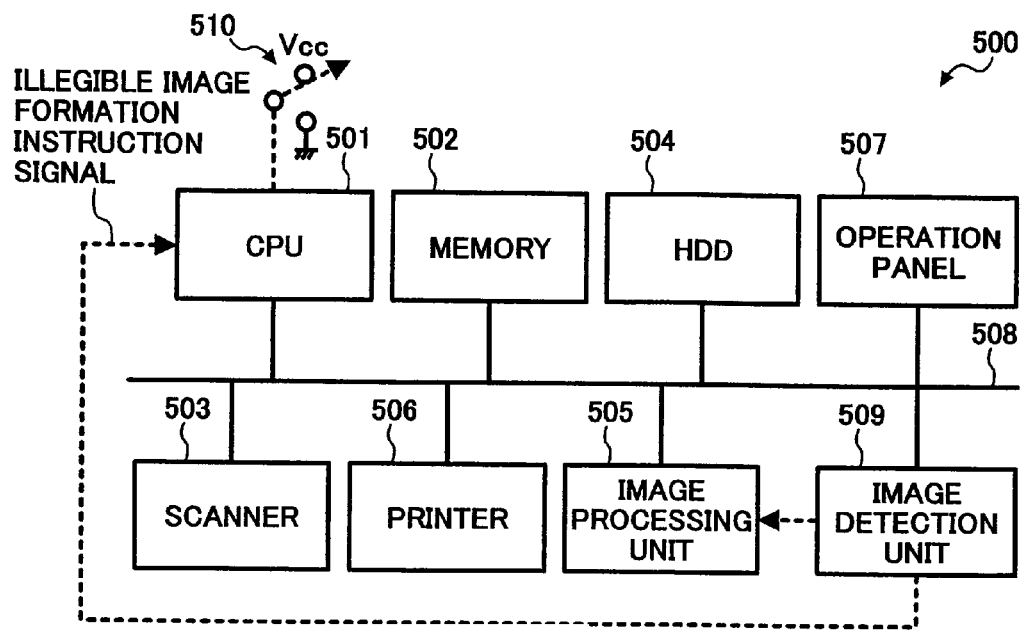
FIG. 47 is a block diagram of an image processing apparatus according to another exemplary embodiment of the present invention.

FIG. 47 is a block diagram of an image processing apparatus according to another exemplary embodiment of the present invention. As shown in FIG. 47, an image processing apparatus 500 includes a CPU 501, a memory 502, a scanner 503, a magnetic storage device 504 such as an HDD (Hard Disk Drive), an image processing unit 505, a printer 506, and an operation panel 507. The above-described devices are connected to each other via a bus 508. The CPU 501 controls the devices of the image processing apparatus 500. The memory 502 is constructed of storage devices, such as a ROM, RAM, and flash memory. The scanner 503 reads an original image of an original sheet. The magnetic storage device 504 stores image data of the read original image. The image processing unit 505 performs various image processing relative to the image data of the read original image. The printer 506 forms images on a recording medium, such as a sheet, based on the image data subjected to the image processing. The operation panel 507 includes a touch panel and displays various messages based on user requests for various operations of the image processing apparatus 500. Further, an image detection unit 509 can be connected to the image processing apparatus 500 as an optional unit. The image detection unit 509 performs detecting processing based on a predetermined program and detects if specific information is included in the image data of the read original image.

The printer 506 can employ various printing methods, such as an inkjet method, a dye-sublimation thermal-transfer method, a silver halide photography method, a direct thermal recording method, a fusion thermal-transfer method, in addition to an electrophotographic method.

The image detection unit 509 includes a microprocessor and operates based on a control program preinstalled in the ROM of the memory 502. The detecting processing performed by the image detection unit 509 is described below.

The image processing apparatus 500 can be a digital copying machine or can be configured such that the scanner 503 and the printer 506 are connected to a personal computer. Alternatively, the image processing apparatus 500 can be configured such that the printer 506 is connected to an image reading device.

Figure 48:
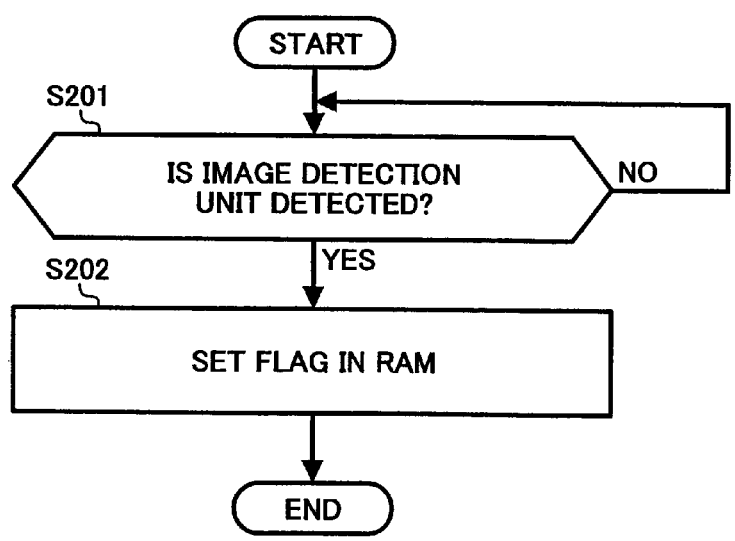
FIG. 48 is a flowchart of processing performed when setting a flag in a RAM.

Next, a processing performed by the image processing apparatus 500 is described. FIG. 48 is a flowchart of a detecting operation for detecting an attachment of the image detection unit 509 to the image processing apparatus 500 according to an exemplary embodiment of the present invention. The detecting processing starts when a main power supply (not shown) of the image processing apparatus 500 is turned on. When the image processing apparatus 500 starts operating, the CPU 501 checks devices connected to the bas 508, and determines if the image detection unit 509 is detected in step S201. If the image detection unit 509 is detected (i.e., the answer is YES in step S201), the CPU 501 sets a flag in the RAM of the memory 502 in step S202. The flag represents information such that the image detection unit 509 is attached to the image processing apparatus 500. Such information can be set by using a dip switch 510 (shown in FIG. 47) instead of the flag.

Figure 49:
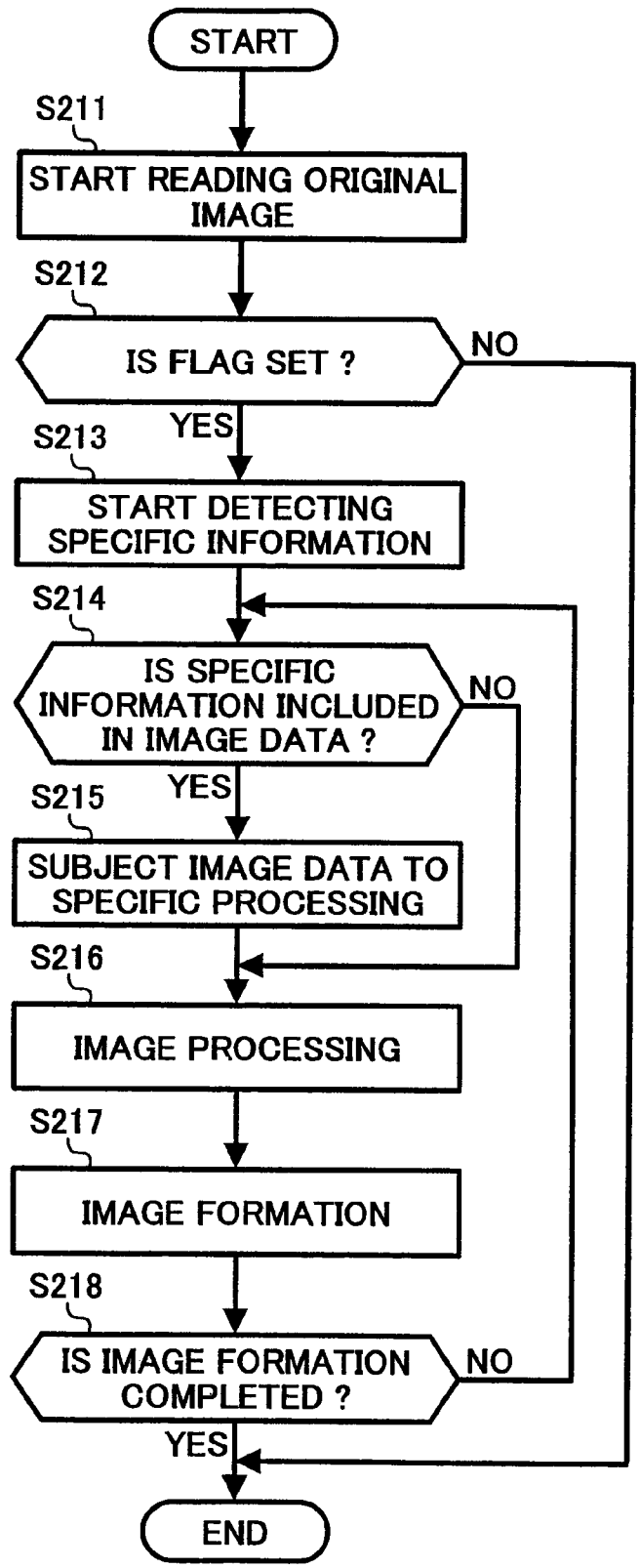
FIG. 49 is a flowchart of processing performed when an original image of an original sheet is reproduced.

Next, the processing performed by the image processing apparatus 500 when an original image of an original sheet is reproduced is described with reference to FIG. 49. The processing of the image processing apparatus 500 starts when a user instructs a reproduction of an original image by operating the operation panel 507.

In step S211, the scanner 503 starts reading an original image of an original sheet. Subsequently, the CPU 501 determines if the above-described flag is set in step S212. That is, the CPU 501 determines if the image detection unit 509 is attached to the image processing apparatus 500. If the answer is YES in step S212, the CPU 501 reads out a control program for use in the image detection unit 509 from a predetermined storage area, such as the ROM as a storage medium of the memory 502, and starts a processing for detecting if specific information is included in the image data of the read original image in step S213 (the detail of the processing is described below). Subsequently, the CPU 501 determines if specific information is included in the image data of the read original image in step S214. If the answer is YES in step S214, the image detection unit 509 outputs a predetermined illegible image formation instruction signal to the CPU 501, and the CPU 501 causes the image processing unit 505 to subject.

the image data of the read original image to specific processing which makes an image illegible (e.g., an image is filled in with a black color) in step S215. Further, the image processing unit 505 subjects the image data of the read original image to various necessary image processing in step S216. Then, the printer 506 forms an image on a recording medium, such as a sheet, based on the image data subjected to the above-described processing in step S217. Subsequently, the CPU 501 determines if an image formation by the printer 506 is completed in step S218. If the answer is NO in step S218, the processing returns to reexecute step S214. If the answer is NO in step S212, an ordinary image reproducing operation is performed.

If specific information, such as a predetermined background dot pattern representing the prohibition of a reproduction of image data, is included in image data of an original image, the image data of the original image is subjected to specific processing which makes an image illegible. According to the processing of FIG. 49, the reading of an original image, the detecting processing of the image detection unit 509, the image processing of the image processing unit 505, and the image formation by the printer 506 are performed concurrently. Even if the image detection unit 509 detects the specific information representing an anti-copy document during a period when the printer 506 forms an image on a recording medium, the image processing unit 505 starts causing the image data used for image forming operation to be subjected to the above-described specific processing which makes an image illegible. If the image processing apparatus 500 is a mono-color copying machine that prints at a high speed and starts an image forming operation at a substantially same timing as an original image reading operation, a illegible image formation is instructed immediately when a background dot pattern representing the prohibition of a reproduction of image data in an original image is detected during when the original image is read by the scanner 503. Therefore, the illegible image formation starts by the time the image formation by the printer 506 is completed.

Figure 50:
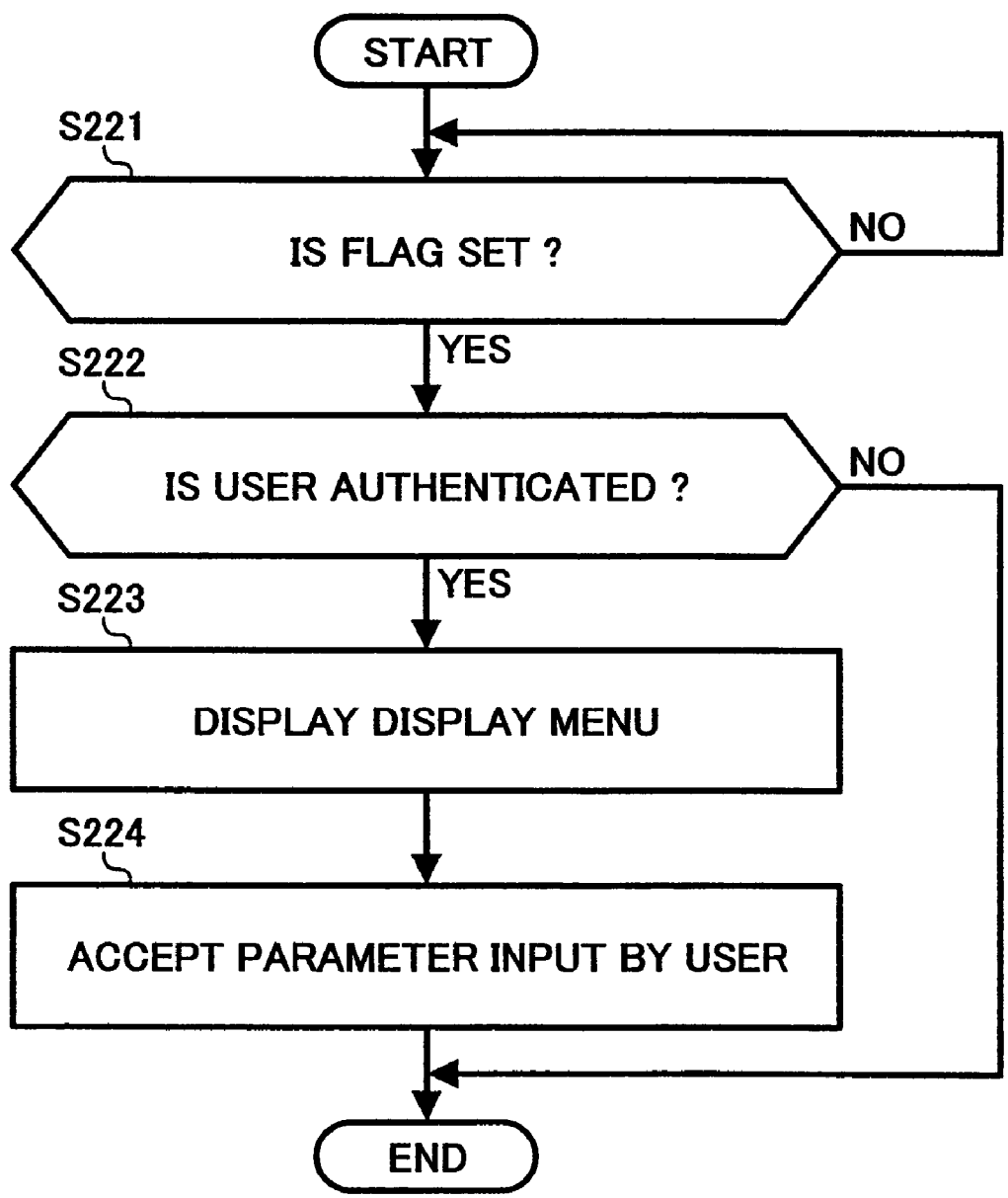
FIG. 50 is a flowchart of processing performed when a display menu is displayed when an image detection unit is attached to the image processing apparatus of FIG. 47.
Figure 51:
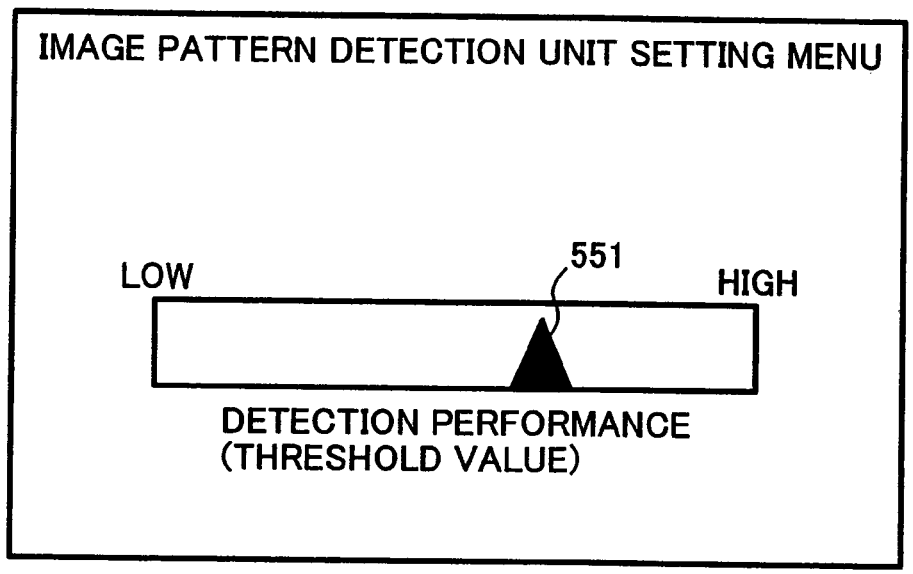
FIG. 51 is a top view of a display menu according to an exemplary embodiment.

Further, the processing shown in a flowchart of FIG. 50 is also performed by the image processing apparatus 500. In step S221, the CPU 501 determines if the above-described flag is set. If the answer is YES in step S221, that is, the CPU 501 determines that the image detection unit 509 is attached to the image processing apparatus 500, the CPU 501 determines if a user is authenticated by performing a known matching operation using a password, a fingerprint, or the like in step S222. If the answer is YES in step S222, the CPU 501 reads out a display menu from the ROM of the memory 502 which is to be displayed on the operation panel 507 when the image detection unit 509 is attached to the image processing apparatus 500, in step S223. FIG. 51 is an illustration of an exemplary display menu. A user inputs a parameter with respect to a detection of an anti-copy document through the operation panel 507, and the CPU 501 accepts the parameter input by the user in step S224.

Figure 52:
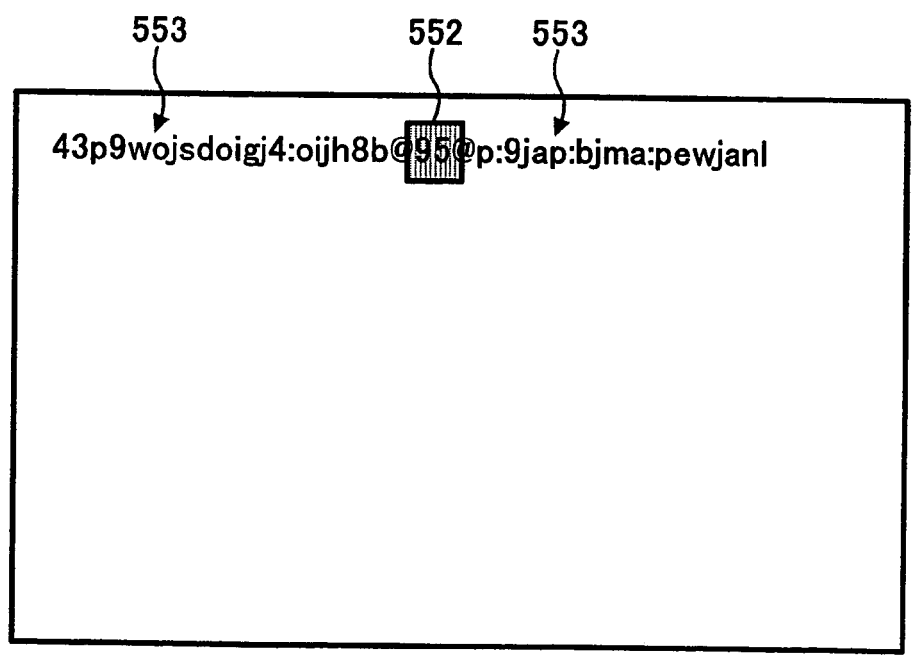
FIG. 52 is a top view of a display menu according to another exemplary embodiment.

The exemplary display menu shown in FIG. 51 represents threshold values (described below) used for setting the detection performance of the image detection unit 509. For example, in the display menu in FIG. 51, any threshold value ranging from a low level to a high level can be set with a black-triangle shaped level meter 551. However, if anyone can easily set such a threshold value, the significance of the image detection unit 509 attached to the image processing apparatus 500 as an optional unit decreases. For this reason, as an alternative to the display menu shown in FIG. 51, a display menu shown in FIG. 52 can be used. In the display menu of FIG. 52, a threshold value is expressed with a numeric value 552 without using the level meter 551. Alternatively, the threshold value may be expressed with a character or a symbol. As shown in FIG. 52, the numeric value 552 is sandwiched between meaningless characters, symbols, or numeric values. A user who is not familiar with such a display menu shown in FIG. 52 cannot set or change the threshold value arbitrarily, so that the image detection unit 509 can be fully utilized for prohibiting the reproduction of an anti-copy document.

Figure 53:
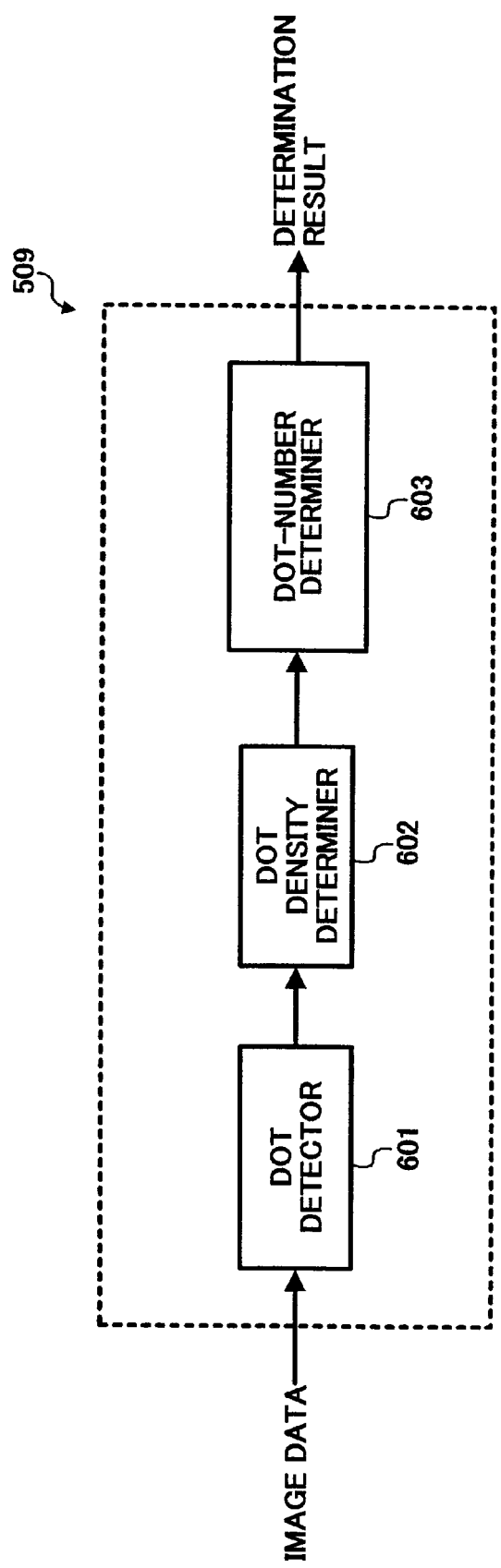
FIG. 53 is a block diagram of an exemplary configuration of the image detection unit.
Figure 54:
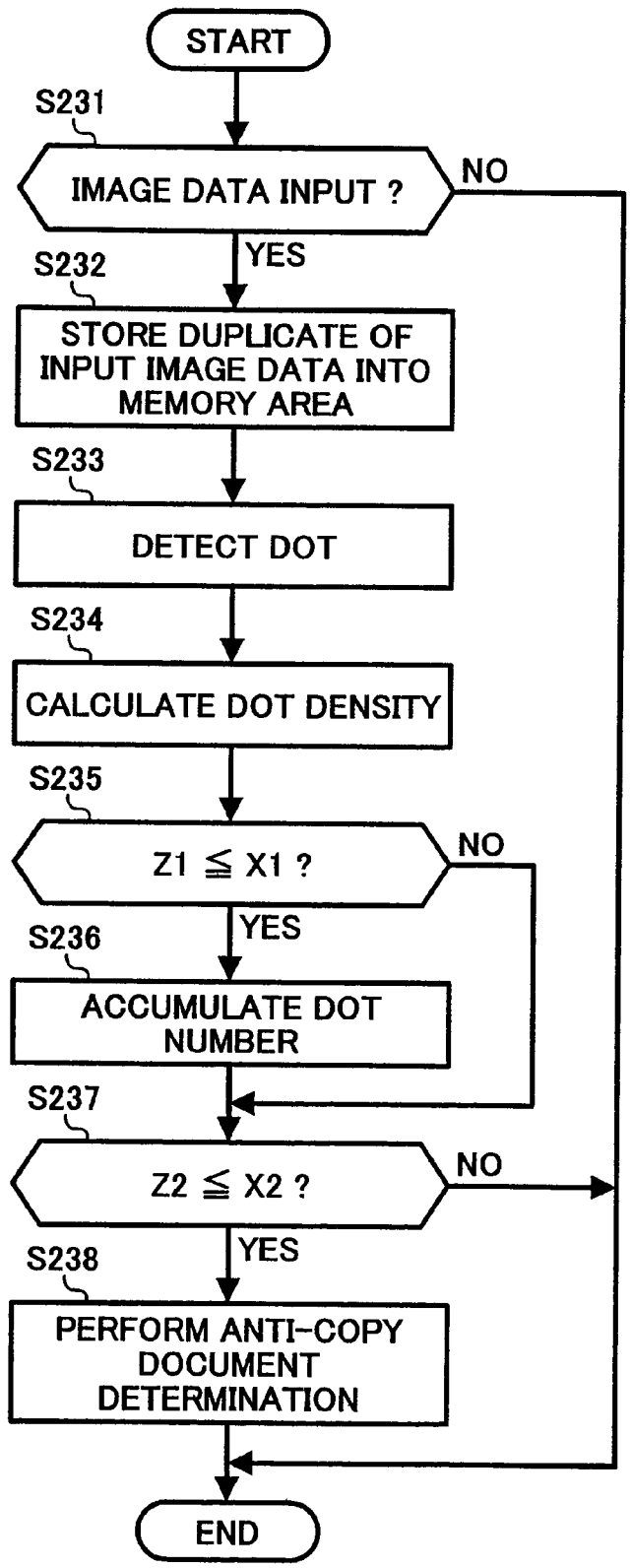
FIG. 54 is a flowchart of processing performed when detecting a background dot pattern according to an exemplary embodiment.

Next, a processing performed by the image detection unit 509 is described. FIG. 53 is a block diagram of an exemplary configuration of the image detection unit 509. The image detection unit 509 includes a dot detector 601, a dot density determiner 602, and a dot-number determiner 603. FIG. 54 is a flowchart of the processing performed by the image detection unit 509. In step S231 of FIG. 54, the CPU 501 checks if image data read from the original image 111 (FIG. 6A) by the scanner 503 is input to the memory 502. If the answer is YES in step S231, the CPU 501 stores the duplicate of the input image data into a memory area of the magnetic storage device 504 in step S232. Then, in step S233, the dot detector 601 detects the dots 106c (FIG. 6B) from the input image data stored in the memory area of the magnetic storage device 504. An actual detection method may be one of various conventional methods for detecting images such as a pattern matching method. Then, in step S234, the dot density determiner 602 calculates a dot density (Z1) in a unit area with respect to the dots 106c detected by step S233. Subsequently, the dot density determiner 602 determines if the calculated density (Z1) of the dots 106c is smaller than or equal to a prestored threshold value (X1) in step S235. If the answer is YES in step S235, the dot-number determiner 603 accumulates the number of dots 106c (Z2) in a counter (not shown) in step S236. Then, the dot-number determiner 603 determines if the accumulated dot number (Z2) is smaller than or equal to a prestored threshold value (X2) in step S237. If the answer is YES in step S237, the dot-number determiner 603 determines that the background dot pattern 113 (FIG. 6B) is included in the image data of the original image 111 (FIG. 6B) and the original sheet 102 (FIG. 6B) is an anti-copy document in step S238. Further, the image processing unit 505 subjects the image data of the read original image 111 to specific processing which makes an image illegible (e.g., an image is filled in with a black color) in step S238.

Figure 55:
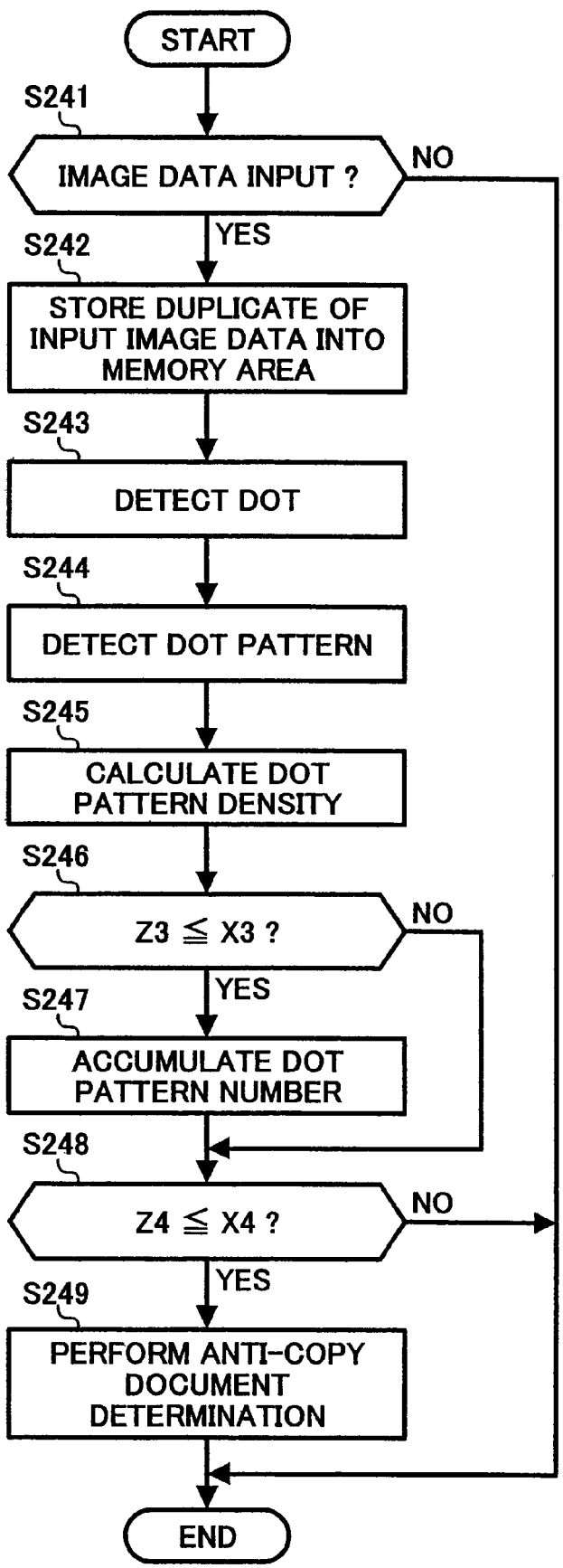
FIG. 55 is a flowchart of processing performed when detecting a background dot pattern according to another exemplary embodiment.

FIG. 55 is a flowchart of the processing performed by the image detection unit 509 according to another exemplary embodiment of the present invention. In step S241 of FIG. 55, the CPU 501 checks if image data read from the original image 111 (FIG. 6A) by the scanner 503 is input to the memory 502. If the answer is YES in step S241, the CPU 501 stores the duplicate of the input image data into a memory area of the magnetic storage device 504 in step S242. Then, in step S243, the dot detector 601 detects the dots 106c (for example, FIG. 14B) from the input image data stored in the memory area of the magnetic storage device 504. An actual detection method may be one of various conventional methods for detecting images such as a pattern matching method. Then, the dot detector 601 detects, for example, the background dot pattern 143 (FIG. 14B) made of a number of the basic units A (FIG. 13) in step S244. Then, in step S245, the dot density determiner 602 calculates a dot pattern density (Z3) in a unit area with respect to the background dot pattern 143 detected by step S244. Subsequently, the dot density determiner 602 determines if the calculated dot pattern density (Z3) of the background dot pattern 143 is smaller than or equal to a prestored threshold value (X3) in step S246.

If the answer is YES in step S246, the dot-number determiner 603 accumulates the number of background dot pattern 143 (Z4) in a counter (not shown) in step S247. Then, the dot-number determiner 603 determines if the accumulated background dot pattern number (Z4) is smaller than or equal to a prestored threshold value (X4) in step S248. If the answer is YES in step S248, the dot-number determiner 603 determines that the background dot pattern 143 is included in the image data of the original image 111 and the original sheet 102 is an anti-copy document in step S249. Further, the image processing unit 505 subjects the image data of the read original image 111 to specific processing which makes an image illegible (e.g., an image is filled in with a black color) in step S249.

There is a case where a slanted original sheet is scanned by the scanner 503. To deal with such a case in the pattern detection by the dot detector 601, as described above with reference to FIGS. 39B, 39C, and 39D, a plurality of units are prepared by turning the basic unit A shown in FIG. 13 by predetermined degrees.

Figure 56:
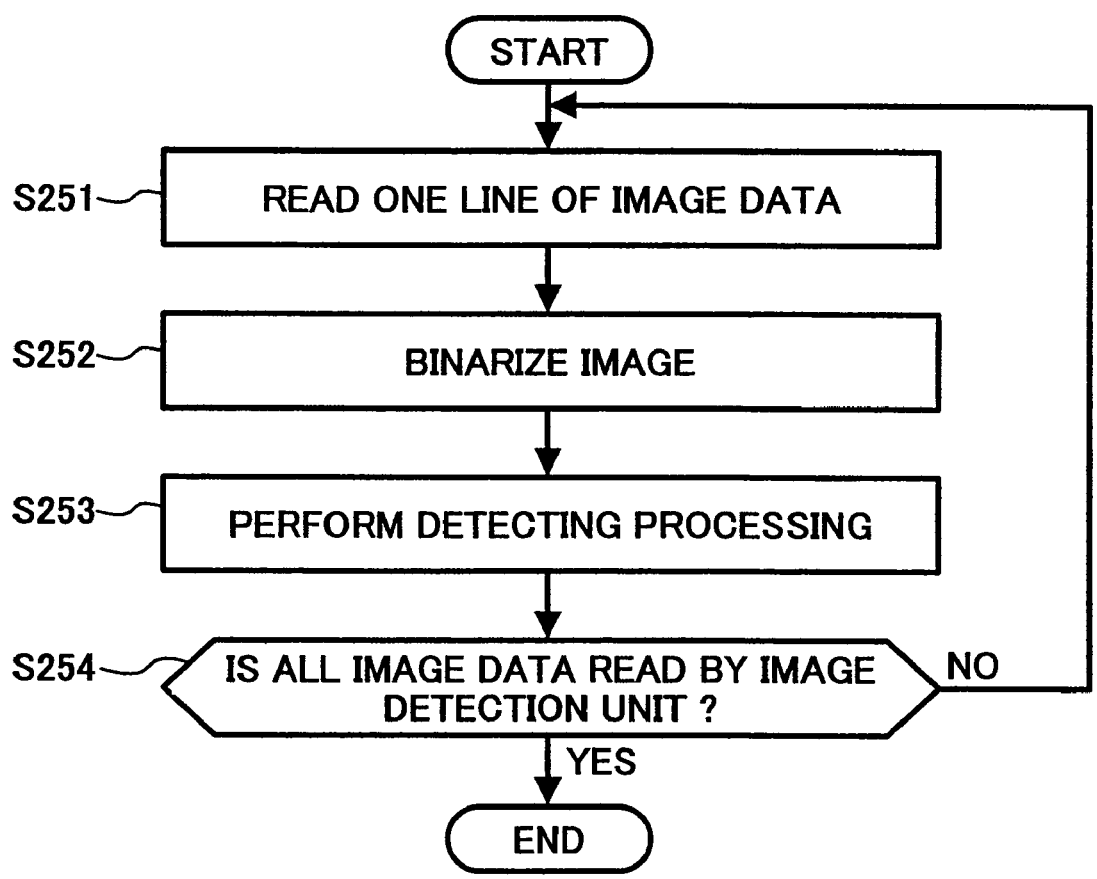
FIG. 56 is a flowchart of processing performed when detecting a background dot pattern according to another exemplary embodiment.

As described above, the reading of an original image, the detecting processing of the image detection unit 509, the image processing of the image processing unit 505, and the image formation by the printer 506 are performed concurrently. Therefore, each of the detecting processing of the image detection unit 509 in the flowcharts of FIGS. 54 and 55 is actually performed as shown in the flowchart of FIG. 56.

In step S251, one line of image data scanned by the scanner 503 is read by the image detection unit 509. Then, the image detection unit 509 binarizes an image of a specific color in step S252. Subsequently, the image detection unit 509 performs the detecting processing described with reference to the flowcharts of FIGS. 54 and 55 in step S253. Specifically, in step S253, the image detection unit 509 detects the position of the dots 106c (FIG. 14B), and performs a pattern matching relative to the detected dots 106c in addition to the dots 106c in the preceding lines of scanned image data read by the image detection unit 509 by reference to the background dot pattern 143 (FIG. 14B) made of the basic units A. Further, the image detection unit 509 detects the background dot pattern 143 based on the result of the pattern matching in step S253. Subsequently, the CPU 501 determines if all the image data scanned by the scanner 503 is read by the image detection unit 509 in step S254. If the answer is NO in step S254, a succeeding one line of image data scanned by the scanner 503 is read by the image detection unit 509 in step S251.

Figure 57:
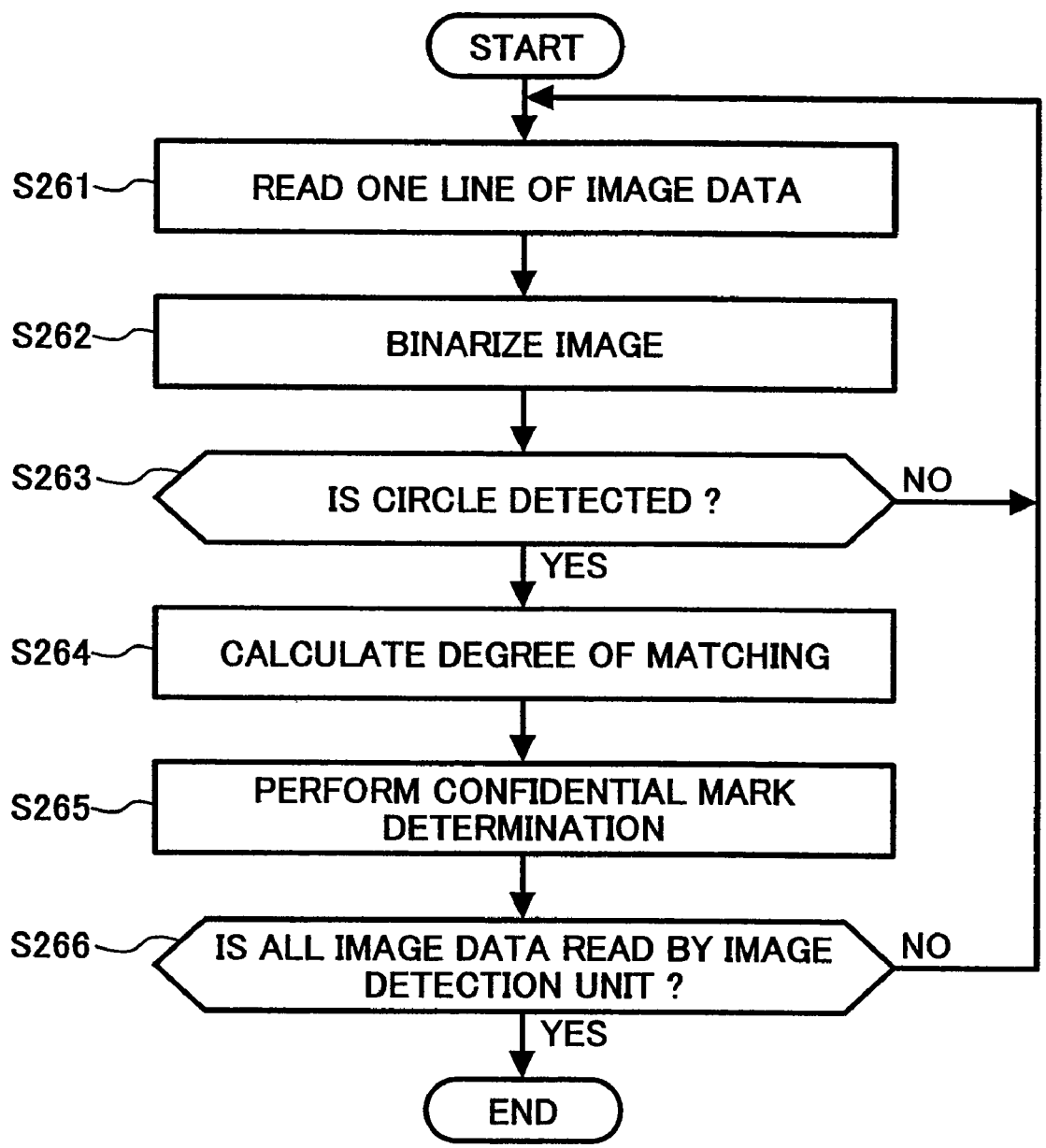
FIG. 57 is a flowchart of processing performed when detecting a confidential mark according to an exemplary embodiment.

Next, an exemplary detection processing of the image detection unit 509 for detecting a specific confidential mark such as a circled "CONFIDENTIAL" of a red color in an original image is described with reference to FIG. 57. In step S261, one line of image data scanned by the scanner 503 is read by the image detection unit 509. Then, the image detection unit 509 binarizes an image of a specific color (for example, a red color in this embodiment) in step S262. Next, the image detection unit 509 determines if a circle is detected in step S263. If the answer is YES in step S263, the image inside of the circle is cut out and the degree of matching with the character "CONFIDENTIAL" is calculated in step S264. Then, the image detection unit 509 determines if the detected image is a confidential mark based on the matching result in step S265. Subsequently, the CPU 501 determines if all the image data scanned by the scanner 503 is read by the image detection unit 509 in step S266. If the answer is NO in step S266, a succeeding one line of image data scanned by the scanner 503 is read by the image detection unit 509 in step S261.

Next, a comparison of the processing for detecting an image such as the above-described confidential mark and the processing for detecting the background dot pattern 143 (FIG. 14B) is described. When detecting a confidential mark, a binary image needs to be stored at least until the binary image is subjected to the circle detection processing and the matching processing. Further, any confidential mark needs to be detected by the matching method regardless of whether the confidential mark is turned at any angle. To deal with this, matching processing needs to be performed relative to the confidential mark turned at all angles by preparing patterns of the character "confidential" turned at various angles, by turning the prestored pattern at different angles, or by turning the cut-out image at different angles. An amount of such processing becomes significant. In contrast, when detecting the background dot pattern 143, a using amount of a memory can be decreased because an amount of stored binary images can be decreased by considering the arrangement of a prestored pattern and the background dot pattern 143 can be stored by using coordinates. Even if an original sheet is skewed, just the positional relation of the dots 106*c* is changed. For this reason, a processing amount does not increase so long as the background dot pattern 143 is detected by using coordinates.

Generally, a confidential mark is formed at one place on an original sheet. If such a confidential mark is covered by a user, the area of the original sheet other than the confidential mark can be reproduced. In contrast, if the background dot pattern 143 or an electronic watermark (described below) overlays an entire original image, the reproduction of an anti-copy document can be prevented.

Further, if the image processing apparatus 500 is a monocolor copying machine that prints at a high speed and starts an image forming operation at a substantially same timing as an original image reading operation, an image may be printed before reflecting an anti-copy document detection result. However, if the background dot pattern 143 overlays an entire original image or portions around the edge of an original image, the influence caused by the delay of the anti-copy document detection can be reduced irrespective of whether an original sheet is put at any position, as compared to the influence caused by the delay of the anti-copy document detection by using a confidential mark.

Figure 58:
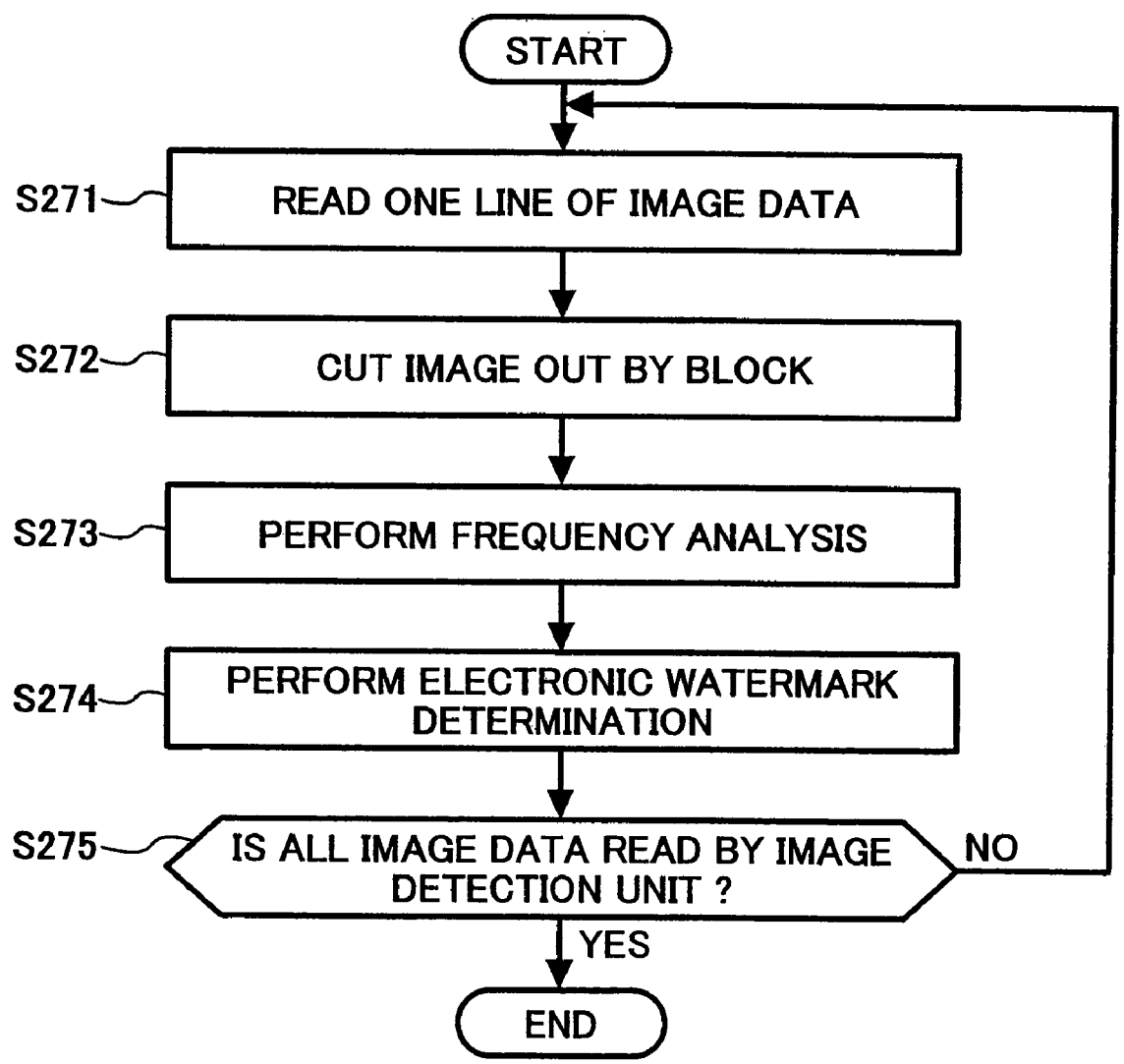
FIG. 58 is a flowchart of processing performed when detecting an electronic watermark according to an exemplary embodiment.

FIG. 58 is a flowchart of the processing performed by the image detection unit 509 according to another exemplary embodiment of the present invention. In this embodiment, an electronic watermark formed by data of frequency component overlays an original image. In step S271, one line of image data scanned by the scanner 503 is read by the image detection unit 509. Then, the image detection unit 509 cuts the image out by a block of a predetermined size in step S272, and performs a frequency analysis in step S273. Then, the image detection unit 509 determines if the cut image includes a predetermined electronic watermark representing the prohibition of a reproduction of image data based on the frequency analysis result in step S274. Subsequently, the CPU 501 determines if all the image data scanned by the scanner 503 is read by the image detection unit 509 in step S275. If the answer is NO in step S275, a succeeding one line of image data scanned by the scanner 503 is read by the image detection unit 509 in step S271.

Figure 59:
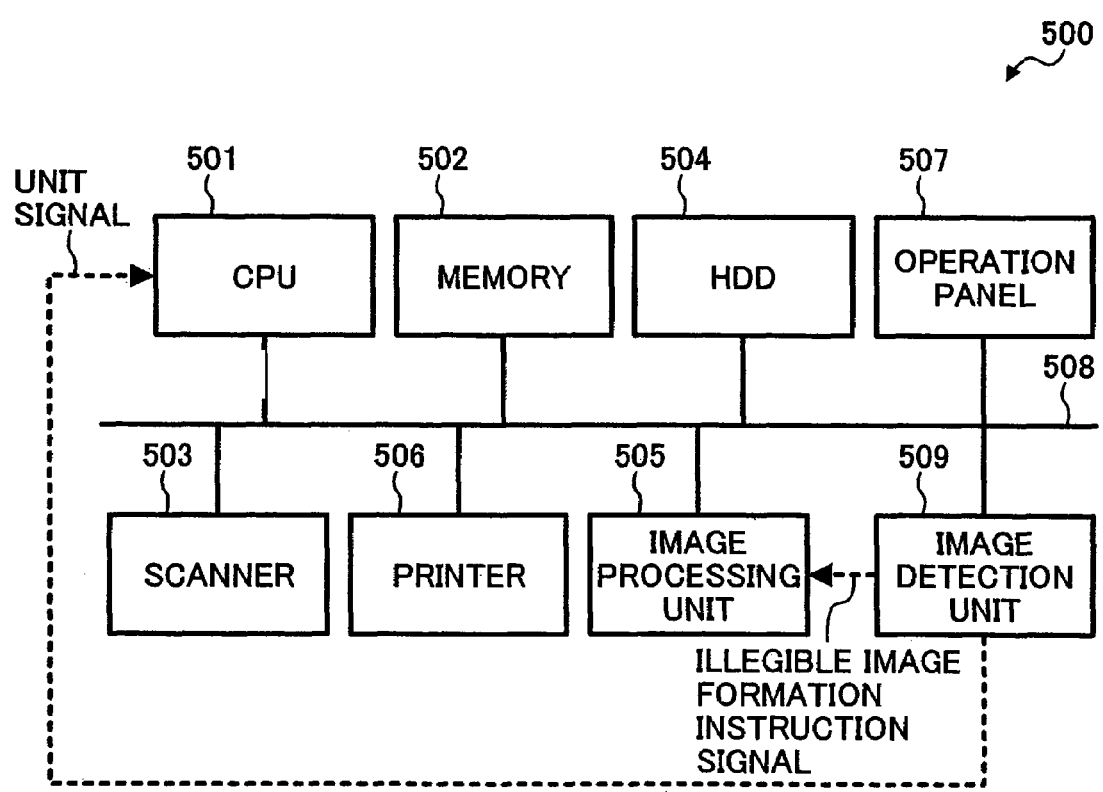
FIG. 59 is a block diagram of the image processing apparatus according to another exemplary embodiment of the present invention.

FIG. 59 is a block diagram of the image processing apparatus 500 according to another exemplary embodiment of the present invention. The configuration of the image processing apparatus 500 of FIG. 59 is substantially the same as that of the image processing apparatus 500 of FIG. 47 except that the image detection unit 509 outputs a unit signal indicative of the attachment of the image detection unit 509 to the image processing apparatus 500 to the CPU 501, and outputs an illegible image formation instruction signal directly to the image processing unit 505 instead of the CPU 501. As described above, in the configuration of the image processing apparatus 500 of FIG. 47, when the image processing apparatus 500 starts operating, the CPU 501 determines if the image detection unit 509 is detected. Further, when the image detection unit 509 outputs an illegible image formation instruction signal to the CPU 501, the CPU 501 causes the image processing unit 505 to subject the image data of the read original image to specific processing which makes an image illegible.

In the configuration of the image processing apparatus 500 of FIG. 59, immediately when the image detection unit 509 detects the background dot pattern 143 in an original image, the image processing unit 505 subjects the image data of the read original to specific processing which makes an image illegible. Thereby, the reproduction of an anti-copy original image can be prevented at an early stage.

There are several methods of detecting the attachment of the image detection unit 509 to the image processing apparatus 500 based on the unit signal output from the image detection unit 509.

(1) The CPU 501 sends an inquiry to the image detection unit 509, and the image detection unit 509 sends back a response to the CPU 501 based on a predetermined protocol.

(2) A flag is set in the image detection unit 509. If the CPU 501 causes the flag to be high at a predetermined timing, the image detection unit 509 causes the flag to be low at a predetermined timing.

(3) When the ID of the image detection unit 509 is sent from the CPU 501 on the data bus of the bus 508, the image detection unit 509 having the ID sends back a specific value to the CPU 501 on the data bus of the bus 508.

According to the above-described embodiment, in the image processing apparatus 500, the CPU 501 determines if the image detection unit 509 as an optional unit is attached to the image processing apparatus 500. If the attachment of the image detection unit 509 is detected, a control program for use in the image detection unit 509 and a display menu which is to be displayed on the operation panel 507 when the image detection unit 509 is attached to the image processing apparatus 500 can be automatically added. Therefore, the image detection unit 509 can be used as an optional unit without the necessity of the replacement of the control program and complicated management of the control program.

The present invention has been described with respect to the exemplary embodiments illustrated in the figures. However, the present invention is not limited to these embodiments and may be practiced otherwise.

Numerous additional modifications and variations of the present invention are possible in light of the above teachings. It is therefore understood that within the scope of the appended claims, the present invention may be practiced other than as specifically described herein.

What is claimed as new and desired to be protected by Letters Patent of the United States is:

1. An image processing apparatus, comprising:
   a scaling ratio obtaining mechanism configured to obtain information of a scaling ratio of image data of an original image scanned by scaling the original image in a sub-scanning direction;
   a normalizing mechanism configured to normalize magnified image data to its substantially original size when the scaling ratio obtained by the scaling ratio obtaining mechanism is a magnification ratio;
   a first detecting mechanism configured to detect if specific information is included in the image data normalized by the normalizing mechanism;
   a second detecting mechanism configured to store a plurality of items of specific information each having a plurality of sizes respectively corresponding to a plurality of scaling ratios, and when the scaling ratio obtained by the scaling ratio obtaining mechanism is a reduction ratio, the second mechanism selects one of the plurality of items of specific information as selected specific information, and to detect if specific information is included in the image data of the original image by comparing the selected specific information with specific information extracted from the image data of the original image; and a processing mechanism configured to subject the image data to specific processing when one of the first and second detecting mechanisms detects that the specific information is included in the image data.

2. An image processing apparatus, comprising:

a scaling ratio obtaining mechanism configured to obtain information of a scaling ratio of image data of an original image scanned by scaling the original image in a sub-scanning direction;

a normalizing mechanism configured to normalize magnified image data to its substantially original size when the scaling ratio obtained by the scaling ratio obtaining mechanism is a magnification ratio;

a first detecting mechanism configured to detect if specific information is included in the image data normalized by the normalizing mechanism;

a second detecting mechanism configured to detect if specific information is included in the image data of the original image by changing the specific information according to the scaling ratio obtained by the scaling ratio obtaining mechanism when the scaling ratio obtained by the scaling ratio obtaining mechanism is a reduction ratio; and a processing mechanism configured to subject the image data to specific processing when one of the first and second detecting mechanisms detects that the specific information is included in the image data, wherein the second detecting mechanism is configured to detect if specific information is included in the image data of the original image by changing the specific information according to the scaling ratio obtained by the scaling ratio obtaining mechanism when the scaling ratio obtained by the scaling ratio obtaining mechanism is a reduction ratio of greater than or equal to a predetermined value; and the image processing apparatus further comprises:

a magnifying mechanism configured to magnify the image data at a fixed magnification ratio when the scaling ratio obtained by the scaling ratio obtaining mechanism is a reduction ratio of less than the predetermined value; and a third detecting mechanism configured to detect if specific information is included in the image data magnified by the magnifying mechanism by changing the specific information according to a scaling ratio calculated by multiplying the scaling ratio obtained by the scaling ratio obtaining mechanism by the fixed magnification ratio; and the processing mechanism is configured to subject the image data to specific processing when one of the first, second, and third detecting mechanisms detects that the specific information is included in the image data.

3. An image processing apparatus, comprising:

a scaling ratio obtaining mechanism configured to obtain information of a scaling ratio of image data of an original image scanned by scaling the original image in a sub-scanning direction;

a normalizing mechanism configured to normalize magnified image data to its substantially original size when the scaling ratio obtained by the scaling ratio obtaining mechanism is a magnification ratio;

a first detecting mechanism configured to detect if specific information is included in the image data normalized by the normalizing mechanism;

a second detecting mechanism configured to detect if specific information is included in the image data of the original image by changing the specific information according to the scaling ratio obtained by the scaling ratio obtaining mechanism when the scaling ratio obtained by the scaling ratio obtaining mechanism is a reduction ratio; and a processing mechanism configured to subject the image data to specific processing when one of the first and second detecting mechanisms detects that the specific information is included in the image data, wherein:

the second detecting mechanism is configured to detect if specific information is included in the image data of the original image by changing the specific information according to the scaling ratio obtained by the scaling ratio obtaining mechanism when the scaling ratio is a reduction ratio of greater than or equal to a predetermined value;

the image processing apparatus further comprises:

a magnifying mechanism configured to magnify the image data when the scaling ratio is a reduction ratio of less than the predetermined value such that the scaling ratio of the image data becomes a fixed scaling ratio of greater than or equal to the predetermined value; and a third detecting mechanism configured to detect if specific information is included in the image data magnified by the magnifying mechanism by changing the specific information according to the fixed scaling ratio; and the processing mechanism is configured to subject the image data to specific processing when one of the first, second, and third detecting mechanisms detects that the specific information is included in the image data.

4. The image processing apparatus according to claim 2, wherein the fixed magnification ratio is two.

5. The image processing apparatus according to claim 2, wherein the first, second, and third detecting mechanisms are configured to detect if the specific information representing prohibition of an output of the image data is included in the image data.

6. The image processing apparatus according to claim 3, wherein the first, second, and third detecting mechanisms are configured to detect if the specific information representing prohibition of an output of the image data is included in the image data.

7. The image processing apparatus according to claim 5, wherein the specific information representing prohibition of an output of the image data comprises a dot pattern embedded in one of a background and a foreground relative to the original image.

8. The image processing apparatus according to claim 6, wherein the specific information representing prohibition of an output of the image data comprises a dot pattern embedded in one of a background and a foreground relative to the original image.

9. The image processing apparatus according to claim 7, wherein the first, second, and third detecting mechanisms are configured to detect if the specific information representing prohibition of an output of the image data is included in the image data based on a number of dot included in the dot pattern.

10. The image processing apparatus according to claim 8, wherein the first, second, and third detecting mechanisms are configured to detect if the specific information representing prohibition of an output of the image data is included in the image data based on a number of dot included in the dot pattern.

11. The image processing apparatus according to claim 7, wherein the first, second, and third detecting mechanisms are configured to detect if the specific information representing prohibition of an output of the image data is included in the image data based on a number of the dot pattern.

12. The image processing apparatus according to claim 8, wherein the first, second, and third detecting mechanisms are configured to detect if the specific information representing prohibition of an output of the image data is included in the image data based on a number of the dot pattern.

13. The image processing apparatus according to claim 2, wherein the processing mechanism is configured to subject the image data to specific image processing.

14. The image processing apparatus according to claim 3, wherein the processing mechanism is configured to subject the image data to specific image processing.

15. The image processing apparatus according to claim 2, wherein the processing mechanism is configured to subject the image data to processing for prohibiting an output of the image data.

16. The image processing apparatus according to claim 3, wherein the processing mechanism is configured to subject the image data to processing for prohibiting an output of the image data.

17. The image processing apparatus according to claim 2, further comprising:
    a scanner configured to scan an original image by scaling the original image in the sub-scanning direction; and
    an operation unit configured to receive a scaling instruction and information of a scaling ratio input by a user,
    wherein the scaling ratio obtaining mechanism is configured to obtain the information of a scaling ratio from the operation unit.

18. The image processing apparatus according to claim 2, further comprising a printer configured to form an image on a medium based on the image data of the scanned original image which is one of the image data subjected to the specific processing by the processing mechanism and the image data not subjected to the specific processing.

19. An image processing method performed by a controller of an image processing apparatus, the method comprising:
    obtaining information of a scaling ratio of image data of an original image scanned by scaling the original image in a sub-scanning direction;
    normalizing magnified image data to its substantially original size when the obtained scaling ratio is a magnification ratio;
    first detecting if specific information is included in the normalized image data;
    storing a plurality of items of specific information each having a plurality of sizes respectively corresponding to a plurality of scaling ratios;
    selecting one of the plurality of items of specific information as selected specific information when the scaling ratio obtained by the obtaining step is a reduction ratio to detect if specific information is included in the image data of the original image by comparing the selected specific information with specific information extracted from the image data of the original image; and
    subjecting the image data to specific processing when the specific information is included in the image data in one of the first and second detecting steps.

20. An image processing method performed by a controller of an image processing apparatus, the method comprising:
    obtaining information of a scaling ratio of image data of an original image scanned by scaling the original image in a sub-scanning direction;
    normalizing magnified image data to its substantially original size when the obtained scaling ratio is a magnification ratio;
    first detecting if specific information is included in the normalized image data;
    second detecting if specific information is included in the image data of the original image by changing the specific information according to the obtained scaling ratio when the scaling ratio is a reduction ratio; and
    subjecting the image data to specific processing when the specific information is included in the image data in one of the first and second detecting steps, wherein the step of second detecting further comprises detecting if specific information is included in the image data of the original image by changing the specific information according to the obtained scaling ratio when the scaling ratio is a reduction ratio of greater than or equal to a predetermined value,
    wherein the method further comprises:
        magnifying the image data at a fixed magnification ratio when the scaling ratio is a reduction ratio of less than the predetermined value; and
        third detecting if specific information is included in the magnified image data by changing the specific information according to a scaling ratio calculated by multiplying the obtained scaling ratio by the fixed magnification ratio, and
    wherein the step of subjecting further comprises subjecting the image data to specific processing when the specific information is included in the image data in one of the first, second, and third detecting steps.

21. An image processing method performed by a controller of an image processing apparatus, the method comprising:
    obtaining information of a scaling ratio of image data of an original image scanned by scaling the original image in a sub-scanning direction;
    normalizing magnified image data to its substantially original size when the obtained scaling ratio is a magnification ratio;
    first detecting if specific information is included in the normalized image data;
    second detecting if specific information is included in the image data of the original image by changing the specific information according to the obtained scaling ratio when the scaling ratio is a reduction ratio; and
        subjecting the image data to specific processing when the specific information is included in the image data in one of the first and second detecting steps, wherein the step of second detecting comprises detecting if specific information is included in the image data of the original image by changing the specific information according to the obtained scaling ratio when the scaling ratio is a reduction ratio of greater than or equal to a predetermined value,
    wherein the method further comprises:
    magnifying the image data when the scaling ratio is a reduction ratio of less than the predetermined value such that the scaling ratio of the image data becomes a fixed scaling ratio of greater than or equal to the predetermined value; and third detecting if specific information is included in the magnified image data by changing the specific information according to the fixed scaling ratio, and wherein the step of subjecting further comprises subjecting the image data to specific processing when the specific information is included in the image data in one of the first, second, and third detecting steps.

22. The method according to claim 20, wherein the fixed magnification ratio is two.

23. The method according to claim 20, wherein the first, second, and third detecting steps further comprise detecting if the specific information representing prohibition of an output of the image data is included in the image data.

24. The method according to claim 21, wherein the first, second, and third detecting steps further comprise detecting if the specific information representing prohibition of an output of the image data is included in the image data.

25. The method according to claim 23, wherein the specific information representing prohibition of an output of the image data comprises a dot pattern embedded in one of a background and a foreground relative to the original image.

26. The method according to claim 24, wherein the specific information representing prohibition of an output of the image data comprises a dot pattern embedded in one of a background and a foreground relative to the original image.

27. The method according to claim 25, wherein the first, second, and third detecting steps further comprise detecting if the specific information representing prohibition of an output of the image data is included in the image data based on a number of dot included in the dot pattern.

28. The method according to claim 26, wherein the first, second, and third detecting steps further comprise detecting if the specific information representing prohibition of an output of the image data is included in the image data based on a number of dot included in the dot pattern.

29. The method according to claim 25, wherein the first, second, and third detecting steps further comprise detecting if the specific information representing prohibition of an output of the image data is included in the image data based on a number of the dot pattern.

30. The method according to claim 26, wherein the first, second, and third detecting steps further comprise detecting if the specific information representing prohibition of an output of the image data is included in the image data based on a number of the dot pattern.

31. The method according to claim 20, wherein the subjecting step comprises subjecting the image data to specific image processing.

32. The method according to claim 21, wherein the subjecting step comprises subjecting the image data to specific image processing.

33. The method according to claim 20, wherein the subjecting step further comprises subjecting the image data to processing for prohibiting an output of the image data.

34. The method according to claim 21, wherein the subjecting step further comprises subjecting the image data to processing for prohibiting an output of the image data.

35. A computer-readable storage medium storing a program executed by a controller of an image processing apparatus to carry out a method comprising the steps of:

obtaining information of a scaling ratio of image data of an original image scanned by scaling the original image in a sub-scanning direction;

normalizing magnified image data to its substantially original size when the obtained scaling ratio is a magnification ratio;

first detecting if specific information is included in the normalized image data;

storing a plurality of items of specific information each having a plurality of sizes respectively corresponding to a plurality of scaling ratios;

selecting one of the plurality of items of specific information as selected specific information when the scaling ratio obtained by the obtaining step is a reduction ratio to detect if specific information is included in the image data of the original image by comparing the selected specific information with specific information extracted from the image data of the original image; and subjecting the image data to specific processing when the specific information is included in the image data in one of the first and second detecting steps.

36. A computer-readable storage medium storing a program executed by a controller of an image processing apparatus to carry out a method comprising the steps of:

obtaining information of a scaling ratio of image data of an original image scanned by scaling the original image in a sub-scanning direction;

normalizing magnified image data to its substantially original size when the obtained scaling ratio is a magnification ratio;

first detecting if specific information is included in the normalized image data;

second detecting if specific information is included in the image data of the original image by changing the specific information according to the obtained scaling ratio when the scaling ratio is a reduction ratio; and subjecting the image data to specific processing when the specific information is included in the image data in one of the first and second detecting steps, wherein the step of second detecting further comprises detecting if specific information is included in the image data of the original image by changing the specific information according to the obtained scaling ratio when the scaling ratio is a reduction ratio of greater than or equal to a predetermined value, wherein the method further comprises:

magnifying the image data at a fixed magnification ratio when the scaling ratio is a reduction ratio of less than the predetermined value; and third detecting if specific information is included in the magnified image data by changing the specific information according to a scaling ratio calculated by multiplying the obtained scaling ratio by the fixed magnification ratio, and wherein the step of subjecting comprises subjecting the image data to specific processing when the specific information is included in the image data in one of the first, second, and third detecting steps.

37. A computer-readable storage medium storing a program executed by a controller of an image processing apparatus to carry out a method comprising the steps of:

obtaining information of a scaling ratio of image data of an original image scanned by sealing the original image in a sub-scanning direction;

normalizing magnified image data to its substantially original size when the obtained scaling ratio is a magnification ratio;

first detecting if specific information is included in the normalized image data;

second detecting if specific information is included in the image data of the original image by changing the specific information according to the obtained scaling ratio when the scaling ratio is a reduction ratio; and subjecting the image data to specific processing when the specific information is included in the image data in one of the first and second detecting steps, wherein the step of second detecting further comprises detecting if specific information is included in the image data of the original image by changing the specific information according to the obtained scaling ratio when the scaling ratio is a reduction ratio of greater than or equal to a predetermined value, wherein the method further comprises:

magnifying the image data when the scaling ratio is a reduction ratio of less than the predetermined value such that the scaling ratio of the image data becomes a fixed scaling ratio of greater than or equal to the predetermined value; and third detecting if specific information is included in the magnified image data by changing the specific information according to the fixed scaling ratio, and wherein the step of subjecting comprises subjecting the image data to specific processing when the specific information is included in the image data in one of the first, second, and third detecting steps.

38. The medium according to claim 36, wherein the fixed magnification ratio is two.

39. The medium according to claim 36, wherein the first, second, and third detecting steps further comprise detecting if the specific information representing prohibition of an output of the image data is included in the image data.

40. The medium according to claim 37, wherein the first, second, and third detecting steps further comprise detecting if the specific information representing prohibition of an output of the image data is included in the image data.

41. The medium according to claim 39, wherein the specific information representing prohibition of an output of the image data comprises a dot pattern embedded in one of a background and a foreground relative to the original image.

42. The medium according to claim 40, wherein the specific information representing prohibition of an output of the image data comprises a dot pattern embedded in one of a background and a foreground relative to the original image.

43. The medium according to claim 41, wherein the first, second, and third detecting steps further comprise detecting if the specific information representing prohibition of an output of the image data is included in the image data based on a number of dot included in the dot pattern.

44. The medium according to claim 42, wherein the first, second, and third detecting steps further comprise detecting if the specific information representing prohibition of an output of the image data is included in the image data based on a number of dot included in the dot pattern.

45. The medium according to claim 41, wherein the first, second, and third detecting steps further comprise detecting if the specific information representing prohibition of an output of the image data is included in the image data based on a number of the dot pattern.

46. The medium according to claim 42, wherein the first, second, and third detecting steps further comprise detecting if the specific information representing prohibition of an output of the image data is included in the image data based on a number of the dot pattern.

47. The medium according to claim 36, wherein the subjecting step further comprises subjecting the image data to specific image processing.

48. The medium according to claim 37, wherein the subjecting step further comprises subjecting the image data to specific image processing.

49. The medium according to claim 36, wherein the subjecting step further comprises subjecting the image data to processing for prohibiting an output of the image data.

50. The medium according to claim 37, wherein the subjecting step further comprises subjecting the image data to processing for prohibiting an output of the image data.

51. The image processing apparatus of claim 1, further comprising:

a scanner configured to scan the original image into the image data of the original image by scaling the original image in a sub-scanning direction according to the scaling ratio obtained by the scaling ratio obtaining mechanism while keeping a main scanning direction of the original image unscaled.

52. The image processing apparatus of claim 51, wherein the plurality of items of specific information are a plurality of dot patterns having the plurality of sizes.

53. The image processing method of claim 19, further comprising:

scanning the original image into the image data of the original image by scaling the original image in a sub-scanning direction according to the scaling ratio obtained by the scaling ratio obtaining mechanism while keeping a main scanning direction of the original image unscaled.

54. The image processing method of claim 53, wherein the plurality of items of specific information are a plurality of dot patterns having the plurality of sizes.

55. The medium of claim 35, wherein the method further comprises:

scanning the original image into the image data of the original image by scaling the original image in a sub-scanning direction according to the scaling ratio obtained by the scaling ratio obtaining mechanism while keeping a main scanning direction of the original image unscaled.

56. The medium of claim 55, wherein the plurality of items of specific information are a plurality of dot patterns having the plurality of sizes.

* * * * *